United States Patent
Raghavan et al.

(10) Patent No.: US 12,363,554 B2
(45) Date of Patent: Jul. 15, 2025

(54) BEAM SWITCHING AND ENHANCED BEAM REPORTING TO MITIGATE INTERFERENCE IN BEAMFORMING

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 895 days.

(21) Appl. No.: 17/349,742

(22) Filed: Jun. 16, 2021

(65) Prior Publication Data

US 2022/0007207 A1 Jan. 6, 2022

Related U.S. Application Data

(60) Provisional application No. 63/048,644, filed on Jul. 6, 2020, provisional application No. 63/048,426, filed on Jul. 6, 2020.

(51) Int. Cl.
*H04W 16/28* (2009.01)
*H04B 17/336* (2015.01)
(Continued)

(52) U.S. Cl.
CPC .......... *H04W 16/28* (2013.01); *H04B 17/336* (2015.01); *H04L 5/0048* (2013.01); *H04W 24/10* (2013.01); *H04W 56/001* (2013.01)

(58) Field of Classification Search
CPC ....... H04B 7/04026–0473; H04B 7/0491–065; H04B 17/336; H04B 7/0426–0473; H04L 5/0048; H04L 5/14; H04L 45/16; H04W 24/10; H04W 56/001; H04W 56/0055; H04W 72/541; H04W 16/10
See application file for complete search history.

(56) References Cited

U.S. PATENT DOCUMENTS

2016/0029404 A1* 1/2016 Aryafar ............... H04W 72/542
370/277
2017/0163327 A1* 6/2017 Yang .................... H04B 7/0413
(Continued)

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communications are described. A communication device, otherwise known as a user equipment (UE) may receive a first beamformed transmission associated with a directional beam from another UE. The UE may measure a main lobe or at least one side lobe associated with the directional beam, and determine a level of interference at the UE based on the measuring. One or more of the main lobe or the at least one side lobe associated with the directional beam may cause interference to a second beamformed transmission associated with another directional beam from a base station. The UE may transmit a beam report including an indication of the main lobe or the at least one side lobe associated with the directional beam causing the interference to the second beamformed transmission associated with the other directional beam from the base station.

24 Claims, 21 Drawing Sheets

(51) Int. Cl.
    *H04L 5/00*     (2006.01)
    *H04W 24/10*    (2009.01)
    *H04W 56/00*    (2009.01)

(56) References Cited

U.S. PATENT DOCUMENTS

| | | | | |
|---|---|---|---|---|
| 2017/0171912 | A1* | 6/2017 | Ayach | H04L 5/0023 |
| 2018/0219595 | A1* | 8/2018 | Liu | H04B 7/0617 |
| 2018/0302888 | A1* | 10/2018 | Stirling-Gallacher | H04B 7/063 |
| 2021/0051660 | A1* | 2/2021 | Askar | H04W 72/541 |
| 2021/0385779 | A1* | 12/2021 | Oteri | H04W 76/15 |
| 2021/0409177 | A1* | 12/2021 | Hao | H04B 17/345 |
| 2022/0210780 | A1* | 6/2022 | Ling | H04B 7/0404 |
| 2022/0225121 | A1* | 7/2022 | Wanuga | H04L 5/0048 |
| 2023/0133382 | A1* | 5/2023 | Kalantari | H04B 7/0695 375/262 |
| 2023/0155660 | A1* | 5/2023 | Zhang | H04B 7/0404 375/267 |

\* cited by examiner

BEAM SWITCHING AND ENHANCED BEAM REPORTING TO MITIGATE INTERFERENCE IN BEAMFORMING

CROSS REFERENCE

The present application for patent claims the benefit of U.S. Provisional Patent Application No. 63/048,644 by RAGHAVAN et al., entitled "TECHNIQUES FOR BEAM SWITCHING DUE TO INTERFERENCE FROM SIDE LOBES," filed Jul. 6, 2020, and U.S. Provisional Patent Application No. 63/048,426 by RAGHAVAN et al., entitled "TECHNIQUES FOR ENHANCED BEAM REPORTING TO MITIGATE INTERFERENCE IN BEAMFORMING," filed Jul. 6, 2020 assigned to the assignee hereof, and expressly incorporated by reference herein.

FIELD OF TECHNOLOGY

The following relates to wireless communications and more specifically to techniques for beam switching and enhanced beam reporting to mitigate interference in beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices may support beamformed communications using one or multiple antenna subarrays to provide transmit diversity and receive diversity. Some communication devices may, for example, support beamformed communications in high frequency ranges, such as a frequency range 2 (FR2), a frequency range 4 (FR4), etc. These communication devices may, however, experience or cause interference to other communication devices (e.g., UEs or base stations) due to side lobes produced by the antenna subarrays for the beamformed transmissions.

SUMMARY

Various aspects of the described techniques relate to configuring a communication device, which may be a user equipment (UE), to support high reliability and low latency beamformed communications. A wireless communications system may support beamformed communications between multiple communication devices (e.g., base stations, UEs). These communication devices may, for example, support beamformed communications over one or multiple directional beams using one or multiple antenna subarrays. A directional beam may have a radiation pattern including a main lobe and one or more side lobes. In some cases, the beamformed communications from or to the communication devices may result in one or more side lobes that cause interference at another communication device (e.g., another base station, UE). The interference due to large side lobes may degrade a reliability of beamformed communications for the nearby communication device.

To promote high-reliability and low-latency beamformed communications, a communication device may be configured to perform beam reporting based on interference caused by one or more side lobes of a directional beam, to switch a directional beam or shape a directional beam by adjusting one or more beam weights, or both as described herein. For example, the communication device may be configured to transmit a beam report when one or more side lobes of a directional beam causes a level of interference that satisfies a threshold. In some examples, the communication device may determine that one or more side lobes of the directional beam may be causing interference at the communication device or another communication device (e.g., a base station). In some examples, the communication device may be configured to inform a network communication device (e.g., a base station) about interference the communication device is experiencing due to at least one side lobe. For example, the communication device may report a reference signal received power (RSRP), a signal-to-interference-and-noise ratio (SINR), etc. or indicate a synchronization signal block (SSB) corresponding to a direction in which the interference due to the at least one side lobe is experienced, among other examples. Alternatively, the communication device may be configured to switch directional beams or transmission configuration indicator (TCI) states. The communication device may be configured to, additionally, or alternatively, request improved scheduling (e.g., time and frequency resources) to avoid the interference. The communication device may determine that the level of interference caused by the one or more side lobes satisfies the threshold and may generate a beam report indicating the level of interference, and may then transmit the beam report to another device, such as the base station.

A method of wireless communications at a first UE is described. The method may include receiving a first beamformed transmission associated with a directional beam from a second UE, measuring one or more of a main lobe or at least one side lobe associated with the directional beam, determining a level of interference at the first UE based on the measuring, wherein the one or more of the main lobe or the at least one side lobe associated with the directional beam causes interference to a second beamformed transmission associated with another directional beam from a base station, and transmitting a beam report including a first indication of the one or more of the main lobe or the at least one side lobe associated with the directional beam causing the interference to the second beamformed transmission associated with the other directional beam from the base station.

An apparatus for wireless communications is described. The apparatus may include a processor, memory coupled with the processor, and instructions stored in the memory. The instructions may be executable by the processor to cause the apparatus to receive a first beamformed transmission associated with a directional beam from a second apparatus, measure one or more of a main lobe or at least one side lobe associated with the directional beam, determine a level of interference at the apparatus based on the measuring, wherein the one or more of the main lobe or the at least one side lobe associated with the directional beam causes interference to a second beamformed transmission associated with another directional beam from a base station, and transmit a beam report including a first indication of the one or more of the main lobe or the at least one side lobe associated with the directional beam causing the interference to the second beamformed transmission associated with the other directional beam from the base station.

Another apparatus for wireless communications is described. The apparatus may include means for receiving a first beamformed transmission associated with a directional beam from a second apparatus, measuring one or more of a main lobe or at least one side lobe associated with the directional beam, determining a level of interference at the apparatus based on the measuring, wherein the one or more of the main lobe or the at least one side lobe associated with the directional beam causes interference to a second beamformed transmission associated with another directional beam from a base station, and transmitting a beam report including a first indication of the one or more of the main lobe or the at least one side lobe associated with the directional beam causing the interference to the second beamformed transmission associated with the other directional beam from the base station.

A non-transitory computer-readable medium storing code for wireless communications at a first UE is described. The code may include instructions executable by a processor to receive a first beamformed transmission associated with a directional beam from a second UE, measure one or more of a main lobe or at least one side lobe associated with the directional beam, determine a level of interference at the first UE based on the measuring, wherein the one or more of the main lobe or the at least one side lobe associated with the directional beam causes interference to a second beamformed transmission associated with another directional beam from a base station, and transmit a beam report including a first indication of the one or more of the main lobe or the at least one side lobe associated with the directional beam causing the interference to the second beamformed transmission associated with the other directional beam from the base station.

Some examples of the method, apparatuses, and non-transitory computer-readable medium described herein may further include operations, features, means, or instructions for determining a signal strength metric based on the first beamformed transmission associated with the directional beam from the second UE and the second beamformed transmission associated with the other directional beam from the base station, where determining the level of interference includes determining the level of interference at the first UE based on determining the signal strength metric, where transmitting the beam report includes transmitting a second indication of the signal strength metric.

In some examples of the method, apparatuses, and non-transitory computer-readable medium described herein, the signal strength metric includes an SINR, an RSRP, a reference signal received quality (RSRQ), a reference signal strength indicator (RSSI), or a combination thereof.

Some examples of the method, apparatuses, and non-transitory computer-readable medium described herein may further include operations, features, means, or instructions for adjusting an RSRP based on the at least one side lobe associated with the directional beam, where transmitting the beam report includes transmitting a second indication of the adjusted RSRP.

Some examples of the method, apparatuses, and non-transitory computer-readable medium described herein may further include operations, features, means, or instructions for determining an SSB associated with the other directional beam based on the one or more of the main lobe or the at least one side lobe associated with the directional beam causing the interference to the second beamformed transmission associated with the other directional beam from the base station, the other directional beam corresponding to a direction of the first beamformed transmission causing the interference to the second beamformed transmission, where transmitting the beam report includes transmitting a second indication of the SSB corresponding to the direction of the first beamformed transmission causing the interference to the second beamformed transmission.

A method of wireless communications at a first UE is described. The method may include transmitting, to a base station, a set of beamformed transmissions using a first set of uplink directional beams associated with a first set of antenna elements of a first antenna array, receiving, from the base station, a beam report including an indication of one or more of a measured main lobe or at least one measured side lobe associated with a first directional beam associated with the beamformed transmission from the first UE causing interference at a second UE based on the transmitting, determining a beamformed transmission of the set of beamformed transmissions from the first UE causing the interference at the second UE based on the indication, modifying the first uplink directional beam associated with the beamformed transmission causing the interference at the second UE, and communicating with the base station based on modifying the first uplink directional beam associated with the beamformed transmission causing the interference at the second UE.

An apparatus for wireless communications is described. The apparatus may include a processor, memory coupled with the processor, and instructions stored in the memory. The instructions may be executable by the processor to cause the apparatus to transmit, to a base station, a set of beamformed transmissions using a first set of uplink directional beams associated with a first set of antenna elements of a first antenna array, receive, from the base station, a beam report including an indication of one or more of a measured main lobe or at least one measured side lobe associated with a first directional beam associated with the beamformed transmission from the apparatus causing interference at a second apparatus based on the transmitting, determine a beamformed transmission of the set of beamformed transmissions from the apparatus causing the interference at the second apparatus based on the indication, modify the first uplink directional beam associated with the beamformed transmission causing the interference at the second apparatus, and communicate with the base station based on modifying the first uplink directional beam associated with the beamformed transmission causing the interference at the second apparatus.

Another apparatus for wireless communications is described. The apparatus may include means for transmitting, to a base station, a set of beamformed transmissions using a first set of uplink directional beams associated with a first set of antenna elements of a first antenna array, receiving, from the base station, a beam report including an indication of one or more of a measured main lobe or at least one measured side lobe associated with a first directional beam associated with the beamformed transmission from the apparatus causing interference at a second apparatus based on the transmitting, determining a beamformed transmission of the set of beamformed transmissions from the apparatus causing the interference at the second apparatus based on the indication, modifying the first uplink directional beam associated with the beamformed transmission causing the interference at the second apparatus, and communicating with the base station based on modifying the first uplink directional beam associated with the beamformed transmission causing the interference at the second apparatus.

A non-transitory computer-readable medium storing code for wireless communications at a first UE is described. The code may include instructions executable by a processor to transmit, to a base station, a set of beamformed transmissions using a first set of uplink directional beams associated with a first set of antenna elements of a first antenna array, receive, from the base station, a beam report including an indication of one or more of a measured main lobe or at least one measured side lobe associated with a first directional beam associated with the beamformed transmission from the first UE causing interference at a second UE based on the transmitting, determine a beamformed transmission of the set of beamformed transmissions from the first UE causing the interference at the second UE based on the indication, modify the first uplink directional beam associated with the beamformed transmission causing the interference at the second UE, and communicate with the base station based on modifying the first uplink directional beam associated with the beamformed transmission causing the interference at the second UE.

In some examples of the method, apparatuses, and non-transitory computer-readable medium described herein, receiving the beam report may include operations, features, means, or instructions for receiving a subframe number or symbol indication, where determining the beamformed transmission of the set of beamformed transmissions includes determining the beamformed transmission of the set of beamformed transmissions from the first UE causes the interference at the second UE based on the subframe number or symbol indication corresponding to the beamformed transmission.

In some examples of the method, apparatuses, and non-transitory computer-readable medium described herein, receiving the beam report may include operations, features, means, or instructions for receiving a slot format indication, where determining the beamformed transmission of the set of beamformed transmissions includes determining the beamformed transmission of the set of beamformed transmissions from the first UE causes the interference at the second UE based on the slot format indication corresponding to the beamformed transmission.

Some examples of the method, apparatuses, and non-transitory computer-readable medium described herein may further include operations, features, means, or instructions for determining UE capability information associated with the first UE based on the indication of the first UE causing interference at the second UE, selecting a second antenna array based on the UE capability information, where modifying the first uplink directional beam includes switching from the first uplink directional beam to a second uplink directional beam associated with the second antenna array, where communicating with the base station includes communicating with the base station based on switching from the first uplink directional beam to the second uplink directional beam associated with the second antenna array.

Some examples of the method, apparatuses, and non-transitory computer-readable medium described herein may further include operations, features, means, or instructions for determining that an SINR associated with the second uplink directional beam satisfies a threshold, where switching from the first uplink directional beam to the second uplink directional beam includes switching from the first uplink directional beam to the second uplink directional beam associated with the second antenna array based on determining that the SINR associated with the second uplink directional beam satisfies the threshold.

Some examples of the method, apparatuses, and non-transitory computer-readable medium described herein may further include operations, features, means, or instructions for determining an RSRP associated with the second uplink directional beam, determining that an RSRP associated with the second uplink directional beam satisfies a threshold, where switching from the first uplink directional beam to the second uplink directional beam includes switching from the first uplink directional beam to the second uplink directional beam associated with the second antenna array based on determining that the RSRP associated with the second uplink directional beam satisfies the threshold.

In some examples of the method, apparatuses, and non-transitory computer-readable medium described herein, switching from the first uplink directional beam to the second uplink directional beam may include operations, features, means, or instructions for switching from a first TCI state associated with the first uplink directional beam to a second TCI state associated with the second uplink directional beam.

Some examples of the method, apparatuses, and non-transitory computer-readable medium described herein may further include operations, features, means, or instructions for determining that the interference at the second UE satisfies a threshold based on switching from the first uplink directional beam to the second uplink directional beam, where communicating with the base station includes communicating with the base station based on determining that the interference at the second UE satisfies the threshold.

In some examples of the method, apparatuses, and non-transitory computer-readable medium described herein, modifying the first uplink directional beam may include operations, features, means, or instructions for adjusting one or more beamforming weights corresponding to phase shifter or amplitude control configurations associated with the first uplink directional beam based on UE capability information, where communicating with the base station includes communicating with the base station based on adjusting the one or more beamforming weights associated with the first uplink directional beam.

In some examples of the method, apparatuses, and non-transitory computer-readable medium described herein, modifying the first uplink directional beam may include operations, features, means, or instructions for adjusting one or more beamforming weights corresponding to phase shifter or amplitude control configurations associated with the first uplink directional beam based on the first uplink directional beam causing the interference at the second UE.

Some examples of the method, apparatuses, and non-transitory computer-readable medium described herein may further include operations, features, means, or instructions for transmitting, to the base station, a request to schedule a second set of uplink directional beams associated with a second set of antenna elements of a second antenna array based on the first UE causing interference at the second UE, the second set of uplink directional beams corresponding to a different slot format, where communicating with the base station includes communicating with the base station using the second set of uplink directional beams associated with the second set of antenna elements of the second antenna array.

Some examples of the method, apparatuses, and non-transitory computer-readable medium described herein may further include operations, features, means, or instructions for transmitting, to the base station, a second indication indicating to the base station to refrain from beam reporting on a downlink directional beam associated with the first uplink directional beam.

Some examples of the method, apparatuses, and non-transitory computer-readable medium described herein may further include operations, features, means, or instructions for establishing a wireless link between the first UE and the base station based on a beam training procedure, where communicating with the base station may be based on the established wireless link.

A method of wireless communication at a base station is described. The method may include determining an interference based on one or more of a main lobe or at least one side lobe of an uplink directional beam associated with a first beamformed transmission from a first UE causing the interference at one or more of the base station or the second UE and transmitting, to the first UE, a beam report including an indication of one or more of the main lobe or the at least one side lobe associated with the uplink directional beam from the first UE causing interference at one or more of the base station or the second UE.

An apparatus for wireless communication is described. The apparatus may include a processor, memory coupled with the processor, and instructions stored in the memory. The instructions may be executable by the processor to cause the apparatus to determine an interference based on one or more of a main lobe or at least one side lobe of an uplink directional beam associated with a first beamformed transmission from a first UE causing the interference at one or more of the apparatus or the second UE and transmit, to the first UE, a beam report including an indication of one or more of the main lobe or the at least one side lobe associated with the uplink directional beam from the first UE causing interference at one or more of the apparatus or the second UE.

Another apparatus for wireless communication is described. The apparatus may include means for determining an interference based on one or more of a main lobe or at least one side lobe of an uplink directional beam associated with a first beamformed transmission from a first UE causing the interference at one or more of the apparatus or the second UE and transmitting, to the first UE, a beam report including an indication of one or more of the main lobe or the at least one side lobe associated with the uplink directional beam from the first UE causing interference at one or more of the apparatus or the second UE.

A non-transitory computer-readable medium storing code for wireless communication at a base station is described. The code may include instructions executable by a processor to determine an interference based on one or more of a main lobe or at least one side lobe of an uplink directional beam associated with a first beamformed transmission from a first UE causing the interference at one or more of the base station or the second UE and transmit, to the first UE, a beam report including an indication of one or more of the main lobe or the at least one side lobe associated with the uplink directional beam from the first UE causing interference at one or more of the base station or the second UE.

Some examples of the method, apparatuses, and non-transitory computer-readable medium described herein may further include operations, features, means, or instructions for determining a difference between an uplink rate associated with the first beamformed transmission and a downlink rate associated with a second beamformed transmission from the base station, where determining the interference includes determining the interference based on the difference between the uplink rate and the downlink rate.

Some examples of the method, apparatuses, and non-transitory computer-readable medium described herein may further include operations, features, means, or instructions for determining a difference between an uplink spectral efficiency associated with the first beamformed transmission and a downlink spectral efficiency associated with a second beamformed transmission from the base station, where determining the interference includes determining the interference based on the difference between the uplink spectral efficiency and the downlink spectral efficiency.

Some examples of the method, apparatuses, and non-transitory computer-readable medium described herein may further include operations, features, means, or instructions for determining a network-level interference statistic, where determining the interference includes determining the interference based on the network-level interference statistic.

Some examples of the method, apparatuses, and non-transitory computer-readable medium described herein may further include operations, features, means, or instructions for determining the first UE may be causing the interference at one or more of the base station or the second UE based on slot format indices associated with the first UE and the second UE, where transmitting the report including the indication of the first UE causing interference at one or more of the base station or the second UE may be based on the slot format indices.

Some examples of the method, apparatuses, and non-transitory computer-readable medium described herein may further include operations, features, means, or instructions for estimating location information associated with the first UE and the second UE, and determining the first UE may be causing the interference at one or more of the base station or the second UE based on the estimated location information associated with the first UE and the second UE, where transmitting the report including the indication of the first UE causing interference at one or more of the base station or the second UE may be based on the estimated location information.

Some examples of the method, apparatuses, and non-transitory computer-readable medium described herein may further include operations, features, means, or instructions for transmitting, to the first UE, a subframe number indication indicating that the uplink directional beam associated with the first beamformed transmission from the first UE may be causing the interference at one or more of the base station or the second UE and to perform one or more of a beam switch operation or an antenna subarray switch operation.

Some examples of the method, apparatuses, and non-transitory computer-readable medium described herein may further include operations, features, means, or instructions for transmitting, to the first UE, a slot format indication indicating that the uplink directional beam associated with the first beamformed transmission from the first UE may be causing the interference at one or more of the base station or the second UE and to perform one or more of a beam switch operation or an antenna subarray switch operation.

A method of wireless communications at a first UE is described. The method may include determining at least one sidelobe of a first directional beam of a set of directional beams causing an interference at one or more devices, the one or more devices including a base station, the first UE, or a second UE, or any combination thereof, determining that a first level of interference associated with the at least one sidelobe of the first directional beam of the set of directional beams causing the interference satisfies a threshold, generating a beam report including a first indication of the interference based on the first level of interference associated with the at least one sidelobe of the first directional beam satisfying the threshold, and transmitting the beam report including the first indication of the interference to the base station.

An apparatus for wireless communications is described. The apparatus may include a processor, memory coupled with the processor, and instructions stored in the memory. The instructions may be executable by the processor to cause the apparatus to determine at least one sidelobe of a first directional beam of a set of directional beams causing an interference at one or more devices, the one or more devices including a base station, the apparatus, or a second apparatus, or any combination thereof, determine that a first level of interference associated with the at least one sidelobe of the first directional beam of the set of directional beams causing the interference satisfies a threshold, generate a beam report including a first indication of the interference based on the first level of interference associated with the at least one sidelobe of the first directional beam satisfying the threshold, and transmit the beam report including the first indication of the interference to the base station.

Another apparatus for wireless communications is described. The apparatus may include means for determining at least one sidelobe of a first directional beam of a set of directional beams causing an interference at one or more devices, the one or more devices including a base station, the apparatus, or a second apparatus, or any combination thereof, determining that a first level of interference associated with the at least one sidelobe of the first directional beam of the set of directional beams causing the interference satisfies a threshold, generating a beam report including a first indication of the interference based on the first level of interference associated with the at least one sidelobe of the first directional beam satisfying the threshold, and transmitting the beam report including the first indication of the interference to the base station.

A non-transitory computer-readable medium storing code for wireless communications at a first UE is described. The code may include instructions executable by a processor to determine at least one sidelobe of a first directional beam of a set of directional beams causing an interference at one or more devices, the one or more devices including a base station, the first UE, or a second UE, or any combination thereof, determine that a first level of interference associated with the at least one sidelobe of the first directional beam of the set of directional beams causing the interference satisfies a threshold, generate a beam report including a first indication of the interference based on the first level of interference associated with the at least one sidelobe of the first directional beam satisfying the threshold, and transmit the beam report including the first indication of the interference to the base station.

Some examples of the method, apparatuses, and non-transitory computer-readable medium described herein may further include operations, features, means, or instructions for receiving, from the second UE, a second indication of the at least one sidelobe associated with the first directional beam of the set of directional beams causing the interference, where the second indication is based at least in part on the at least one side lobe associated with the first directional beam of the set of directional beams causing the interference over a threshold number of slots, and where generating the beam report includes generating the beam report based on receiving the second indication of the at least one sidelobe associated with the first directional beam of the set of directional beams causing the interference from the second UE.

Some examples of the method, apparatuses, and non-transitory computer-readable medium described herein may further include operations, features, means, or instructions for receiving the second indication may be based on the at least one sidelobe associated with the first directional beam of the set of directional beams causing the interference over a threshold number of slots.

In some examples of the method, apparatuses, and non-transitory computer-readable medium described herein, generating the beam report may include operations, features, means, or instructions for determining a number of beam switching occasions associated with switching from the first directional beam of the set of directional beams to a second directional beam of the set of directional beams, where the first level of interference associated with the first directional beam may be different from a second level of interference associated with the second directional beam, and generating the beam report based on the number of beam switching occasions.

Some examples of the method, apparatuses, and non-transitory computer-readable medium described herein may further include operations, features, means, or instructions for determining a set of serving cell SSB measurements associated with the base station or a second base station, where generating the beam report includes generating a second indication of the set of serving cell SSB measurements.

Some examples of the method, apparatuses, and non-transitory computer-readable medium described herein may further include operations, features, means, or instructions for receiving a third indication of an SINR from the second UE, where determining the set of serving cell SSB measurements includes determining the set of serving cell SSB measurements associated with the base station or the second base station based on the third indication of the SINR from the second UE.

Some examples of the method, apparatuses, and non-transitory computer-readable medium described herein may further include operations, features, means, or instructions for determining a second directional beam of the set of directional beams to use for the wireless communications based on the at least one sidelobe associated with the first directional beam of the set of directional beams causing the interference at the one or more devices, where generating the beam report includes generating the beam report including a second indication of the second directional beam of the set of directional beams to use for the wireless communications.

Some examples of the method, apparatuses, and non-transitory computer-readable medium described herein may further include operations, features, means, or instructions for determining one or more directional beam candidates of the set of directional beams to use for the wireless communications based on the at least one sidelobe associated with the first directional beam of the set of directional beams causing the interference at the one or more devices, where generating the beam report includes generating the beam report including a second indication of the one or more directional beam candidates of the set of directional beams to use for the wireless communications.

In some examples of the method, apparatuses, and non-transitory computer-readable medium described herein, the threshold includes a signal strength threshold configured by the one or more devices.

A method of wireless communications at a base station is described. The method may include receiving, from a UE, a report of a signal strength associated with a beamformed transmission, where the beamformed transmission includes at least one sidelobe of a first directional beam of a set of directional beams causing an interference at one or more devices, the one or more devices including the base station, the first UE, or a second UE, or any combination thereof, determining that the signal strength associated with the beamformed transmission satisfies a threshold, and transmitting, to the UE, a message including an indication for beam reporting based on the signal strength associated with the beamformed transmission satisfying the threshold.

An apparatus for wireless communications is described. The apparatus may include a processor, memory coupled with the processor, and instructions stored in the memory. The instructions may be executable by the processor to cause the apparatus to receive, from a UE, a report of a signal strength associated with a beamformed transmission, where the beamformed transmission includes at least one sidelobe of a first directional beam of a set of directional beams causing an interference at one or more devices, the one or more devices including the apparatus, the first UE, or a second UE, or any combination thereof, determine that the signal strength associated with the beamformed transmission satisfies a threshold, and transmit, to the UE, a message including an indication for beam reporting based on the signal strength associated with the beamformed transmission satisfying the threshold.

Another apparatus for wireless communications is described. The apparatus may include means for receiving, from a UE, a report of a signal strength associated with a beamformed transmission, where the beamformed transmission includes at least one sidelobe of a first directional beam of a set of directional beams causing an interference at one or more devices, the one or more devices including the apparatus, the first UE, or a second UE, or any combination thereof, determining that the signal strength associated with the beamformed transmission satisfies a threshold, and transmitting, to the UE, a message including an indication for beam reporting based on the signal strength associated with the beamformed transmission satisfying the threshold.

A non-transitory computer-readable medium storing code for wireless communications at a base station is described. The code may include instructions executable by a processor to receive, from a UE, a report of a signal strength associated with a beamformed transmission, where the beamformed transmission includes at least one sidelobe of a first directional beam of a set of directional beams causing an interference at one or more devices, the one or more devices including the base station, the first UE, or a second UE, or any combination thereof, determine that the signal strength associated with the beamformed transmission satisfies a threshold, and transmit, to the UE, a message including an indication for beam reporting based on the signal strength associated with the beamformed transmission satisfying the threshold.

In some examples of the method, apparatuses, and non-transitory computer-readable medium described herein, receiving the report may include operations, features, means, or instructions for receiving, from the UE, the beam report including a second indication of one or more directional beam candidates of the set of directional beams to use for the wireless communications based on the at least one sidelobe associated with the first directional beam of the set of directional beams causing the interference at the one or more devices.

Some examples of the method, apparatuses, and non-transitory computer-readable medium described herein may further include operations, features, means, or instructions for determining a second directional beam of the set of directional beams to use for the wireless communication based on the sidelobe associated with the first directional beam of the set of directional beams causing the interference at the one or more devices.

In some examples of the method, apparatuses, and non-transitory computer-readable medium described herein, determining that the signal strength satisfies the threshold further may include operations, features, means, or instructions for determining that the signal strength satisfies the threshold over a threshold number of slots, where transmitting the message includes transmitting the message based on determining that the signal strength satisfies the threshold over the threshold number of slots.

In some examples of the method, apparatuses, and non-transitory computer-readable medium described herein, the signal strength includes a signal-to-noise ratio (SNR), an SINR, an RSRP, an RSRQ, an RSSI, or a combination thereof.

In some examples of the method, apparatuses, and non-transitory computer-readable medium described herein, the threshold includes a signal strength threshold configured by the one or more devices.

DETAILED DESCRIPTION

Figure 1:
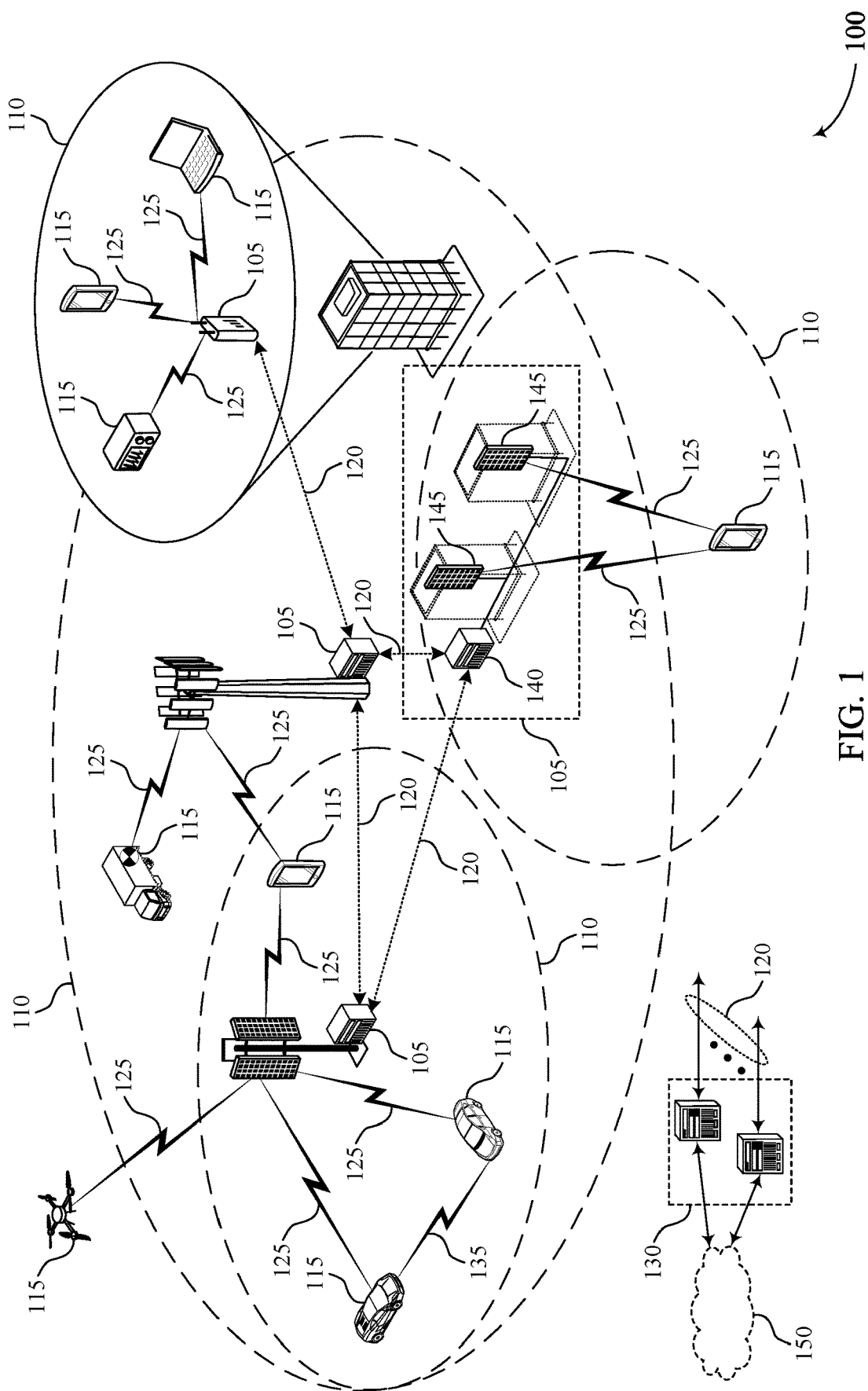
FIG. 1 illustrates an example of a wireless communications systems that supports techniques for beam switching and enhanced beam reporting to mitigate interference in beamforming in accordance with aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. A wireless communications system may support beamformed communications between multiple communication devices (e.g., base stations, UEs) over one or more physical channels including a physical control channel and a physical data channel. Examples of a physical control channel include a physical downlink control channel (PDCCH) and a physical uplink control channel (PUCCH), among others. Examples of a physical data channel include a physical downlink shared channel (PDSCH) and a physical uplink shared channel (PUSCH), among others. These communication devices may also support beamformed communications over the one or more physical channels via one or multiple directional beams using one or multiple antenna subarrays.

A directional beam may have a radiation pattern including a main lobe and one or more side lobes or grating lobes (depending on the inter-antenna element spacings relative to the carrier frequency of interest). In some cases, the beamformed communications from or to the communication devices may result in side lobes or grating lobes that cause interference at another communication device (e.g., another base station, UE). Side lobes or grating lobes at certain angles may be a consequence of steering a main lobe of a directional beam in a particular direction. In some examples, the side lobes may be relatively lower in amplitude to avoid interference with other communication devices (e.g., other base stations or UEs). Grating lobes occur due to ultra wide bandwidth operations where the inter-antenna element spacing can be larger than the critical half a wavelength spacing at certain carrier frequencies, and may be the same amplitude as the main lobe if they are replicas of each other. At higher frequencies, such as in a frequency range 2 (FR2), a frequency range 4 (FR4), or for frequencies above 24.25 GHz in general, or when using large antenna subarrays, side lobes may be relatively larger in amplitude with respect to a baseline signal strength threshold, or may be at different angles that impact beamformed communications to other communication devices (e.g., other base stations or UEs). For example, a communication device (e.g., a base station, a UE) may steer a directional beam over a set of directions (e.g., between minus sixty degrees relative to a boresight, a main direction) of an antenna subarray, or some other angle from the boresight or the main direction). As the main lobe of the directional beam is steered away from the boresight direction, side lobes of the directional beam may increase in amplitude and shift in angle toward the main lobe. In some cases, the side lobes may cause interference that may degrade a reliability of beamformed communications for other nearby communication devices.

Various aspects of the described techniques generally relate to configuring the communication devices to provide directional beam switching or shaping a directional beam or to perform beam reporting to reduce or mitigate interference due to side lobes of a directional beam. In some examples, the communication device may be configured to inform another communication device (e.g., a base station, a UE) about interference the communication device is experiencing due to at least one side lobe. For example, the communication device may report a directional beam measurement metric, such as a reference signal received power (RSRP), a signal-to-interference-and-noise ratio (SINR), a reference signal received quality (RSRQ), a reference signal strength indicator (RSSI), etc. or indicate a synchronization signal block (SSB) corresponding to a direction in which the interference due to the at least one side lobe is experienced. Alternatively, the communication device may be configured to switch directional beams or transmission configuration indicator (TCI) states, or perform directional beam shaping to address the interference. Alternatively, the communication device may be configured to request for better scheduling (e.g., time and frequency resources) to avoid the interference.

In some cases, the communication device may perform beam reporting based on a beam management event that could trigger further responses. For example, the communication device may be configured to transmit a beam report when a parameter related to, such as a gain of, a side lobe satisfies a threshold. If the parameter (e.g., the gain) of the side lobe satisfies the threshold, the communication device may determine that the side lobe may potentially cause or has caused interference at another communication device (e.g., a base station, a UE). The communication device may, as a result, generate and transmit, to the base station, a beam report that includes an indication that the side lobe will cause or has caused interference. The communication device may additionally, or alternatively, determine that at least one side lobe of a directional beam is causing or has caused interference at the communication device or another communication device. For example, the communication device may receive a beam report from a second communication device indicating a level of interference caused by the at least one side lobe at the second communication device. The communication device may determine a signal strength loss (e.g., an RSRP loss, an SINR loss, an SNR loss, an RSRQ loss, an RSSI loss, or some other signal strength-related loss) caused by the interference at the communication device.

The communication device may determine that the level of interference, or the signal strength loss, or both, caused by the at least one side lobe satisfies a threshold (e.g., preconfigured at the communication device, configured by a base station) and may generate a beam report that includes an indication of the level of interference, or the signal strength loss, or both. The communication device may transmit the beam report to the base station indicating the level of interference, or the signal strength loss, or both (among other information), and a direction in which the interference due to the at least one side lobe is experienced, among other information. The beam report may, in some examples, be referred to as an enhanced beam report because it carries beam lobe interference measurements (e.g., main lobe measurements, side lobe measurements, grating lobe measurements, etc.), as well as L1-RSRPs, L1-SINRs, etc.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to beamformed communications by reducing or eliminating interference due to side lobes of a directional beam. Operations performed by the described communication devices may also support improvements to power consumption, reliability for downlink and uplink beamformed communications, spectral efficiency, higher data rates and, in some examples, low latency for downlink and uplink beamformed communications, among other benefits.

Aspects of the disclosure are initially described in the context of wireless communications systems. Aspects of the disclosure are further illustrated by and described with reference to apparatus diagrams, system diagrams, and flowcharts that relate to techniques for beam switching and enhanced beam reporting to mitigate interference in beamforming.

FIG. 1 illustrates an example of a wireless communications system 100 that supports techniques for beam switching and enhanced beam reporting to mitigate interference in beamforming in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In the wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna subarrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna subarrays or antenna panels, which may support MIMO operations or transmit or receive beamforming. For example, one or more base station antennas or antenna subarrays may be co-located at an antenna assembly, such as an antenna tower. In some examples, antennas or antenna subarrays associated with a base station 105 may be located in diverse geographic locations. A base station 105 may have an antenna subarray with a number of rows and columns of antenna ports that the base station 105 may use to support beamforming of communications with a UE 115. Likewise, a UE 115 may have one or more antenna subarrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna subarray such that some signals propagating at particular orientations with respect to an antenna subarray experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna subarray of the transmitting device or receiving device, or with respect to some other orientation).

A base station 105 or a UE 115 may use beam sweeping techniques as part of beam forming operations. For example, a base station 105 may use multiple antennas or antenna subarrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna subarray, or by processing received signals according to different receive beamforming weight sets applied to signals received at multiple antenna elements of an antenna subarray, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may be configured with multiple antenna ports, which may be used to employ techniques such as transmit diversity, receive diversity, MIMO communications, beamforming, or a combination thereof. The antenna ports, physical antennas, or both of the base station 105 and the UE 115 may be located within one or more respective antenna subarrays or antenna panels, which may support MIMO operations, transmit beamforming, receive beamforming, or a combination thereof. For example, the base station 105 antennas or antenna subarrays may be co-located at an antenna assembly, such as an antenna tower. In some examples, antennas or antenna subarrays associated with the base station 105 may be located in diverse geographic locations. The base station 105 may have an antenna subarray with a number of rows and columns of antenna ports that the base station 105 may use to support beamforming of communications with the UE 115. Likewise, the UE 115 may have one or more antenna subarrays that may support various MIMO operations, beamforming operations, or both. Additionally, or alternatively, an antenna panel may support radio frequency beamforming for a signal transmitted via one or more antenna ports.

The base station 105 and the UE 115 may be configured to support directional communications (for example, beamformed communications) using the multiple antenna ports. The base station 105 and the UE 115 may communicate via the directional communications using multiple component carriers. For example, the base station 105 and the UE 115 may be configured to support multiple downlink component carriers, multiple uplink component carriers, or both. The base station 105 and the UE 115 may be configured to support the directional communications over a carrier bandwidth or may be configured to support the directional communications over one of multiple carrier bandwidths.

The wireless communications system 100 may support beamforming for communications between base stations 105 and UEs 115. Beamforming may be used to improve link margin deteriorated due to path, penetration, and blockage losses. The base stations 105 and the UEs 115 may be configured with multiple antenna modules to provide a uniform coverage area for the beamformed communications. An antenna module may include one or more antenna subarrays that the base stations 105 and the UEs 115 may use to form directional beams. Each antenna subarray may have a coverage area of some degree (e.g., ±60°, or some other degree) around a boresight direction of the antenna module. Additionally, the wireless communications system 100 may support higher frequency ranges, such as FR2, FR4, or other frequencies above 24.25 GHz. Antenna subarrays may have large inter-element spacing to support communications at these higher frequency ranges. For example, an antenna subarray configured for communications at these high frequency ranges may have an inter-element spacing of $\lambda/2$, in which $\lambda$ denotes wavelength, such that the inter-element spacing corresponds to half the wavelength for a frequency in the high frequency range.

The UEs 115 may include a limited number of antenna modules as antenna modules (especially large antenna modules that support higher frequency communications) may be expensive, may consume a large amount of power, may produce excess thermal dissipation, or a combination thereof. Thus it may be desirable to increase the coverage area of the antenna subarrays of an antenna module. However, increasing the coverage area may cause interference. For example, beamformed transmissions may result in side lobes or grating lobes. Side lobes at certain angles may be a consequence of steering a main lobe of a directional beam in a particular direction. In some examples, side lobes may be low in amplitude, such that nearby base stations 105 or UEs 115 are not impacted to a noticeable or affecting degree. However, at higher frequencies, or when using large antenna subarrays, or both, the side lobes may be relatively larger in amplitude or include different angles that affect communications of nearby base stations 105 or UEs 115. Additionally, in some examples, as UEs 115 steer a directional beam toward an edge of a coverage area (e.g., away from the boresight direction of the antenna subarray), the side lobes may further increase in amplitude and may shift in angle toward the main lobe. This may increase the likelihood that the side lobes cause interference at nearby base stations 105 or UEs 115 that may decrease transmission reliability and degrade a quality of service at the nearby base stations 105 or UEs 115. Grating lobes could occur as the main lobe is steered towards a certain angle towards the edge of the coverage area and the ultra wide bandwidth coverage seen with the array leads to a newer main lobe (also called as grating lobe) at a different steering angle.

To mitigate interference caused by beamformed transmissions, a UE 115 may provide directional beam switching or shaping a directional beam to reduce or mitigate interference due to side lobes of a directional beam. In some examples, the UE 115 may be configured to inform a base station 105 or another UE 115 about interference the UE 115 is experiencing due to at least one side lobe. For example, the UE 115 may report a directional beam measurement metric, such as an RSRP, an SINR, an RSRQ, an RSSI, etc. or indicate an SSB corresponding to a direction in which the interference due to the at least one side lobe is experienced. Alternatively, the UE 115 may be configured to switch directional beams or TCI states, or perform directional beam shaping to address the interference. Alternatively, the UE 115 may be configured to request a base station 105 to schedule time and frequency resources to avoid the interference. The UEs 115, in the wireless communications system 100, may thus experience high reliability and low latency beamformed communications by addressing interference due to side lobes.

In some cases, to mitigate interference caused by beamformed transmissions, a UE 115 may perform beam reporting to reduce or mitigate interference caused by side lobes of a directional beam. In some examples, the UE 115 may determine that at least one side lobe of a directional beam is causing interference at the UE 115, a base station 105, or another UE 115. In some cases, the UE 115 may determine that at least one side lobe or grating lobe of the directional beam is causing interference based on receiving an indication from the other UE 115 of a signal strength loss (e.g., an SINR loss, or some other signal loss) experienced by the other UE 115. The signal strength loss may indicate a level of interference experienced by the other UE 115. In some other cases, the UE 115 may determine that at least one side lobe of the directional beam is causing interference based on a signal strength loss experienced by the UE 115. The signal strength loss may indicate a level of interference experienced by the UE 115. In some examples, the UE 115 may determine that the level of interference experienced by the UE 115, the other UE 115, or the base station 105, satisfies a threshold level of interference.

Based on the level of interference satisfying the threshold, the UE 115 may generate a beam report indicating the level of interference and transmit the beam report to the base station 105. Additionally, or alternatively, the base station may trigger the UE 115 to transmit the report. For example, the base station 105 may receive a beam report of a signal strength of a beamformed transmission from the UE 115, where at least one side lobe of the beamformed transmission is causing interference at the base station 105, the UE 115, or the other UE 115. In some examples, the base station 105 may determine that the signal strength satisfies a threshold signal strength and transmit a message to the UE 115 that triggers the UE 115 to perform additional beam reporting.

Figure 2A:
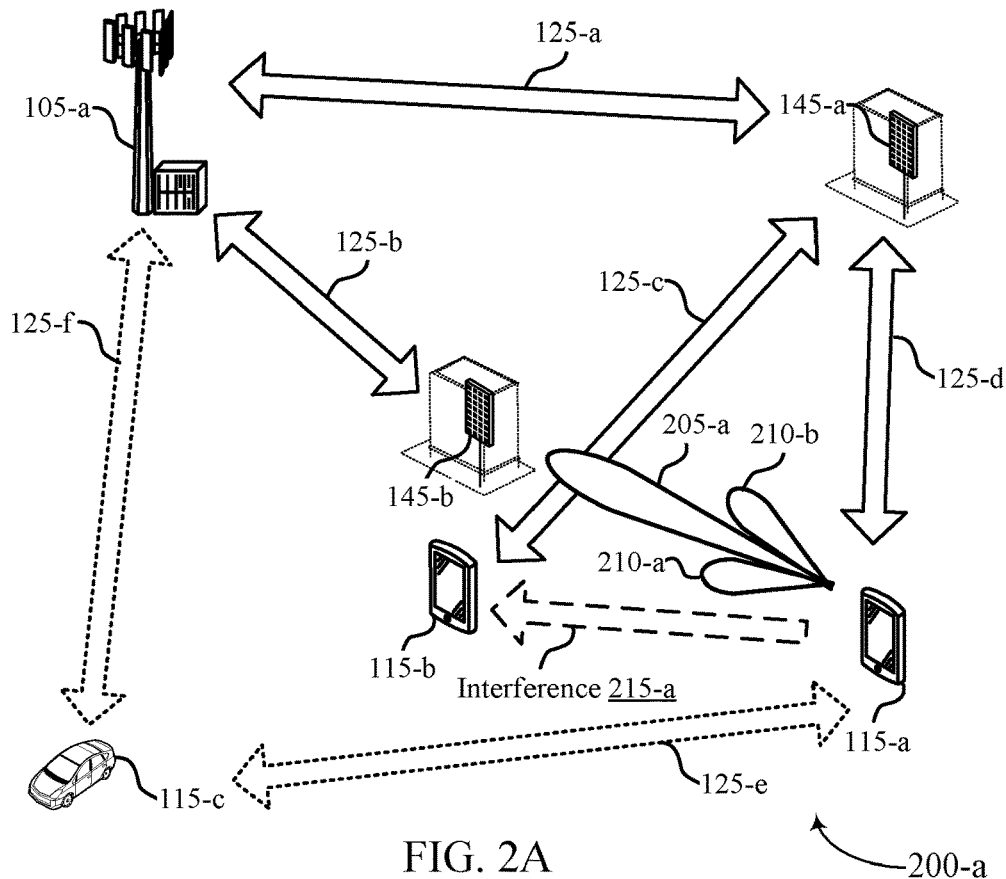
FIGS. 2A and 2B illustrate examples of wireless communications systems that support techniques for beam switching and enhanced beam reporting to mitigate interference in beamforming in accordance with aspects of the present disclosure.

FIG. 2A illustrates an example of a wireless communications system 200-a that supports techniques for beam switching and enhanced beam reporting to mitigate interference in beamforming in accordance with aspects of the present disclosure. In some examples, the wireless communications system 200-a may implement aspects of the wireless communications system 100. For example, the wireless communications system 200-a may include a base station 105-a, a UE 115-a, a UE 115-b, and a UE 115-c, which may be examples of corresponding base stations 105 and UEs 115 as described with reference to FIG. 1. The wireless communications system 200-a may also include one or more access network transmission entities 145 (e.g., a first access network transmission entity 145-a and a second access network transmission entity 145-b) that facilitate exchange of control information and data between the base station 105-a and a UE 115 (e.g., between the base station 105-a and the UE 115-a) and may include multiple communication links 125 for exchanging control information and data between the different communications devices (e.g., between two UEs 115, between the base station 105-a and a UE 115, or between an access network transmission entity 145 and a UE 115 or the base station 105-a).

The wireless communications system 200-a may support beamformed communications between the base station 105 and the UEs 115. A directional beam may be steered over one or multiple directions (e.g., angles), and directional beam scanning (e.g., as part of a beam refinement procedure) may be used to determine beamforming weights to use to establish a communication link 125 between two communication devices (e.g., a base station 105 and a UE 115). For example, a set of beamforming weights may generate a main lobe (e.g., a peak array gain direction) of a directional beam in a particular direction. Additionally, the set of beamforming weights may generate one or more side lobes at a gap from the main lobe based on the amplitude and direction of the main lobe.

A UE 115 may transmit a beamformed transmission having a radiation pattern that includes at least a main lobe 205-a and one or more side lobes 210. For example, the UE 115-a may transmit uplink control information or data to the base station 105-a via the first access network transmission entity 145-a using the main lobe 205-a, a first side lobe 210-a, and a second side lobe 210-b, where the first access network transmission entity 145-a relays the uplink control information or data to the base station 105-a. The first side lobe 210-a and the second side lobe 210-b may be generated as an extension of a set of beamforming weights used to steer energy via the main lobe 205 to the first access network transmission entity 145-a. In some cases, the beamformed transmission from the UE 115-a may cause an interference 215 at a nearby UE. For example, the side lobe 210-a may cause an interference 215-a at the UE 115-b.

Various aspects of the described techniques generally relate to configuring the UEs 115 to decrease or eliminate the interference 215 due to side lobes of a directional beam. For example, if the interference 215-a is at the UE 115-b, the UE 115-b can inform the base station 105-a about the interference 215-a. Alternatively, the base station 105-a may determine that the interference 215-a based on network-level interference statistics as described herein. The UE 115-b may measure a parameter related to one or more of the main lobe 205-a, the side lobe 210-a, and the second side lobe 210-b. The UE 115-b may determine the interference 215-a based on the measurement related to one or more of the main lobe 205-a, the side lobe 210-a, and the second side lobe 210-b. In some examples, the UE 115-b may determine a signal strength metric based on the measurement of one or more of the main lobe 205-a, the side lobe 210-a, and the second side lobe 210-b. For example, the UE 115-b may determine an SINR based on the measurement of one or more of the main lobe 205-a, the side lobe 210-a, and the second side lobe 210-b. The UE 115-b may additionally, or alternatively, determine an RSRP, an RSRQ, or an RSSI based on the measurement of one or more of the main lobe 205-a, the side lobe 210-a, and the second side lobe 210-b.

The UE 115-b may transmit a beam report including an indication of one or more of the main lobe 205-a, the side lobe 210-a, and the second side lobe 210-b causing the interference 215-a at the UE 115-b. The beam report may be referred to as an enhanced beam report because it carries beam lobe interference measurements (e.g., main lobe measurements, side lobe measurements), as well as L1-RSRPs, L1-SINRs, etc. In some examples, the UE 115-b may adjust (e.g., reduce) an RSRP based on measuring the side lobe 210-a or the second side lobe 210-b. That is, L1-RSRP can be reduced by a penalty term dependent on a side lobe 210. Additionally, or alternatively, the UE 115-b may indicate in the enhanced beam report an SSB of the base station 105-b corresponding to a direction in which the interference 215-a is received. The base station 105-b may thus avoid scheduling control information or data on this SSB and may implement a better interference-avoiding SSB choice, if possible.

In some cases, the UE 115-a may determine a gain of the first side lobe 210-a. The UE 115-a may determine that the gain of the first side lobe 210-a is greater than a threshold side lobe gain (e.g., greater than X decibels (dB)) and that the first side lobe 210-a may potentially cause interference at another UE 115 (e.g., UE 115-b) based on the gain of the first side lobe 210-a being greater than the threshold side lobe gain. In some cases, the base station 105-a may configure the UE 115-a with the threshold side lobe gain. In some other cases, the UE 115-a may be pre-configured with the threshold side lobe gain.

The UE 115-a may be configured to transmit a beam report to the base station 105-a based on a gain of a side lobe 210. For example, if the gain of the first side lobe 210-a satisfies the threshold side lobe gain, the UE 115-a may generate a beam report including an indication of the gain of the first side lobe 210-a and may transmit the beam report to the base station 105-a. In some cases, if the first side lobe 210-a causes interference (e.g., interference 215-a) at another UE 115 (e.g., UE 115-b), such that a level of interference satisfies a threshold (e.g., configured by the base station 105-a, pre-configured at the UE 115-a), the base station 105-a may transmit an indication to the UE 115-a to determine one or more beam candidates to use for communications with the base station 105-a that may reduce the level of interference experienced by the another UE 115.

The UE 115-b may transmit an indication of the interference 215-a to one or more of the UE 115-a and the base station 105-a. For example, the UE 115-b may determine a signal strength (e.g., RSRP, RSRQ, RSSI, SINR, SNR, or some other signal strength measurement) of a communication with the base station 105-a (e.g., via the first access network transmission entity 145-a). In some examples, the interference 215-a caused by the first side lobe 210-a may decrease the signal strength of the communication. The UE 115-b may determine that the signal strength satisfies (e.g., is less than) a threshold signal strength (e.g., configured by the base station 105-a, pre-configured at the UE 115-b). Based on the signal strength satisfying the threshold signal strength, the UE 115-b may transmit an indication that includes the signal strength, a level of interference of the interference 215-a, or a combination thereof. In some cases, the UE 115-b may transmit the indication of the interference 215-a based on the signal strength satisfying the threshold signal strength for a threshold number of slots in a time domain. For example, in some cases, the signal strength may satisfy the threshold signal strength for a first number (e.g., one or more) of slots in the time domain. If the first number of slots is less than the threshold number of slots, the UE 115-*b* may refrain from transmitting the indication of the interference 215-*a* to the UE 115-*a*, or the base station 105-*a*, or both. However, if the first number of slots is greater than or equal to the threshold number of slots, the UE 115-*b* may transmit the indication of the interference 215-*a* to the UE 115-*a*, or the base station 105-*a*, or both.

The UE 115-*a* may generate a beam report based on a number, or frequency, or both, of beam switches. For example, the UE 115-*a* may communicate with the base station 105-*a* using a first directional beam that includes the main lobe 205, the first side lobe 210-*a*, and the second side lobe 210-*b*. In some cases, the UE 115-*a* may switch from the first directional beam to a second directional beam to communicate with the base station 105-*a*. The second directional beam may include a main lobe 205 and one or more side lobes 210 that have gains different (e.g., less, greater) than the gains of the main lobe 205 and the side lobes 210 of the first directional beam. In some cases, a level of interference caused by the second directional beam may be different than a level of interference caused by the first directional beam. In some examples, the UE 115-*a* may determine a number of beam switching occasions in which the UE 115-*a* switches from the first directional beam to the second directional beam or from the second directional beam to the first directional beam to communicate with the base station 105-*a*. The UE 115-*a* may also determine a frequency at which the UE 115-*a* switches directional beams. Based on the number of beam switching occasions, or the frequency of beam switches, or both, the UE 115-*a* may generate and transmit the beam report to the base station 105-*a*. In some cases, the beam report may additionally include the first number of slots.

The base station 105-*a* may trigger one or more of the UEs 115 to transmit a beam report. For example, the UE 115-*b* may determine that a signal strength of a communication (e.g., from the first access network transmission entity 145-*a*) is adversely affected (e.g., suffers SINR loss) by the interference 215-*a*. The UE 115-*b* may transmit a beam report to the base station 105-*a* that includes an indication of the signal strength of the communication affected by the interference 215-*a*. The base station 105-*a* may receive the beam report and determine that the signal strength satisfies (e.g., is less than) a threshold signal strength. Based on determining that the signal strength satisfies the threshold signal strength, the base station 105-*a* may transmit a message to UE 115-*b*, or the UE 115-*a*, or both, that indicates the UE 115-*b*, or the UE 115-*a*, or both to perform beam reporting. For example, the message may trigger the UE 115-*a* to report a set of serving cell SSB measurements. The serving cell SSB measurements may be associated with the base station 105-*a* or a different base station 105. In some examples, the base station 105-*a*, or the UE 115-*a*, or both, may use the serving cell SSB measurements to identify one or more beam candidates that the base station 105-*a*, the UE 115-*a*, or the UE 115-*b*, or a combination thereof, may use to reduce the interference 215-*a* caused by the first side lobe 210-*a*. In some cases, the UE 115-*a* may use the serving cell SSB measurements to modify a directional beam (e.g., adjust the angle, adjust the gain) that includes the first side lobe 210-*a* to reduce the interference 215-*a* caused by the first side lobe 210-*a*.

Figure 2B:
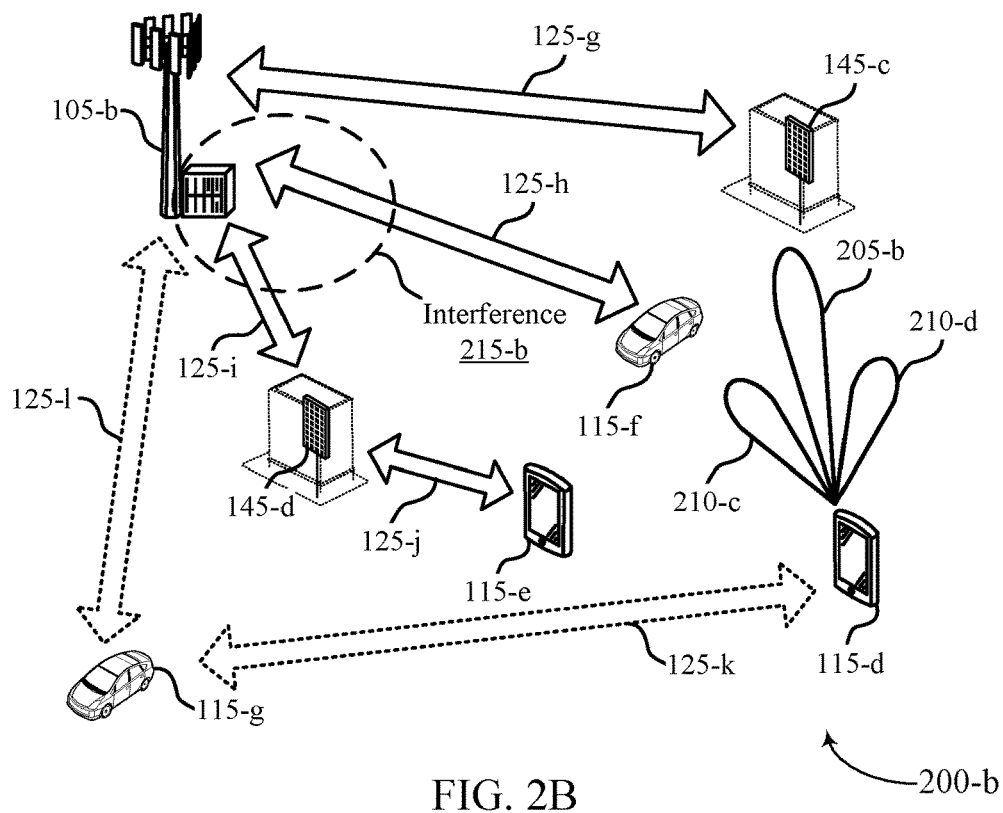

FIG. 2B illustrates an example of a wireless communications system 200-*b* that supports techniques for beam switching and enhanced beam reporting to mitigate interference in beamforming in accordance with aspects of the present disclosure. In some examples, the wireless communications system 200-*b* may implement aspects of the wireless communications system 100. For example, the wireless communications system 200-*b* may include a base station 105-*b*, a UE 115-*d*, a UE 115-*e*, a UE 115-*f*, and a UE 115-*g*, which may be examples of corresponding base stations 105 and UEs 115 as described with reference to FIG. 1. The wireless communications system 200 may also include access network transmission entities 145 (e.g., a first access network transmission entity 145-*c* and a second access network transmission entity 145-*d*) that facilitate exchange of control information and data between a base station 105 and a UE 115 (e.g., between the base station 105-*b* and the UE 115-*d*) and may include multiple communication links 125 for exchanging control information and data between the different communication devices (for example, between two UEs 115, between a base station 105 and a UE 115, or between an access network transmission entity 145 and a UE 115 or a base station 105).

The wireless communications system 200-*a* may support beamformed communications between the base station 105 and the UEs 115. A directional beam may be steered over one or multiple directions (e.g., angles), and directional beam scanning (e.g., as part of a beam refinement procedure) may be used to determine beamforming weights to use to establish a communication link 125 between two communication devices (e.g., a base station 105 and a UE 115). For example, a set of beamforming weights may generate a main lobe (e.g., a peak array gain direction) of a directional beam in a particular direction. Additionally, the set of beamforming weights may generate one or more side lobes at a gap from the main lobe based on the amplitude and direction of the main lobe.

A UE 115 may transmit a beamformed transmission having a radiation pattern that include at least a main lobe 205-*b* and one or more side lobes 210. For example, the UE 115-*d* may transmit uplink control information or data to the base station 105-*a* via the first access network transmission entity 145-*a* using the main lobe 205-*b*, a first side lobe 210-*c*, and a second side lobe 210-*d*, where the first access network transmission entity 145-*c* relays the uplink control information or data to the base station 105-*b*. The first side lobe 210-*c* and the second side lobe 210-*d* may be generated as an extension of a set of beamforming weights used to steer energy via the main lobe 205-*b* to the first access network transmission entity 145-*c*. In some cases, the beamformed transmission from the UE 115-*d* may cause an interference 215-*b* at a nearby UE. For example, the side lobe 210-*c* may cause an interference 215-*b* at the base station 105-*b* or the UE 115-*f*, or both.

Various aspects of the described techniques generally relate to configuring the UEs 115 to decrease or eliminate the interference 215 due to side lobes of a directional beam. For example, if the interference 215-*b* is at the base station 105-*b*, the UE 115-*d* can inform another device, such as the base station 105-*b*, about the interference 215-*b*. Alternatively, the base station 105-*b* may determine the interference 215-*b* based on one or more of the main lobe 205-*b* or at least one side lobe 210 (e.g., the side lobe 210-*c* or the side lobe 210-*d*). In some examples, if the interference 215-*b* is at the base station 105-*b*, the base station 105-*b* can determine the interference 215-*b* based on differences between downlink and uplink rates normalized for transmit power and antenna subarray gain differentials. In various examples, if the interference 215-*b* is at the base station 105-*b*, the base station 105-*b* can determine the interference 215-*b* based on differences between downlink and uplink spectral efficiencies normalized for transmit power and antenna subarray gain differentials.

The base station 105-b may also determine one or more slot format indicators for the UEs 115 (e.g., the UE 115-e, the UE 115-f, and the UE 115-g) in a cell of the base station 105-b, their location estimates, neighborhood around each UE 115 and their transmission/reception status, based on this information the base station 105-b can determine which UE 115 is causing the interference 215-b. As such, the base station 105-b may recommend a beam switching at the UE 115-d with a different antenna module so that the interference 215-b causing edge beams are avoided. The base station 105-b may also indicate which specific transmissions from the UE 115-d is causing the interference 215-b, for example, based on a subframe number indicator, a slot format indicator, etc.

In some examples, if the UE 115-d has a relatively better antenna module capability and a relatively good signal strength quality (e.g., RSRP, SINR) associated with a non-edge directional beam in a different antenna module, the UE 115-d can switch directional beams or TCI states at the base station 105-b to an alternate directional beam candidate. For example, the UE 115-d may receive a beam report from the base station 105-b including an indication of one or more of a measured main lobe 205-b or at least one measured side lobe 210 associated with beamformed transmission from the UE 115-d causing interference the UE 115-f or the base station 105-b. The UE 115-d may modify a directional beam associated with the beamformed transmission causing the interference 215-b at the UE 115-f or the base station 105-b. For example, the UE 115-d may determine UE capability information and select a different antenna subarray based on the UE capability information. As such, the UE 115-d may switch from one directional beam to another directional beam associated with the selected antenna subarray to reduce or eliminate the interference 215-b at the UE 115-f or the base station 105-b. The UE 115-d may also determine an RSRP or an SINR, or both, associated with the switched directional beam. The UE 115-f or the base station 105-b can also measure the interference 215-b change and determine if this directional beam switch satisfies a threshold (e.g., signal strength threshold).

In some examples, if the UE 115-d does not have a relatively good antenna module capability, the UE 115-d can perform some form of beam shaping to address interference constraints (trades off effective, or equivalent, isotropically radiated power (EIRP) for interference reduction). Alternatively, if the UE 115-d does not want to lose the EIRP for uplink beamformed transmissions and has no good antenna module capability, the UE 115-d may request better scheduling from the base station 105-b to avoid the interference 215-b or other interfering downlink or uplink UEs 115 as the UE 115-d performs beamformed communications. In some examples, the UE 115-d may adjust one or more beamforming weights corresponding to phase shifter or amplitude control configurations associated with a directional beam associated with the main lobe 205 and the side lobes 210. The UE 115-d can also choose not to use an indicated directional beam that is causing the interference 215-b problems by restricting its usage (e.g., by restricting L1-RSRP measurements on the corresponding downlink directional beam).

Figure 3:
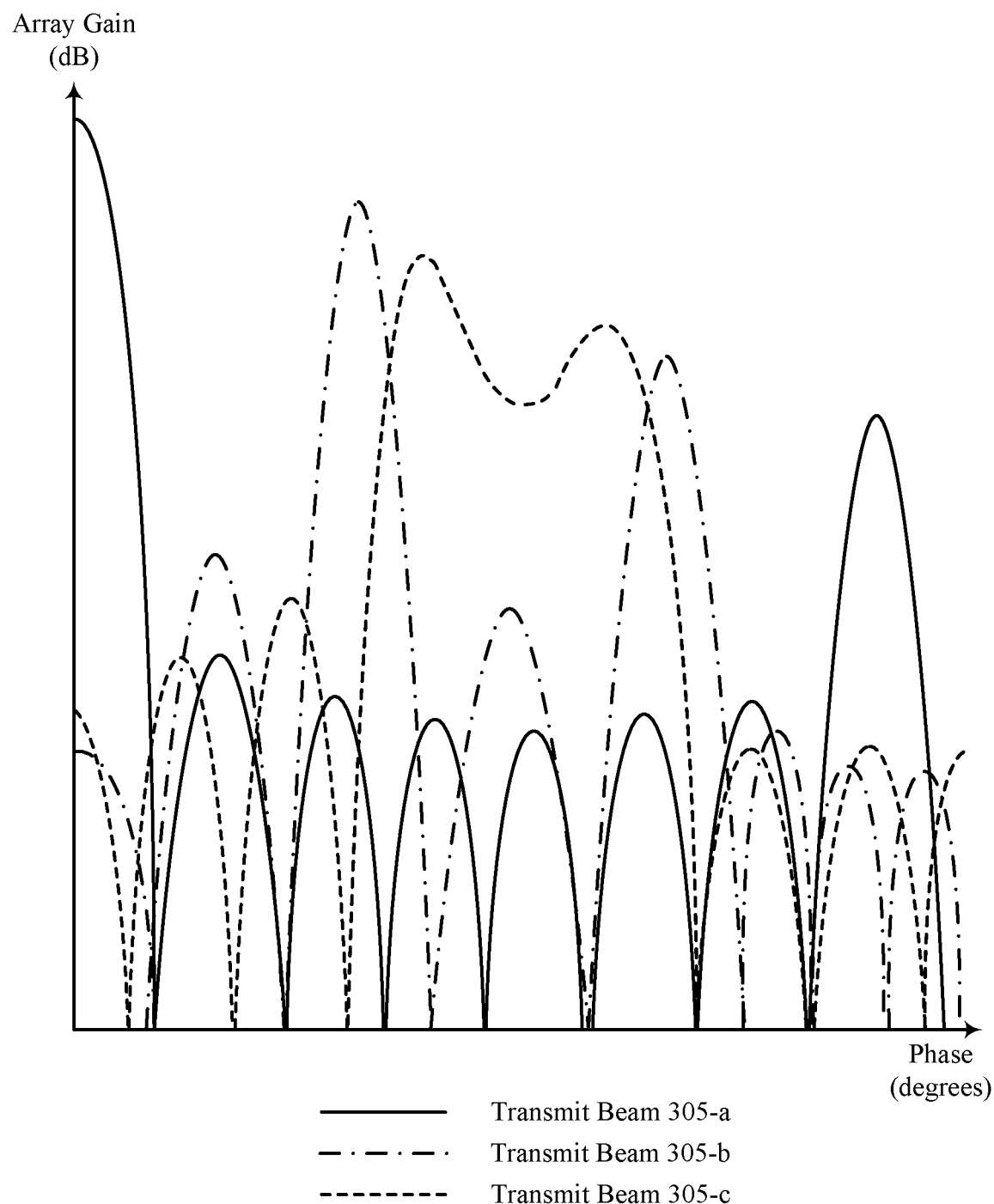
FIG. 3 illustrates an example of an antenna subarray gains that supports techniques for beam switching and enhanced beam reporting to mitigate interference in beamforming in accordance with aspects of the present disclosure.

FIG. 3 illustrates an example of an antenna subarray gains 300 that supports techniques for beam switching and enhanced beam reporting to mitigate interference in beamforming in accordance with aspects of the present disclosure. In some examples, the antenna subarray gains 300 may implement aspects of the wireless communications systems 100, 200-a, and 200-b as described with reference to FIGS. 1, 2A, and 2B. The antenna subarray gains 300 may represent different antenna subarray gains for different directional beams 305 of a UE 115. In some examples, the directional beams 305 may be transmit directional beams. In various examples, the directional beams 305 may be receive directional beams. The directional beams 305 may represent a same directional beam of the UE 115 transmitted at different angles. For example, a directional beam 305-a may correspond to a beamformed transmission in a boresight direction (e.g., at a 0° angle relative to an antenna subarray). A directional beam 305-b may correspond to a beamformed transmission at 45° from the boresight direction, and a directional beam 305-c may correspond to a beamformed transmission at 60° from the boresight direction. In some examples, the UE 115 may operate at 60 GHz. It is noted that the antenna subarray gains 300 is a non-limiting example of an antenna subarray gain, and other antenna subarray gains are possible.

The directional beams 305 may include a main lobe and one or more side lobes. In some examples, a side lobe of the one or more side lobes may be a strongest side lobe (e.g., have a highest subarray gain relative to the remaining side lobes). By way of example, the directional beam 305-a includes a main lobe centered at 0°, the directional beam 305-b includes a main lobe centered at 45°, and the directional beam 305-c includes a main lobe centered at 60°. Additionally, the directional beam 305-a includes multiple side lobes with a strongest side lobe centered near 180°, the directional beam 305-b includes multiple side lobes with a strongest side lobe centered near 135°, and the directional beam 305-c includes multiple side lobes with a strongest side lobe centered near 120°.

Steering the directional beams 305 over different directions may change characteristics of a respective main lobe and one or more respective side lobes or grating lobes. For example, the main lobe of the directional beam 305-a may have a higher peak gain than the main lobes of the directional beams 305-b and 305-c, and the main lobe of the directional beam 305-b may have a higher peak gain than the main lobe of the directional beam 305-c. Additionally, steering the directional beams 305 may cause side lobes to shift in angle and vary in amplitude. For example, the strongest side lobe of the directional beam 305-b may shift in angle closer to the main lobe and increase in amplitude compared to the strongest side lobe of the directional beam 305-a. The strongest side lobe of the directional beam 305-c may shift in angle closer to the main lobe and increase in amplitude compared to the strongest side lobes of the directional beam 305-a and the directional beam 305-b. In some cases, the strongest side lobe of the directional beam 305-c may shift in angle such that it partially overlaps with the main lobe of the directional beam 305-c.

The side lobes of the directional beams 305 may cause interference at wireless devices nearby to the UE 115. In some cases, a likelihood that the side lobes may cause interference may increase as the main lobe is steered away from the boresight direction (e.g., to angles greater than 0°). For example, a likelihood that the side lobes of the directional beam 305-b may cause interference may be greater than a likelihood that the side lobes of the directional beam 305-a may cause interference. Additionally, a likelihood that the side lobes of the directional beam 305-c may cause interference may be greater than the likelihood of the directional beam 305-a and the likelihood of the directional beam 305-b. Thus, the UE 115 may be configured to perform directional beam switching or directional beam shaping based on the likelihood that one or more of the side lobes of a directional beam 305 will cause interference.

Figure 4:
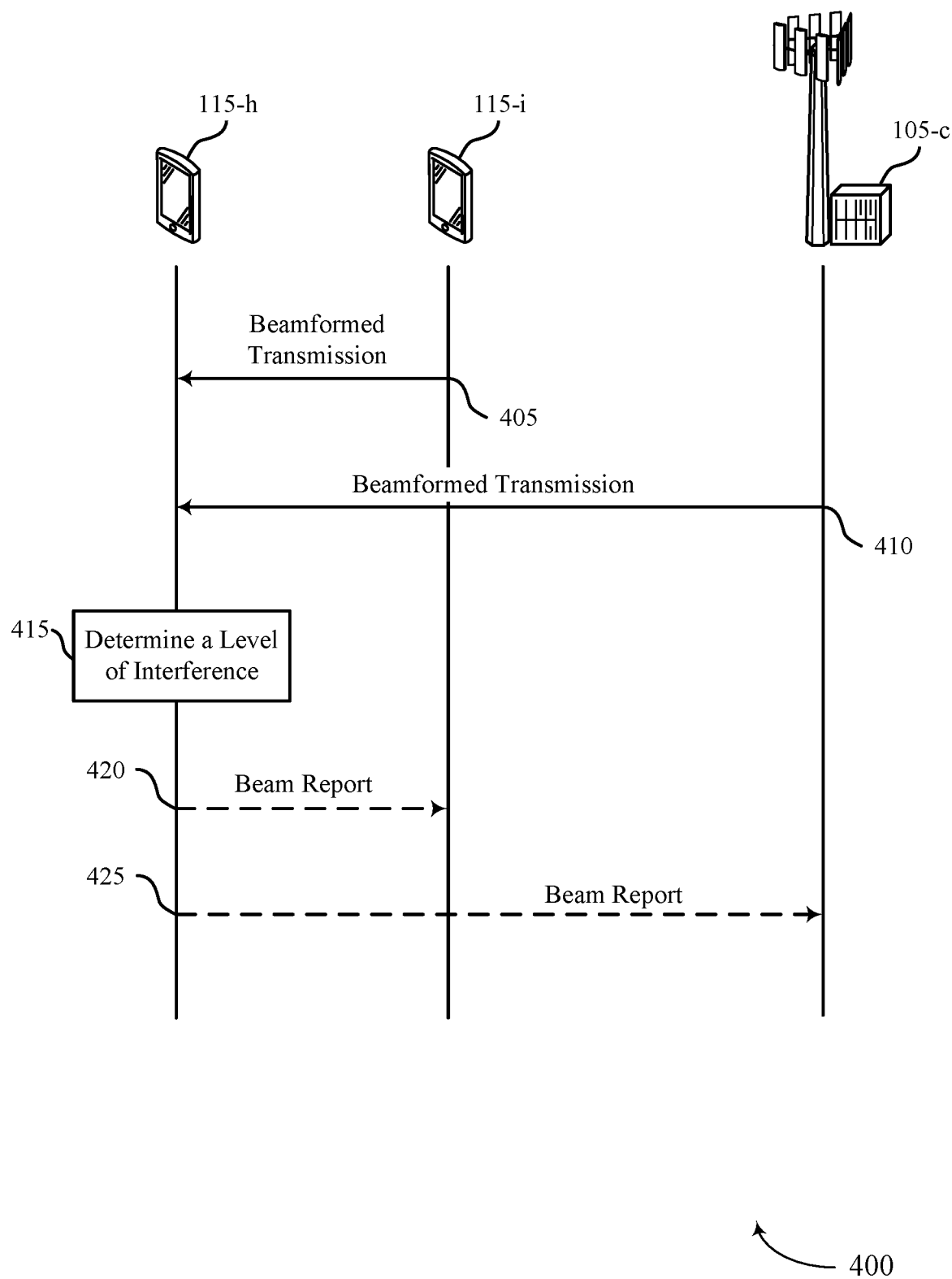
FIGS. 4 through 6 illustrate examples of process flows that support techniques for beam switching and enhanced beam reporting to mitigate interference in beamforming in accordance with aspects of the present disclosure.

FIG. 4 illustrates an example of a process flow 400 that supports techniques for beam switching and enhanced beam reporting to mitigate interference in beamforming in accordance with aspects of the present disclosure. The process flow 400 may implement aspects of the wireless communications system 100 described with reference to FIG. 1, respectively. The process flow 400 may be based on a configuration by a base station 105-c, and implemented by a UE 115-h or a UE 115-i, or both, to promote power saving for the UEs 115-h, 115-i by supporting directional beam side lobe interference mitigation operations. The process flow 400 may be based on a configuration by a base station 105-c, and implemented by the UEs 115-h, 115-i to achieve higher reliability and lower latency beamformed transmissions for the UEs 115-h, 115-i by supporting directional beam side lobe interference mitigation operations, among other benefits.

The base station 105-c and the UEs 115-h, UE 115-i may be examples of a base station 105 and a UE 115, as described herein. In the following description of the process flow 400, the operations between the base station 105 and the UEs 115-h, UE 115-i may be transmitted in a different order than the example order shown, or the operations performed by the base station 105 and the UEs 115-h, UE 115-i may be performed in different orders or at different times. Some operations may also be omitted from the process flow 400, and other operations may be added to the process flow 400.

In the example of FIG. 4, the base station 105-c and the UEs 115-h, UE 115-i may support beamformed communications. The base station 105-c and the UEs 115-h, UE 115-i may be configured with multiple antennas, which may be used to employ various techniques such as transmit diversity, receive diversity, MIMO communications, or beamforming, or any combination thereof. The antennas of the base station 105-c and the UEs 115-h, UE 115-i may be located within one or more antenna subarrays or antenna panels, which may support MIMO operations or transmit or receive beamforming. The base station 105-c may have an antenna subarray with a number of rows and columns of antenna ports that the base station 105-c may use to support beamforming of communications with the UEs 115-h, UE 115-i.

The UEs 115-h, UE 115-i may have one or more antenna subarrays that may support various beamforming operations. The base station 105-c and the UEs 115-h, UE 115-i may thus be configured to support beamformed communications (e.g., downlink and uplink beamformed transmissions) via directional beams using the multiple antennas. A directional beam may have a radiation pattern including a main lobe and one or more side lobes. In some cases, beamformed communications from or to the base station 105-c and the UEs 115-h, UE 115-i may result in side lobes that cause interference at one or more of the base station 105-c and the UEs 115-h, UE 115-i. The interference due to large side lobes may, in some examples, degrade a reliability of beamformed communications for one or more of the base station 105-c and the UEs 115-h, UE 115-i.

The base station 105-c may perform a connection procedure with the UEs 115-h, UE 115-i. For example, the base station 105-c and the UEs 115-h, UE 115-i may perform a random access procedure to establish a connection for beamformed communications. In other examples, the base station 105-c and the UEs 115-h, UE 115-i may perform a random access procedure to reestablish a connection after an issue, such as connection failure, with the base station 105-c, or the like. In the example of FIG. 4, the connection procedure may include a beam training procedure in which the base station 105-c and the UEs 115-h, UE 115-i may establish a communication link (e.g., for downlink beamformed communications and uplink beamforming communications). The base station 105-c and the UEs 115-h, UE 115-i may also support multiple RATs including 4G systems such as LTE systems, LTE-A systems, or LTE-A Pro systems, and 5G systems which may be referred to as NR systems. The connection procedure (e.g., random access procedure) between the base station 105-c and the UEs 115-h, UE 115-i may correspond to, for example, at least one of the above example RATs.

At 405, the UE 115-i may transmit a beamformed transmission to the UE 115-h. For example, the UE 115-i may transmit uplink control information or data. In some examples, the UE 115-i may transmit a beamformed transmission carrying uplink control information or data on a PUCCH or a PUSCH. At 410, the base station 105-c may transmit a beamformed transmission to the UE 115-h. For example, the base station 105-c may transmit downlink control information or data. In some examples, the base station 105-c may transmit a beamformed transmission carrying downlink control information or data on a PDCCH or a PDSCH.

At 415, the UE 115-h may determine a level of interference, for example, based on the beamformed transmission from the UE 115-i. For example, the UE 115-h may measure one or more of a main lobe or at least one side lobe associated with a directional beam of the beamformed transmission from the UE 115-i. The UE 115-h may determine the level of interference at the UE 115-h based on the measurement of the main lobe or the at least one side lobe associated with the directional beam of the beamformed transmission from the UE 115-i. As a result, the UE 115-h may determine that one or more of the main lobe or the at least one side lobe may be causing interference to the beamformed transmission from the base station 105-c.

Additionally, or alternatively, the UE 115-h may determine a signal strength metric based on the beamformed transmission from the UE 115-i and the beamformed transmission from the base station 105-c, and determine the level of interference at the UE 115-h based on the determined strength metric. For example, the UE 115-h may determine an SINR based on the beamformed transmission from the UE 115-i and the beamformed transmission from the base station 105-c, and determine the level of interference at the UE 115-h based on the determined SINR. In some examples, the UE 115-h may determine an RSRP based on the beamformed transmission from the UE 115-i and the beamformed transmission from the base station 105-c, and determine the level of interference at the UE 115-h based on the determined RSRP. In some examples, the UE 115-h may adjust an RSRP based on the at least one side lobe associated with the directional beam of the beamformed transmission from the UE 115-i.

In various examples, the UE 115-h may determine an RSRQ based on the beamformed transmission from the UE 115-i and the beamformed transmission from the base station 105-c, and determine the level of interference at the UE 115-h based on the determined RSRQ. In other examples, the UE 115-h may determine an RSSI based on the beamformed transmission from the UE 115-i and the beamformed transmission from the base station 105-c, and determine the level of interference at the UE 115-h based on the determined RSSI. The RSSI may indicate an estimated power level that the UE 115-h is receiving from the UE 115-i or the base station 105-*c*. The UE 115-*h* may also determine an SSB associated with the beamformed transmission from the base station 105-*c* based on the at least one side lobe associated with the directional beam of the beamformed transmission from the UE 115-*i*.

At 420, the UE 115-*h* may transmit a beam report to the UE 115-*i*. In some examples, the UE 115-*i* may modify a directional beam associated with the beamformed transmission causing the interference at the UE 115-*h* based on the beam report received from the UE 115-*h*. The beam report may include beam lobe interference measurements (e.g., main lobe measurements, side lobe measurements). Additionally, the beam report may include L1-RSRP measurements, L1-SINR measurements, etc. As such, the beam report may indicate that the UE 115-*h* is performing beam lobe measurements. At 425, the UE 115-*h* may additionally, or alternatively, transmit a beam report to the base station 105-*c*.

Figure 5:
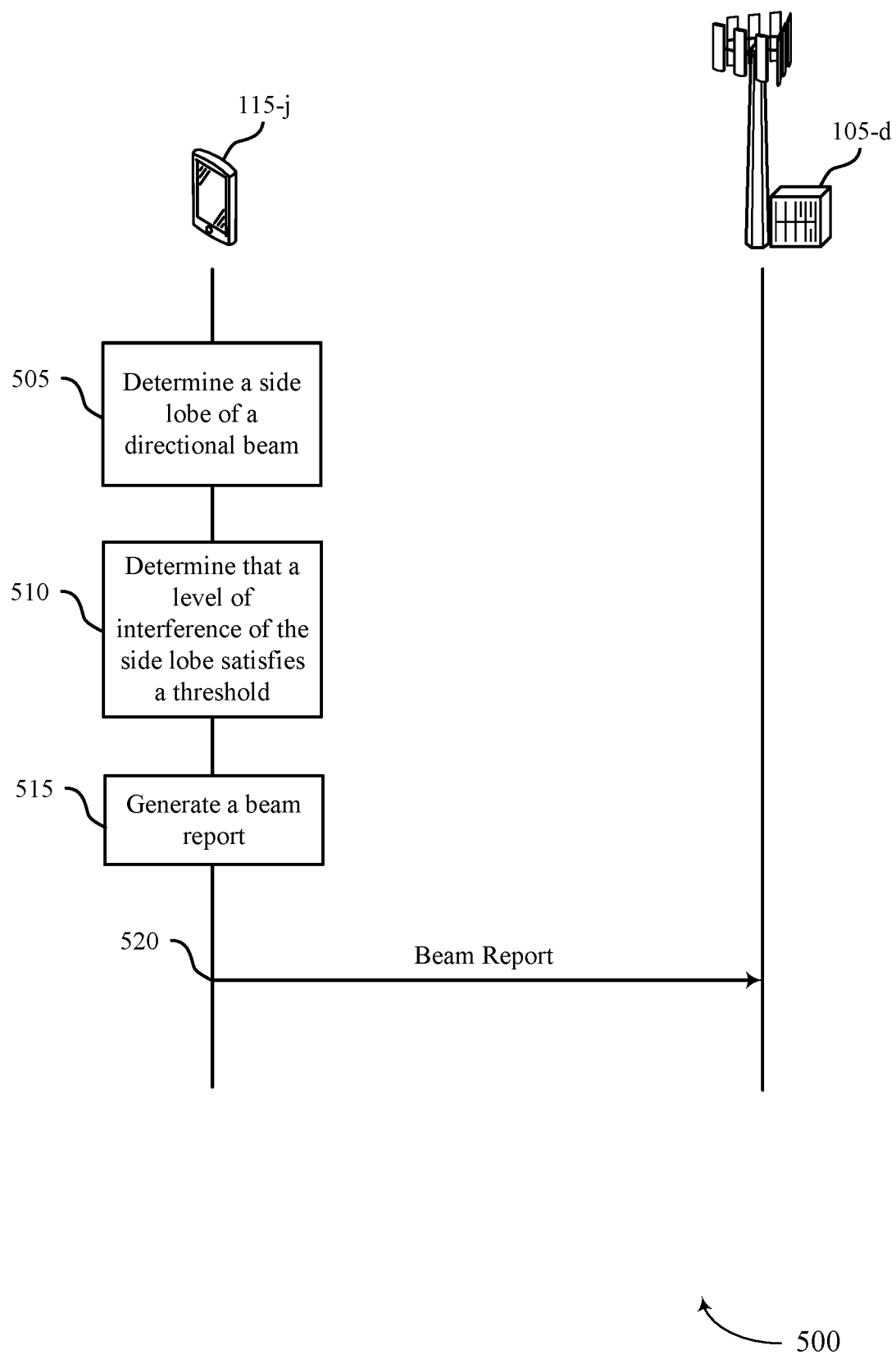

FIG. 5 illustrates an example of a process flow 500 that supports techniques for beam switching and enhanced beam reporting to mitigate interference in beamforming in accordance with aspects of the present disclosure. In some examples, the process flow 500 may implement aspects of the wireless communications system 100 and the wireless communications system 200 as described with reference to FIGS. 1 and 2, respectively. The process flow 500 may be based on a configuration by a base station 105-*d*, and implemented by a UE 115-*j* to promote power saving for the UE 115-*j* by supporting directional beam side lobe interference mitigation operations. The process flow 500 may be based on a configuration by a base station 105-*d*, and implemented by the UE 115-*j* to achieve higher reliability and lower latency beamformed transmissions for the UE 115-*j* by supporting directional beam side lobe interference mitigation operations, among other benefits.

The base station 105-*d* and the UE 115-*j* may be examples of a base station 105 and a UE 115, as described herein. In the following description of the process flow 500, the operations between the base station 105-*d* and the UE 115-*j* may be performed in a different order than the example order shown, or the operations performed by the base station 105-*d* and the UE 115-*j* may be performed in different orders or at different times. Some operations may also be omitted from the process flow 500, and other operations may be added to the process flow 500.

In the example of FIG. 5, the base station 105-*d* and the UE 115-*j* may support beamformed communications. The base station 105-*d* and the UE 115-*j* may be configured with multiple antennas, which may be used to employ techniques such as transmit diversity, receive diversity, MIMO communications, or beamforming, or any combination thereof. The antennas of the base station 105-*d* and the UE 115-*j* may be located within one or more antenna subarrays or antenna panels, which may support MIMO operations or transmit or receive beamforming. The base station 105-*d* may have an antenna subarray with a number of rows and columns of antenna ports that the base station 105-*d* may use to support beamforming of communications with the UE 115-*j*.

The UE 115-*j* may have one or more antenna subarrays that may support various beamforming operations. The base station 105-*d* and the UE 115-*j* may thus be configured to support beamformed communications (e.g., downlink and uplink beamformed transmissions) via directional beams using the multiple antennas. A directional beam may have a radiation pattern including a main lobe and one or more side lobes. In some cases, beamformed communications from or to the base station 105-*d* and the UE 115-*j* may result in side lobes that cause interference at one or more of the base station 105-*d* and the UE 115-*j*. The interference due to large side lobes may degrade a reliability of beamformed communications for one or more of the base station 105-*d* and the UE 115-*j*.

To reduce or mitigate interference due to large side lobes, the UE 115-*j* may perform a beam reporting procedure with the base station 105-*d*. At 505, the UE 115-*j* may determine that at least one side lobe of a directional beam causes interference at one or more devices. For example, the UE 115-*j* may determine that the at least one side lobe causes interference at the UE 115-*j*, another UE 115, or the base station 105-*d*, or a combination thereof. In some examples, the UE 115-*j* may determine the interference based on receiving an indication of the interference (e.g., an indication of SINR loss, SNR loss, RSRP loss, RSRQ loss, RSSI loss, or some other signal loss) from the other UE 115, or from the base station 105-*d*, or both. The UE 115-*j* may also determine the interference based on measuring a signal strength loss associated with beamformed communications at the UE 115-*j*.

At 510, the UE 115-*j* may determine that a level of interference of the side lobe satisfies a threshold level of interference. For example, the UE 115-*j* may determine the level of interference based on measuring the signal strength loss associated with beamformed communications at the UE 115-*j*. In some examples, the UE 115-*j* may receive the indication of the interference from the other UE 115, or from the base station 105-*d*, or both, and the indication may indicate at least the level of interference experienced at the other UE 115, or the base station 105-*d*, or both. At 515, the UE 115-*j* may generate a beam report that includes another indication of the interference. In some cases, the UE 115-*j* may generate the beam report based on the level of interference of the side lobe satisfying the threshold level of interference. In some examples, the beam report may include one or more beam candidates different than the first directional beam to use for communications with the base station 105-*d*. At 520, the UE 115-*j* may transmit the beam report to the base station 105-*d*. In some cases, the beam report may be referred to as an enhanced beam report because it carries beam lobe interference measurements (e.g., main lobe measurements of the first directional beam, side lobe measurements of the first directional beam), as well as L1-RSRPs, L1-SINRs, etc.

Figure 6:
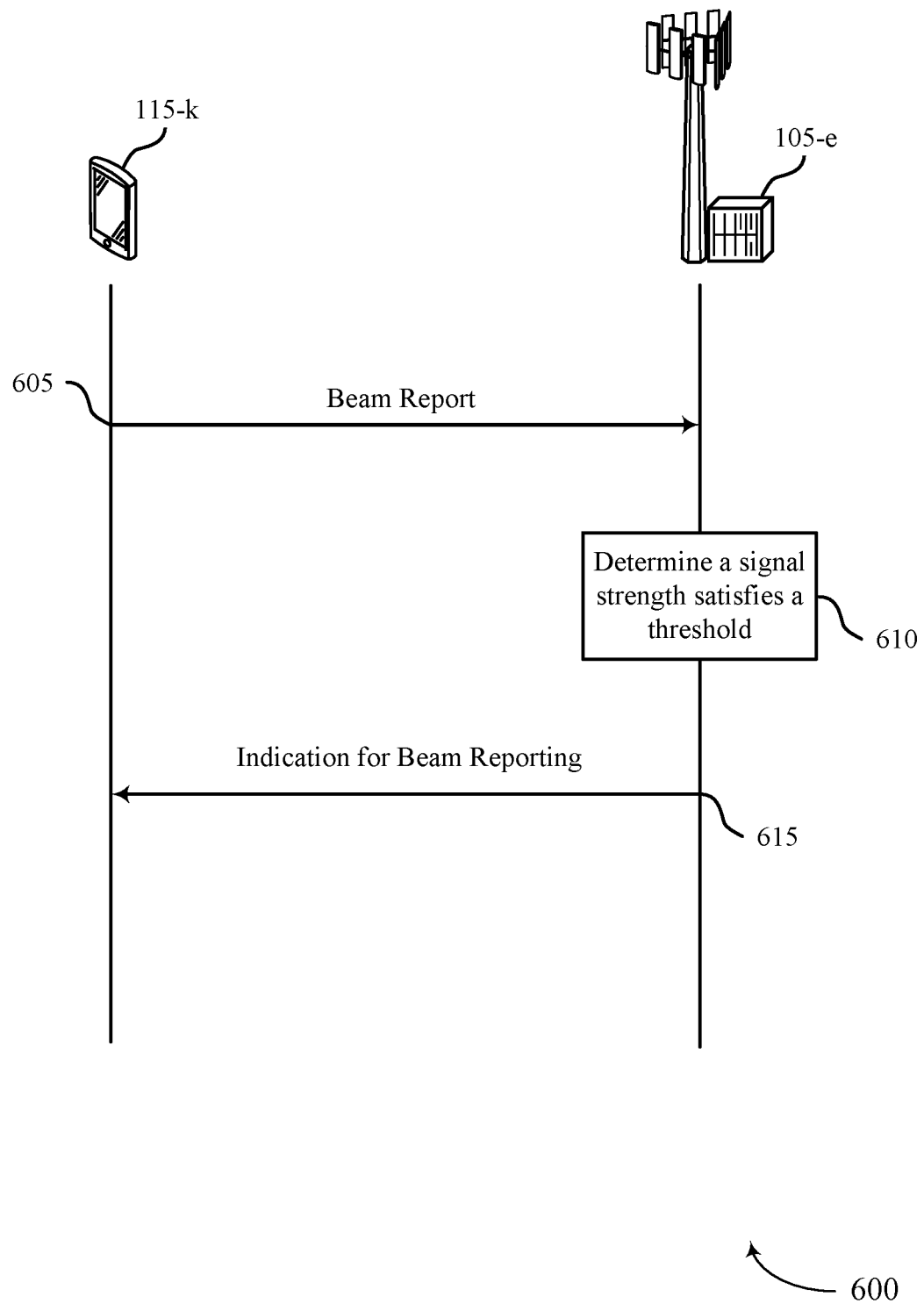

FIG. 6 illustrates an example of a process flow 600 that supports techniques for beam switching and enhanced beam reporting to mitigate interference in beamforming in accordance with aspects of the present disclosure. In some examples, the process flow 600 may implement aspects of the wireless communications system 100 and the wireless communications system 200 as described with reference to FIGS. 1 and 2, respectively. The process flow 600 may be based on a configuration by a base station 105-*e*, and implemented by a UE 115-*k* to promote power saving for the UE 115-*k* by supporting directional beam side lobe interference mitigation operations. The process flow 600 may be based on a configuration by a base station 105-*e*, and implemented by the UE 115-*k* to achieve higher reliability and lower latency beamformed transmissions for the UE 115-*k* by supporting directional beam side lobe interference mitigation operations, among other benefits.

The base station 105-*e* and the UE 115-*k* may be examples of a base station 105 and a UE 115, as described herein. In the following description of the process flow 600, the operations between the base station 105-*e* and the UE 115-*k* may be performed in a different order than the example order shown, or the operations performed by the base station 105-e and the UE 115-k may be performed in different orders or at different times. Some operations may also be omitted from the process flow 600, and other operations may be added to the process flow 600.

In the example of FIG. 6, the base station 105-e and the UE 115-k may support beamformed communications. The base station 105-e and the UE 115-k may be configured with multiple antennas, which may be used to employ techniques such as transmit diversity, receive diversity, MIMO communications, or beamforming, or any combination thereof. The antennas of the base station 105-e and the UE 115-k may be located within one or more antenna subarrays or antenna panels, which may support MIMO operations or transmit or receive beamforming. The base station 105-e may have an antenna subarray with a number of rows and columns of antenna ports that the base station 105-e may use to support beamforming of communications with the UE 115-k.

The UE 115-k may have one or more antenna subarrays that may support various beamforming operations. The base station 105-e and the UE 115-k may thus be configured to support beamformed communications (e.g., downlink and uplink beamformed transmissions) via directional beams using the multiple antennas. A directional beam may have a radiation pattern including a main lobe and one or more side lobes. In some cases, beamformed communications from or to the base station 105-e and the UE 115-k may result in side lobes that cause interference at one or more of the base station 105-e and the UE 115-k. The interference due to large side lobes may degrade a reliability of beamformed communications for one or more of the base station 105-e and the UE 115-k.

To reduce or mitigate interference due to large side lobes, the base station 105-e may trigger the UE 115-k to perform beam reporting. At 605, the UE 115-k may transmit a beam report of a signal strength associated with a beamformed transmission. The beamformed transmission may include at least one side lobe of a directional beam that causes interference. The at least one side lobe may cause interference at the UE 115-k, another UE 115, or the base station 105-e, or a combination thereof. In some cases, the beam report includes an indication of a signal strength loss associated with the beamformed transmission due to the interference caused by the at least one side lobe.

At 610, the base station 105-e may determine that the signal strength associated with the beamformed transmission satisfies a threshold signal strength. For example, the base station 105-e may determine that the signal strength is less than the threshold signal strength and determine that the at least one side lobe causes interference. At 615 the base station 105-e may transmit a message to the UE 115-k including an indication for beam reporting. In some examples, the base station 105-e may transmit the message based on the signal strength satisfying the threshold. The indication for beam reporting may trigger the UE 115-k to perform beam reporting. For example, the UE 115-ke may determine one or more beam candidates different from the first directional beam to use for communications with the base station based on receiving the message.

Figure 7:
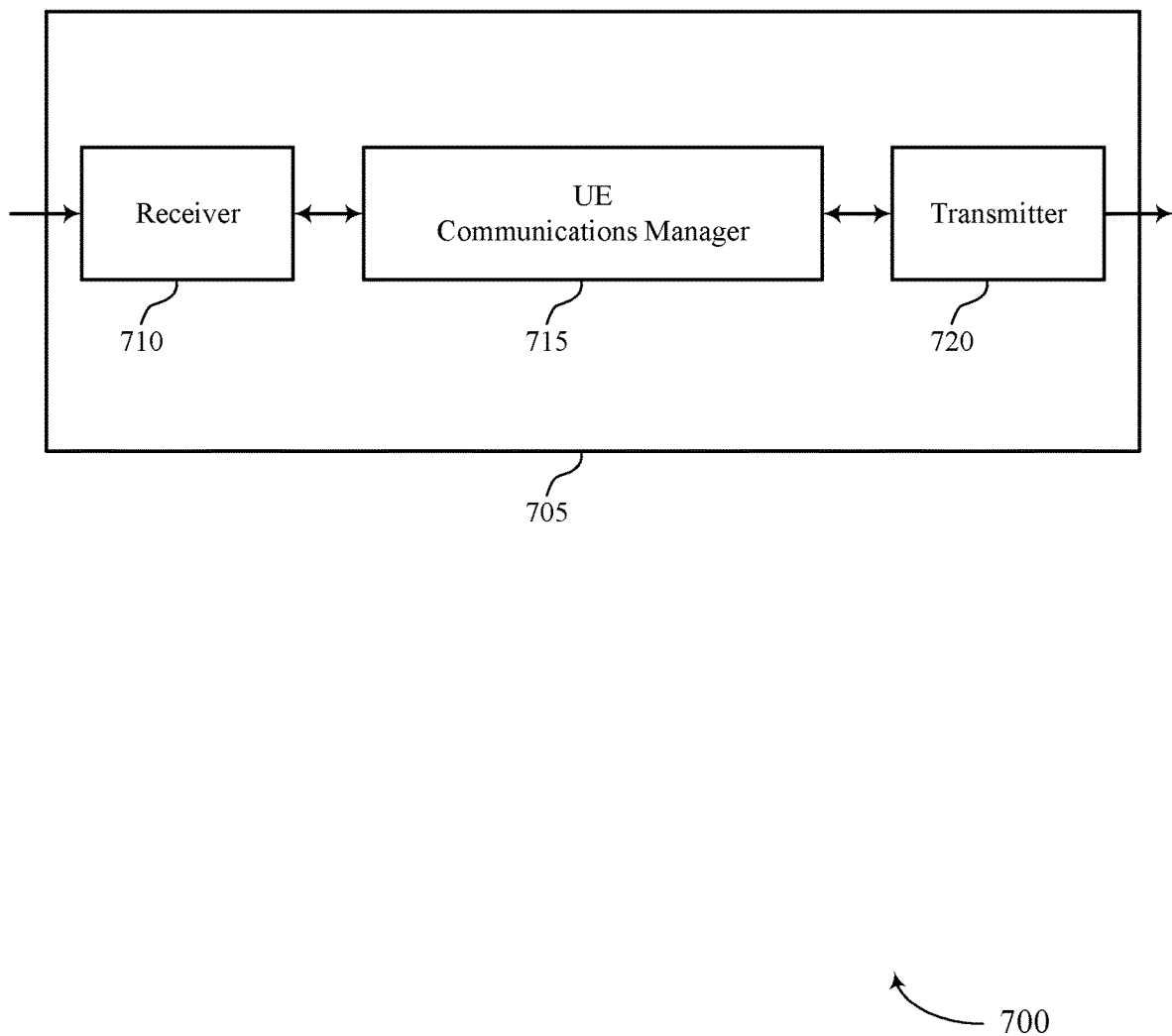
FIGS. 7 and 8 show block diagrams of devices that support techniques for beam switching and enhanced beam reporting to mitigate interference in beamforming in accordance with aspects of the present disclosure.

FIG. 7 shows a block diagram 700 of a device 705 that supports techniques for beam switching and enhanced beam reporting to mitigate interference in beamforming in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for beam switching due to interference from side lobes and enhanced beam reporting to mitigate interference in beamforming, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive a first beamformed transmission associated with a directional beam from a second UE. The UE communications manager 715 may measure one or more of a main lobe or at least one side lobe associated with the directional beam. The UE communications manager 715 may determine a level of interference at the device 705 (e.g., a first UE) based on the measuring, wherein the one or more of the main lobe or the at least one side lobe associated with the directional beam causes interference to a second beamformed transmission associated with another directional beam from a base station, and transmit a beam report including a first indication of the one or more of the main lobe or the at least one side lobe associated with the directional beam causing the interference to the second beamformed transmission associated with the other directional beam from the base station.

The UE communications manager 715 may determine at least one side lobe of a first directional beam of a set of directional beams causing interference at one or more devices, the one or more devices including a base station, the device 705 (e.g., a first UE), or a second UE, or any combination thereof. The UE communications manager 715 may determine that a first level of interference associated with the at least one side lobe of the first directional beam of the set of directional beams causing the interference satisfies a threshold, and generate a beam report including a first indication of the interference based on the first level of interference associated with the at least one side lobe of the first directional beam satisfying the threshold. The UE communications manager 715 may transmit the beam report including the first indication of the interference to the base station.

The UE communications manager 715 may also transmit, to a base station, a set of beamformed transmissions using a first set of uplink directional beams associated with a first set of antenna elements of a first antenna array. The UE communications manager 715 may receive, from the base station, a beam report including an indication of one or more of a measured main lobe or at least one measured side lobe associated with a first directional beam associated with the beamformed transmission from the device 705 (e.g., a first UE) causing interference at a second UE based on the transmitting. The UE communications manager 715 may determine a beamformed transmission of the set of beamformed transmissions from the device 705 (e.g., a first UE) causing the interference at the second UE based on the indication, and modify the first uplink directional beam associated with the beamformed transmission causing the interference at the second UE. The UE communications manager 715 may communicate with the base station based on modifying the first uplink directional beam associated with the beamformed transmission causing the interference at the second UE. The UE communications manager 715 may be an example of aspects of the UE communications manager 1010 described herein.

The UE communications manager 715 may enable the device 705 to provide enhanced beam reporting to mitigate side lobe interference. In some implementations, the UE communications manager 715 may enable the device 705 to determine at least one side lobe of a directional beam of a set of directional beams causes an interference at one or more devices, for example, at a base station, the device 705, or another device (e.g., another UE). Based on implementing the side lobe interference determination, one or more processors of the device 705 (for example, processor(s) controlling or incorporated with the UE communications manager 715) may experience reduce power consumption and promote high reliability and low latency beamformed communications (for example, downlink and uplink beamformed transmissions), among other benefits.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
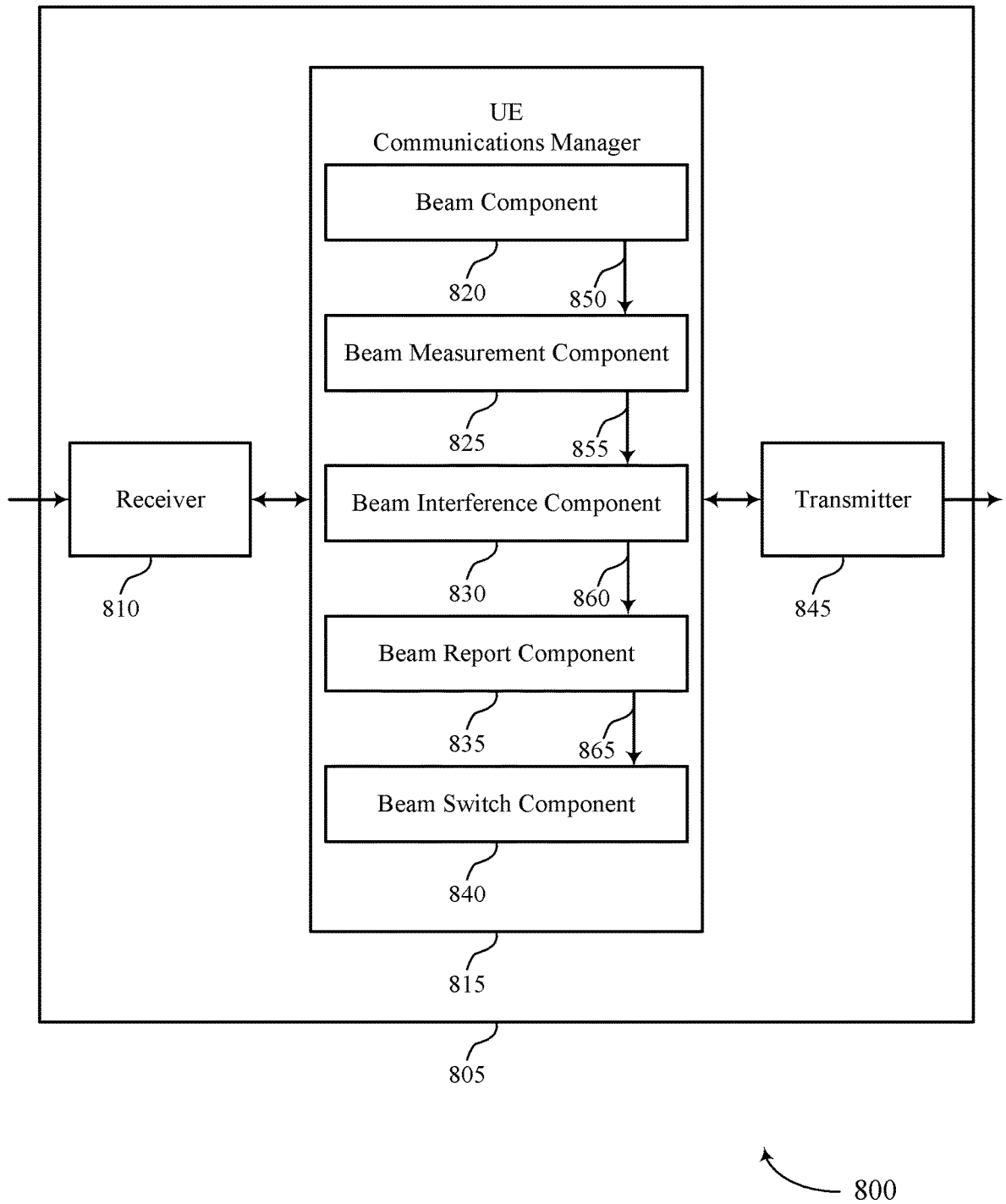

FIG. 8 shows a block diagram 800 of a device 805 that supports techniques for beam switching and enhanced beam reporting to mitigate interference in beamforming in accordance with aspects of the present disclosure. The device 805 may be an example of aspects of a device 705, or a UE 115 as described herein. The device 805 may include a receiver 810, a UE communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to techniques for beam switching due to interference from side lobes and enhanced beam reporting to mitigate interference in beamforming, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a beam component 820, a beam measurement component 825, a beam interference component 830, a beam report component 835, and a beam switch component 840. The UE communications manager 815 may be an example of aspects of the UE communications manager 1010 described herein.

The beam component 820 may receive a first beamformed transmission associated with a directional beam from a second UE. The beam component 820 may send a beam identifier signal 850 to the beam measurement component 825. The beam component 820 may determine at least one side lobe of a first directional beam of a set of directional beams causing interference at one or more devices, the one or more devices including a base station, the first UE, or a second UE, or any combination thereof. The beam measurement component 825 may use the beam identifier signal 850 to trigger the beam measurement component 825 to measure one or more of a main lobe or at least one side lobe associated with the directional beam. The beam measurement component 825 may send a beam measurement signal 855 to the beam interference component 830. The beam measurement signal 855 may carry information, for example, one or more of an RSRP, RSRQ, SINR, RSSI, etc.

The beam interference component 830 may use the beam measurement signal 855 to trigger the beam interference component 830 to determine a level of interference at the device 805 (e.g., a first UE) based on the measuring, wherein the one or more of the main lobe or the at least one side lobe associated with the directional beam causes interference to a second beamformed transmission associated with another directional beam from a base station. The beam interference component 830 may send a beam interference signal 860 to the beam report component 835. The beam interference signal 860 may identify the level of interference at the device 805 (e.g., a first UE). The beam interference component 830 may use the beam interference signal 860 to determine that a first level of interference associated with the at least one side lobe of the first directional beam of the set of directional beams causing the interference satisfies a threshold. The beam report component 835 may use the beam interference signal 860 to trigger the beam report component 835 to transmit a beam report including a first indication of the one or more of the main lobe or the at least one side lobe associated with the directional beam causing the interference to the second beamformed transmission associated with the other directional beam from the base station. The beam interference component 830 may send the beam interference signal 860 to the beam report component 835. The beam interference signal 860 may carry information, for example, a signal strength measurement such as an RSRP, RSRQ, SNR, SINR, RSSI, etc. The beam interference signal 860 may trigger the beam report component 835 to generate a beam report including a first indication of the interference based on the first level of interference associated with the at least one side lobe of the first directional beam satisfying the threshold. The beam report component 835 may transmit the beam report including the first indication of the interference to the base station.

The beam component 820 may transmit, to a base station, a set of beamformed transmissions using a first set of uplink directional beams associated with a first set of antenna elements of a first antenna array. The beam component 820 may send a beam identifier signal 850 to the beam report component 835. The beam report component 835 may use the beam identifier signal 850 to receive, from the base station, a beam report including an indication of one or more of a measured main lobe or at least one measured side lobe associated with a first directional beam associated with the beamformed transmission from the device 805 (e.g., a first UE) causing interference at a second UE based on the transmitting. The beam report component 835 may send a beam report signal 865 to the beam interference component 830 to trigger the beam interference component 830 to determine a beamformed transmission of the set of beamformed transmissions from the device 805 (e.g., a first UE) causing the interference at the second UE based on the indication. the beam interference component 830 may send the beam interference signal 860 to the beam switch component 840 to trigger the beam switch component 840 to modify the first uplink directional beam associated with the beamformed transmission causing the interference at the second UE and communicate with the base station based on modifying the first uplink directional beam associated with the beamformed transmission causing the interference at the second UE.

The transmitter 845 may transmit signals generated by other components of the device 805. In some examples, the transmitter 845 may be collocated with a receiver 810 in a transceiver component. For example, the transmitter 845 may be an example of aspects of the transceiver 1020 described with reference to FIG. 10. The transmitter 845 may utilize a single antenna or a set of antennas.

Figure 9:
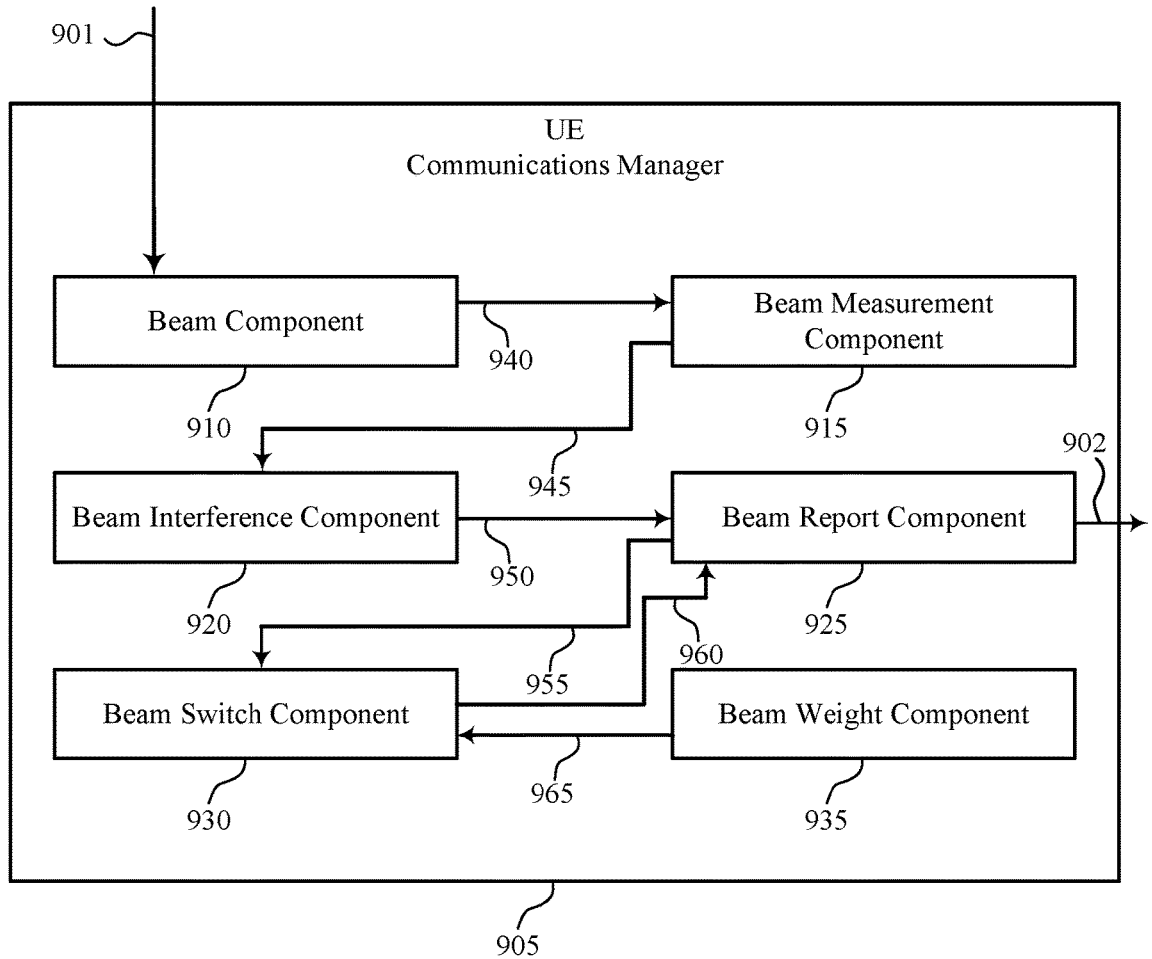
FIG. 9 shows a block diagram of a communications manager that supports techniques for beam switching and enhanced beam reporting to mitigate interference in beamforming in accordance with aspects of the present disclosure.

FIG. 9 shows a block diagram 900 of a UE communications manager 905 that supports techniques for beam switching and enhanced beam reporting to mitigate interference in beamforming in accordance with aspects of the present disclosure. The UE communications manager 905 may be an example of aspects of a UE communications manager 715, a UE communications manager 815, or a UE communications manager 1010 described herein. The UE communications manager 905 may include a beam component 910, a beam measurement component 915, a beam interference component 920, a beam report component 925, a beam switch component 930, and a beam weight component 935. Each of these components may communicate, directly or indirectly, with one another (e.g., via one or more buses).

The beam component 910 may receive a beam configuration 901 for beam switching and enhanced beam reporting to mitigate interference in beamforming. For example, the beam component 910 may obtain the beam configuration 901 via receiver 810. The beam component 910 may receive a first beamformed transmission associated with a directional beam from a second UE. In some examples, the beam component 910 may transmit, to a base station, a set of beamformed transmissions using a first set of uplink directional beams associated with a first set of antenna elements of a first antenna array. The beam component 910 may transmit, to the base station, a request to schedule a second set of uplink directional beams associated with a second set of antenna elements of a second antenna array based on the first UE causing interference at the second UE, the second set of uplink directional beams corresponding to a different slot format. In some examples, the beam component 910 may communicate with the base station using the second set of uplink directional beams associated with the second set of antenna elements of the second antenna array.

The beam component 910 may determine at least one side lobe of a first directional beam of a set of directional beams causing interference at one or more devices, the one or more devices including a base station, a first UE, or a second UE, or any combination thereof. In some examples, the beam component 910 may receive, from the second UE, a second indication of the at least one side lobe associated with the first directional beam of the set of directional beams causing the interference. In some examples, the beam component 910 may receive the second indication based on the at least one side lobe associated with the first directional beam of the set of directional beams causing the interference over a threshold number of slots. The beam component 910 may determine a second directional beam of the set of directional beams to use for wireless communications based on the at least one side lobe associated with the first directional beam of the set of directional beams causing the interference at the one or more devices. In some examples, the beam component 910 may generate the beam report including a second indication of the second directional beam of the set of directional beams to use for the wireless communications.

The beam component 910 may transmit, to the base station, a second indication indicating to the base station to refrain from beam reporting on a downlink directional beam associated with the first uplink directional beam. In some examples, the beam component 910 may establish a wireless link between the first UE and the base station based on a beam training procedure, where communicating with the base station is based on the established wireless link. The beam component 910 may send a beam identifier signal 940 (e.g., via one or more buses) to the beam measurement component 915, which may identify a directional beam of a set of directional beams, or each directional beam of the set of directional beams.

The beam measurement component 915 may use the beam identifier signal 940 to trigger the beam measurement component 915 to measure one or more of a main lobe or at least one side lobe associated with the directional beam. The beam measurement component 915 may determine a signal strength metric based on the first beamformed transmission associated with the directional beam from the second UE and the second beamformed transmission associated with the other directional beam from the base station. The beam measurement component 915 may adjust an RSRP based on the at least one side lobe associated with the directional beam. In some examples, the beam measurement component 915 may transmit a second indication of the adjusted RSRP. The beam measurement component 915 may determine an SSB associated with the other directional beam based on the one or more of the main lobe or the at least one side lobe associated with the directional beam causing the interference to the second beamformed transmission associated with the other directional beam from the base station, the other directional beam corresponding to a direction of the first beamformed transmission causing the interference to the second beamformed transmission. The beam measurement component 915 may transmit a second indication of the SSB corresponding to the direction of the first beamformed transmission causing the interference to the second beamformed transmission.

The beam measurement component 915 may determine that an SINR associated with the second uplink directional beam satisfies a threshold. In some examples, the beam measurement component 915 may switch from the first uplink directional beam to the second uplink directional beam associated with the second antenna array based on determining that the SINR associated with the second uplink directional beam satisfies the threshold. In some examples, the beam measurement component 915 may determine an RSRP associated with the second uplink directional beam. The beam measurement component 915 may determine that an RSRP associated with the second uplink directional beam satisfies a threshold. In some cases, the signal strength metric includes an SINR, an RSRP, an RSRQ, an RSSI, or a combination thereof. The beam measurement component 915 may send a beam measurement signal 945 (e.g., via one or more buses) to the beam interference component 920. The beam measurement signal 945 may carry information, for example, one or more of an RSRP, RSRQ, SINR, RSSI, etc. The beam measurement component 915 may send a beam measurement signal 945 (e.g., via one or more buses) to the beam interference component 920, which may indicate the at least one side lobe of the first directional beam causing the interference.

The beam interference component 920 may use the beam measurement signal 945 to determine a level of interference at the first UE based on the measuring, wherein the one or more of the main lobe or the at least one side lobe associated with the directional beam causes interference to a second beamformed transmission associated with another directional beam from a base station. In some examples, the beam interference component 920 may determine a beamformed transmission of the set of beamformed transmissions from the first UE causing the interference at the second UE based on the indication. The beam interference component 920 may determine the level of interference at the first UE based on determining the signal strength metric. In some examples, the beam interference component 920 may transmit a second indication of the SINR. The beam interference component 920 may determine that the interference at the second UE satisfies a threshold based on switching from the first uplink directional beam to the second uplink directional beam. In some examples, the beam interference component 920 may communicate with the base station based on determining that the interference at the second UE satisfies the threshold.

The beam interference component 920 may use the beam measurement signal 945 to determine that a first level of interference associated with the at least one side lobe of the first directional beam of the set of directional beams causing the interference satisfies a threshold. In some examples, the beam interference component 920 may determine a set of serving cell SSB measurements associated with the base station or a second base station. In some examples, the beam interference component 920 may generate a second indication of the set of serving cell SSB measurements. The beam interference component 920 may receive a third indication of an SINR from the second UE. In some examples, the beam interference component 920 may determine the set of serving cell SSB measurements associated with the base station or the second base station based on the third indication of the SINR from the second UE. In some cases, the threshold includes a signal strength threshold configured by the one or more devices. The beam interference component 920 may send a beam interference signal 950 (e.g., via one or more buses) to the beam report component 925. The beam interference signal 950 may carry information, for example, a signal strength measurement such as an RSRP, RSRQ, SNR, SINR, RSSI, etc.

The beam interference component 920 may send a beam interference signal 950 (e.g., via one or more buses) to the beam report component 925. The beam interference signal 950 may identify the determined level of interference of a directional beam, along with other beam information (e.g., a beam index, beam identifier, a beam shape, a beam orientation, etc.). The beam report component 925 may use the beam interference signal 950 to trigger the beam report component 925 to transmit a beam report including a first indication of the one or more of the main lobe or the at least one side lobe associated with the directional beam causing the interference to the second beamformed transmission associated with the other directional beam from the base station. In some examples, the beam report component 925 may receive, from the base station, a beam report including an indication of one or more of a measured main lobe or at least one measured side lobe associated with a first directional beam associated with the beamformed transmission from the first UE causing interference at a second UE based on the transmitting.

The beam report component 925 may receive a subframe number or symbol indication. In some examples, the beam report component 925 may determine the beamformed transmission of the set of beamformed transmissions from the first UE causes the interference at the second UE based on the subframe number or symbol indication corresponding to the beamformed transmission. The beam report component 925 may receive a slot format indication. In some examples, the beam report component 925 may determine the beamformed transmission of the set of beamformed transmissions from the first UE causes the interference at the second UE based on the slot format indication corresponding to the beamformed transmission. The beam report component 925 may send a beam report signal 955 (e.g., via one or more buses) to the beam switch component 930. The beam report signal 955 may indicate an interference of a main lobe or at least one sidelobe of a directional beam, as well as interference information associated with the main lobe or the at least one sidelobe of the directional beam.

The beam report component 925 may use the beam interference signal 950 to generate a beam report including a first indication of the interference based on the first level of interference associated with the at least one side lobe of the first directional beam satisfying the threshold. In some examples, the beam report component 925 may generate the beam report based on receiving the second indication of the at least one side lobe associated with the first directional beam of the set of directional beams causing the interference from the second UE. The beam report component 925 may transmit the beam report including the first indication of the interference to the base station. The beam report component 925 may transmit a beam report 902 including an indication of one or more of the main lobe or the at least one side lobe associated with the uplink directional beam from the first UE causing interference at one or more of the base station or the second UE to the transmitter 845. The beam report component 925 may send the beam report signal 955 (e.g., via one or more buses) to the beam switch component 930.

The beam switch component 930 may use the beam report signal 955 to trigger the beam switch component 930 to modify the first uplink directional beam associated with the beamformed transmission causing the interference at the second UE. In some examples, the beam switch component 930 may communicate with the base station based on modifying the first uplink directional beam associated with the beamformed transmission causing the interference at the second UE. The beam switch component 930 may determine UE capability information associated with the first UE based on the indication of the first UE causing interference at the second UE. In some examples, the beam switch component 930 may select a second antenna array based on the UE capability information. The beam switch component 930 may switch from the first uplink directional beam to a second uplink directional beam associated with the second antenna array.

The beam switch component 930 may communicate with the base station based on switching from the first uplink directional beam to the second uplink directional beam associated with the second antenna array. In some examples, the beam switch component 930 may switch from the first uplink directional beam to the second uplink directional beam associated with the second antenna array based on determining that the RSRP associated with the second uplink directional beam satisfies the threshold. In some examples, the beam switch component 930 may switch from a first TCI state associated with the first uplink directional beam to a second TCI state associated with the second uplink directional beam.

The beam switch component 930 may use the beam report signal 955 to determine a number of beam switching occasions associated with switching from the first directional beam of the set of directional beams to a second directional beam of the set of directional beams. The first level of interference associated with the first directional beam is different from a second level of interference associated with the second directional beam. In some examples, the beam switch component 930 may generate the beam report based on the number of beam switching occasions. The beam switch component 930 may send a beam switch signal 960 to the beam report component 925. In some example, the beam switch signal 960 may carry information such as the number of beam switching occasions to trigger the beam report component 925 to generate the beam report. The beam switch component 930 may send a beam switch signal 960 (e.g., via one or more buses) to the beam weight component 935. The beam switch signal 960 may indicate information to adjust, generate, or determine beamforming weights of a main lobe or a at least one sidelobe of at least one directional beam. The beam weight component 935 may use the beam switch signal 960 to trigger the beam weight component 935 to adjust one or more beamforming weights corresponding to phase shifter or amplitude control configurations associated with the first uplink directional beam based on UE capability information. In some examples, the beam weight component 935 may communicate with the base station based on adjusting the one or more beamforming weights associated with the first uplink directional beam. In some examples, the beam weight component 935 may adjust one or more beamforming weights corresponding to phase shifter or amplitude control configurations associated with the first uplink directional beam based on the first uplink directional beam causing the interference at the second UE. The beam weight component 935 may send a beam weight signal 965 (e.g., via one or more buses) to the beam switch component 930. The beam weight signal 965 may include information related to beamforming weights of a directional beam including a main lobe or a at least one sidelobe of at least one directional beam.

The beam switch signal 960 may trigger the beam weight component 935 to determine one or more directional beam candidates of the set of directional beams to use for the wireless communications based on the at least one side lobe associated with the first directional beam of the set of directional beams causing the interference at the one or more devices. In some examples, the beam weight component 935 may generate the beam report including a second indication of the one or more directional beam candidates of the set of directional beams to use for the wireless communications. The beam weight component 935 may send a beam weight signal 965 to the beam switch component 960. In some examples, the beam weight signal 965 may carry information, such as the one or more directional beam candidates, to trigger the beam report component 925 to generate the beam report.

Figure 10:
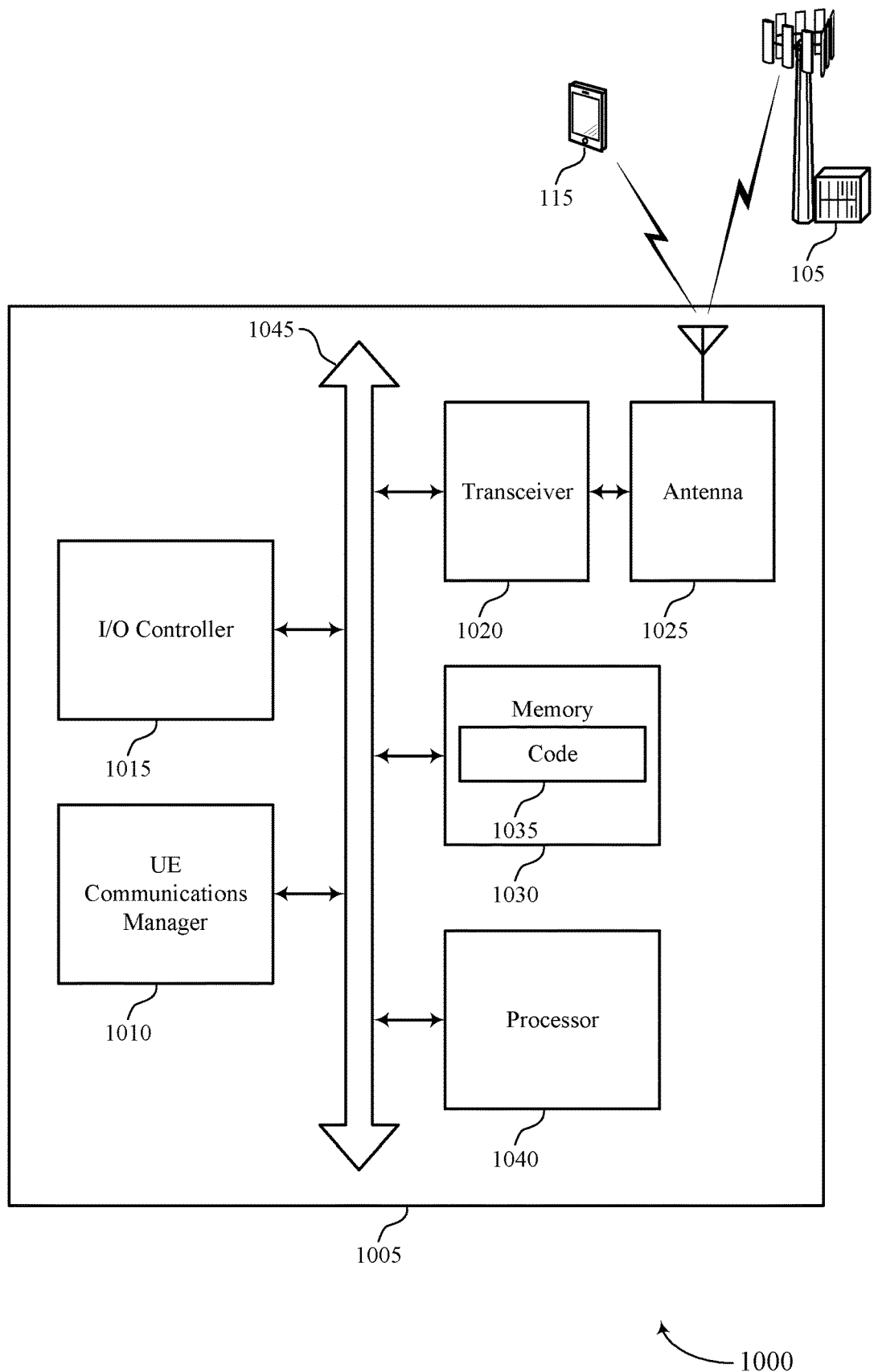
FIG. 10 shows a diagram of a system including a device that supports techniques for beam switching and enhanced beam reporting to mitigate interference in beamforming in accordance with aspects of the present disclosure.

FIG. 10 shows a diagram of a system 1000 including a device 1005 that supports techniques for beam switching and enhanced beam reporting to mitigate interference in beamforming in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive a first beamformed transmission associated with a directional beam from a second device (e.g., a second UE), measure one or more of a main lobe or at least one side lobe associated with the directional beam, and determine a level of interference at the device 1005 based on the measuring, wherein the one or more of the main lobe or the at least one side lobe associated with the directional beam causes interference to a second beamformed transmission associated with another directional beam from a base station. The UE communications manager 1010 may transmit a beam report including a first indication of the one or more of the main lobe or the at least one side lobe associated with the directional beam causing the interference to the second beamformed transmission associated with the other directional beam from the base station.

The UE communications manager 1010 may also transmit, to a base station, a set of beamformed transmissions using a first set of uplink directional beams associated with a first set of antenna elements of a first antenna array. The UE communications manager 1010 may receive, from the base station, a beam report including an indication of one or more of a measured main lobe or at least one measured side lobe associated with a first directional beam associated with the beamformed transmission from the device 1005 causing interference at a second device (e.g., a second UE) based on the transmitting. The UE communications manager 1010 determine a beamformed transmission of the set of beamformed transmissions from the device 1005 causing the interference at the second device (e.g., a second UE) based on the indication. The UE communications manager 1010 modify the first uplink directional beam associated with the beamformed transmission causing the interference at the second device, and communicate with the base station based on modifying the first uplink directional beam associated with the beamformed transmission causing the interference at the second device.

The UE communications manager 1010 may enable the device 1005 to provide enhanced beam reporting to mitigate side lobe interference. In some implementations, the UE communications manager 1010 may enable the device 1005 to determine that at least one side lobe of a directional beam of a set of directional beams causes an interference at one or more devices, for example, at a base station, the device 1005, or another device (e.g., another UE). Based on implementing the side lobe interference determination, one or more processors of the device 1005 (for example, processor (s) controlling or incorporated with the UE communications manager 1010) may experience reduce power consumption and promote high reliability and low latency beamformed communications (for example, downlink and uplink beamformed transmissions), among other benefits.

The UE communications manager 1010 may determine at least one side lobe of a first directional beam of a set of directional beams causing interference at one or more devices. the one or more devices including a base station, the device 1005 (e.g., a first UE), or a second UE, or any combination thereof. The UE communications manager 1010 may determine that a first level of interference associated with the at least one side lobe of the first directional beam of the set of directional beams causing the interference satisfies a threshold, and generate a beam report including a first indication of the interference based on the first level of interference associated with the at least one side lobe of the first directional beam satisfying the threshold. The UE communications manager 1010 may transmit the beam report including the first indication of the interference to the base station.

The UE communications manager 1010 may enable the device 1005 to provide enhanced beam reporting to mitigate side lobe interference. In some implementations, the UE communications manager 1010 may enable the device 1005 to determine that at least one side lobe of a directional beam of a set of directional beams causes an interference at one or more devices, for example, at a base station, the device 1005, or another device (e.g., another UE). Based on implementing the side lobe interference determination, one or more processors of the device 1005 (for example, processor (s) controlling or incorporated with the UE communications manager 1010) may experience reduce power consumption and promote high reliability and low latency beamformed communications (for example, downlink and uplink beamformed transmissions), among other benefits.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor 1040 to perform various functions described herein. In some cases, the memory 1030 may contain, among other things, a basic I/O system (BIOS) which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for beam switching and enhanced beam reporting to mitigate interference in beamforming).

Figure 11:
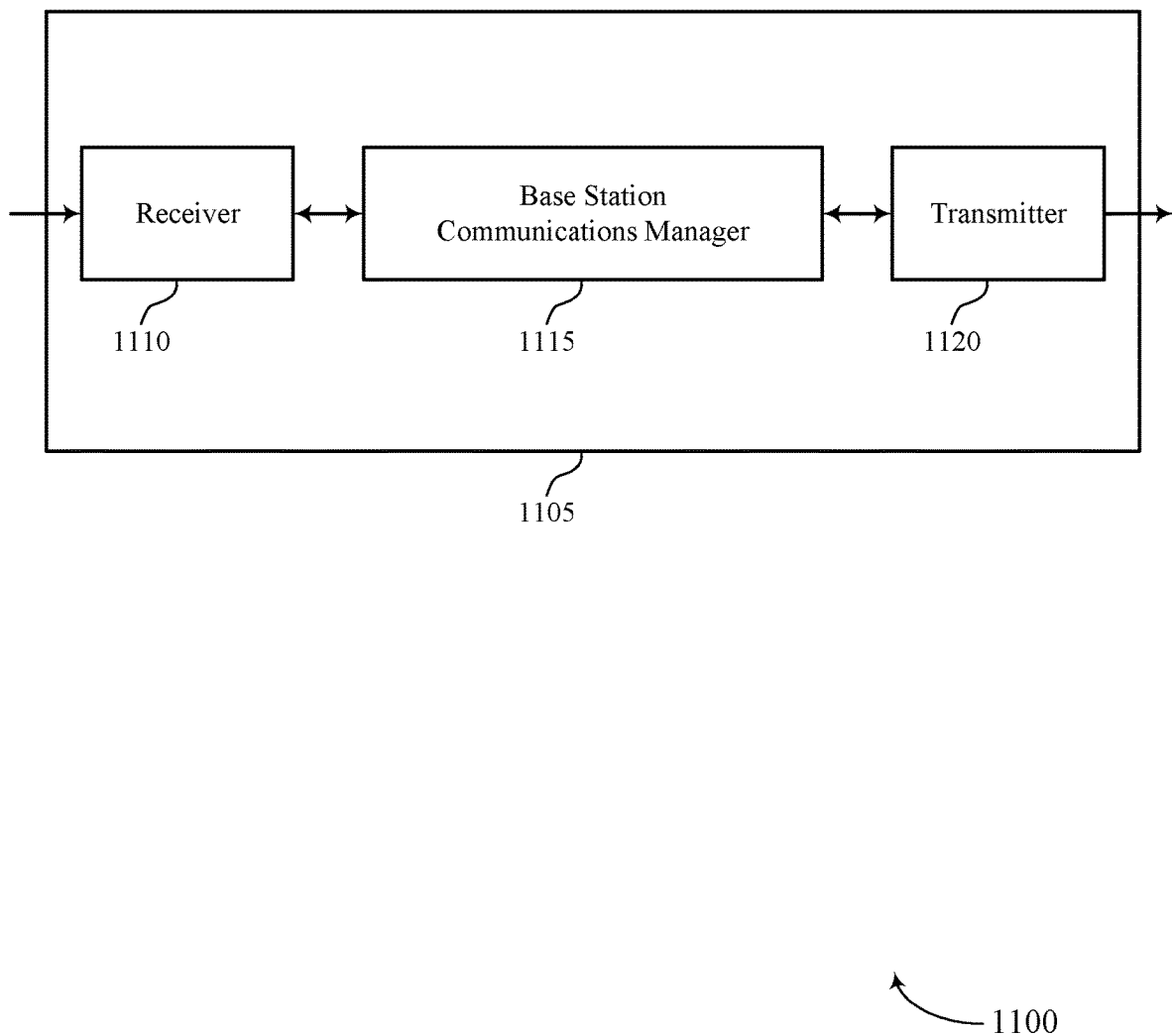
FIGS. 11 and 12 show block diagrams of devices that support techniques for beam switching and enhanced beam reporting to mitigate interference in beamforming in accordance with aspects of the present disclosure.

FIG. 11 shows a block diagram 1100 of a device 1105 that supports techniques for beam switching and enhanced beam reporting to mitigate interference in beamforming in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for beam switching due to interference from side lobes and enhanced beam reporting to mitigate interference in beamforming, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may determine an interference based on one or more of a main lobe or at least one side lobe of an uplink directional beam associated with a first beamformed transmission from a first UE causing the interference at one or more of the device 1105 or the second UE and transmit, to the first UE, a beam report including an indication of the one or more of the main lobe or the at least one side lobe associated with the uplink directional beam from the first UE causing interference at one or more of the device 1105 or the second UE. The base station communications manager 1115 may be an example of aspects of the base station communications manager 1410 described herein.

The base station communications manager 1115 may receive, from a first UE, a beam report of a signal strength associated with a beamformed transmission. The beamformed transmission includes at least one side lobe of a first directional beam of a set of directional beams causing interference at one or more devices, the one or more devices including the base station, the first UE, or a second UE, or any combination thereof. The base station communications manager 1115 may determine that the signal strength associated with the beamformed transmission satisfies a threshold, and transmit, to the first UE, a message including an indication for beam reporting based on the signal strength associated with the beamformed transmission satisfying the threshold. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
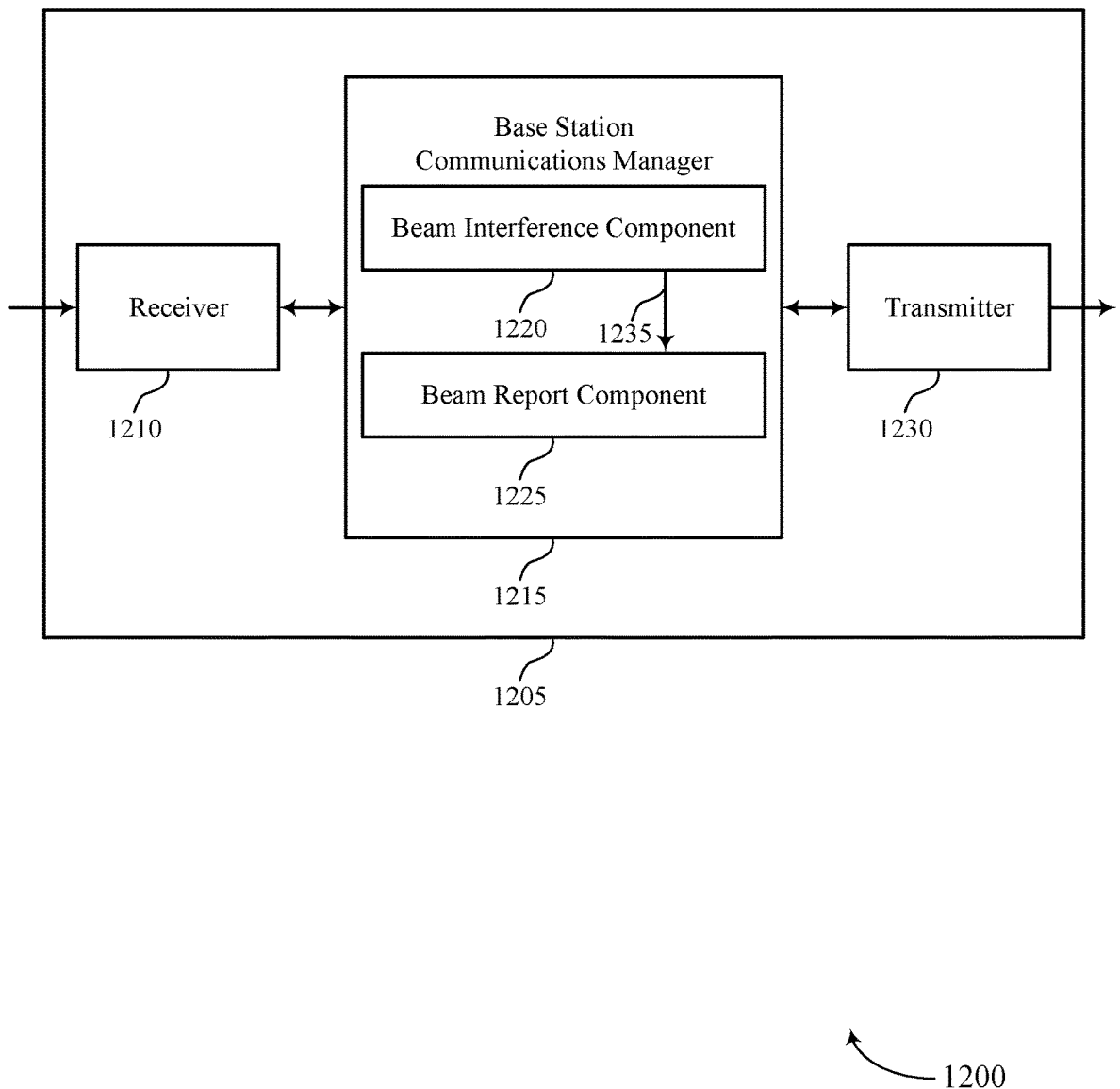

FIG. 12 shows a block diagram 1200 of a device 1205 that supports techniques for beam switching and enhanced beam reporting to mitigate interference in beamforming in accordance with aspects of the present disclosure. The device 1205 may be an example of aspects of a device 1105, or a base station 105 as described herein. The device 1205 may include a receiver 1210, a base station communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for beam switching due to interference from side lobes and enhanced beam reporting to mitigate interference in beamforming, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a beam interference component 1220 and a beam report component 1225. The base station communications manager 1215 may be an example of aspects of the base station communications manager 1410 described herein. The beam interference component 1220 may determine an interference based on one or more of a main lobe or at least one side lobe of an uplink directional beam associated with a first beamformed transmission from a first UE causing the interference at one or more of the device 1205 or the second UE. The beam interference component 1220 may send a beam interference signal 1235 (e.g., via one or more buses) to the beam report component 1225, which may carry information about the interference associated with one or more of the main lobe or the at least one side lobe of the uplink directional beam associated with the first beamformed transmission from a first UE.

The beam interference component 1220 may receive, from a first UE, a beam report of a signal strength associated with a beamformed transmission, where the beamformed transmission includes at least one side lobe of a first directional beam of a set of directional beams causing interference at one or more devices. The one or more devices including the base station, the first UE, or a second UE, or any combination thereof. The beam interference component 1220 may carry information about the signal strength such as an RSRP, RSRQ, RSSI, SINR, SNR, etc. The beam interference component 1220 may use the beam interference signal 1235 to determine that the signal strength associated with the beamformed transmission satisfies a threshold. The beam interference component 1220 may send (e.g., via one or more buses) the beam interference signal 1235 to the beam report component 1225.

The beam report component 1225 may use the beam interference signal 1235 to transmit, to the first UE, a beam report including an indication of the one or more of the main lobe or the at least one side lobe associated with the uplink directional beam from the first UE causing interference at one or more of the device 1205 or the second UE. The beam interference signal 1235 may trigger the beam report component 1225 to transmit, to the first UE, a message including an indication for beam reporting based on the signal strength associated with the beamformed transmission satisfying the threshold.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
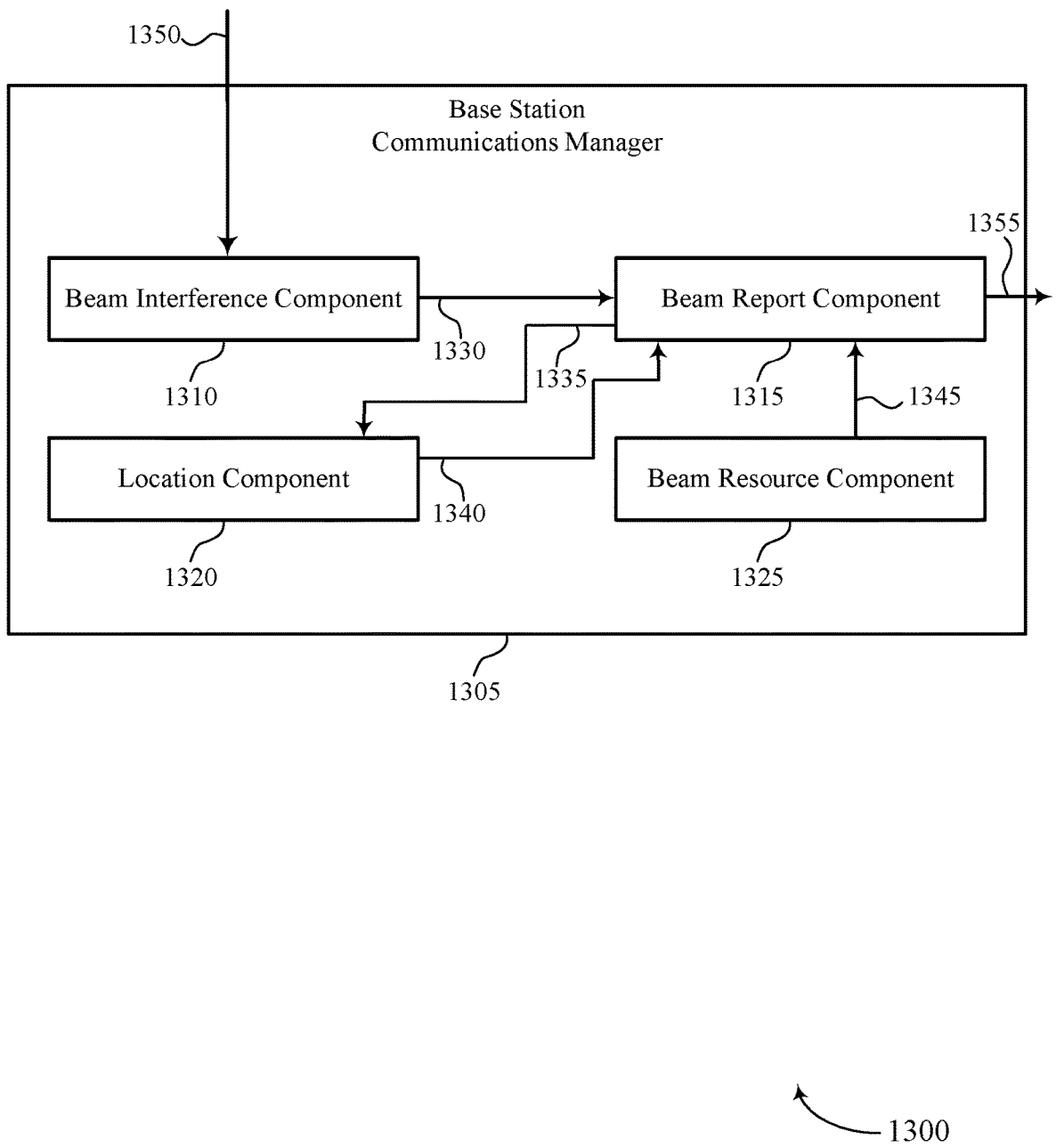
FIG. 13 shows a block diagram of a communications manager that supports techniques for beam switching and enhanced beam reporting to mitigate interference in beamforming in accordance with aspects of the present disclosure.

FIG. 13 shows a block diagram 1300 of a base station communications manager 1305 that supports techniques for beam switching and enhanced beam reporting to mitigate interference in beamforming in accordance with aspects of the present disclosure. The base station communications manager 1305 may be an example of aspects of a base station communications manager 1115, a base station communications manager 1215, or a base station communications manager 1410 described herein. The base station communications manager 1305 may include a beam interference component 1310, a beam report component 1315, a location component 1320, and a beam resource component 1325. Each of these components may communicate, directly or indirectly, with one another (e.g., via one or more buses).

The beam interference component 1310 may receive a beamformed transmission 1350 from the receiver 1205. The beam interference component 1310 may determine an interference based on one or more of a main lobe or at least one side lobe of an uplink directional beam associated with a first beamformed transmission from a first UE causing the interference at one or more of a base station (e.g., associated with the base station communications manager 1305) or the second UE. The beam interference component 1310 may determine a difference between an uplink rate associated with the first beamformed transmission and a downlink rate associated with a second beamformed transmission from the base station (e.g., associated with the base station communications manager 1305). In some examples, the beam interference component 1310 may determine the interference based on the difference between the uplink rate and the downlink rate.

The beam interference component 1310 may determine a difference between an uplink spectral efficiency associated with the first beamformed transmission and a downlink spectral efficiency associated with a second beamformed transmission from the base station (e.g., associated with the base station communications manager 1305). In some examples, the beam interference component 1310 may determine the interference based on the difference between the uplink spectral efficiency and the downlink spectral efficiency. The beam interference component 1310 may determine a network-level interference statistic. In some examples, the beam interference component 1310 may determine the interference based on the network-level interference statistic. In some examples, the beam interference component 1310 may determine the first UE is causing the interference at one or more of the base station (e.g., associated with the base station communications manager 1305) or the second UE based on slot format indices associated with the first UE and the second UE.

The beam interference component 1310 may receive, from a first UE, a beam report of a signal strength associated with a beamformed transmission. The beamformed transmission includes at least one side lobe of a first directional beam of a set of directional beams causing interference at one or more devices. The one or more devices including a base station, the first UE, or a second UE, or any combination thereof. In some examples, the beam interference component 1310 may determine that the signal strength satisfies the threshold over a threshold number of slots. In some examples, the beam interference component 1310 may transmit the message based on determining that the signal strength satisfies the threshold over the threshold number of slots. In some cases, the signal strength includes an SNR, an SINR, an RSRP, an RSRQ, an RSSI, or a combination thereof. In some cases, the threshold includes a signal strength threshold configured by the one or more devices.

The beam interference component 1310 may send a beam interference signal 1330 (e.g., via one or more buses) to the beam report component 1315. The beam interference signal 1330 may include information about a level of interference associated with a main lobe or at least one side lobe of a directional beam or the signal strength such as an RSRP, RSRQ, RSSI, SINR, SNR, etc. The beam interference signal 1330 may include information to determine that the signal strength associated with the beamformed transmission satisfies a threshold. The beam report component 1315 may use the beam interference signal 1330 to transmit, to the first UE, a beam report including an indication of one or more of the main lobe or the at least one side lobe associated with the uplink directional beam from the first UE causing interference at one or more of the base station or the second UE. The beam report component 1315 may use the beam interference signal 1330 to transmit, to the first UE, a message including an indication for beam reporting based on the signal strength associated with the beamformed transmission satisfying the threshold. In some examples, the beam report component 1315 may receive, from the first UE, the beam report including a second indication of one or more directional beam candidates of the set of directional beams to use for the wireless communications based on the at least one side lobe associated with the first directional beam of the set of directional beams causing the interference at the one or more devices. The beam report component 1315 may send a beam report signal 1335 (e.g., via one or more buses) to the location component 1320 and the beam resource component 1325. The beam report component 1315 may send a beam report 1355 including an indication of one or more of the main lobe or the at least one side lobe associated with the uplink directional beam from the first UE causing interference at one or more of the base station or the second UE to the transmitter 1230.

The location component 1320 may use the beam report signal 1335 to trigger the location component 1320 to estimate location information associated with the first UE and the second UE. In some examples, the location component 1320 may determine the first UE is causing the interference at one or more of the base station or the second UE based on the estimated location information associated with the first UE and the second UE, where transmitting the report including the indication of the first UE causing interference at one or more of the base station or the second UE is based on the estimated location information. The location component 1320 may send a location signal 1340 (e.g., via one or more buses) to the beam report component 1315. The location signal 1340 may include estimated location information of a UE.

The beam resource component 1325 may use the beam report signal 1335 to trigger the beam resource component 1325 to transmit, to the first UE, a subframe number indication indicating that the uplink directional beam associated with the first beamformed transmission from the first UE is causing the interference at one or more of the base station or the second UE and to perform one or more of a beam switch operation or an antenna subarray switch operation. In some examples, the beam resource component 1325 may transmit, to the first UE, a slot format indication indicating that the uplink directional beam associated with the first beamformed transmission from the first UE is causing the interference at one or more of the base station or the second UE and to perform one or more of a beam switch operation or an antenna subarray switch operation. The beam resource component 1325 may send a beam resource signal 1345 (e.g., via one or more buses) to the beam report component 1315. The beam resource signal 1345 may include information associated with a directional beam causing interference, for example, such as a slot format, a subframe number, etc. The beam report signal 1335 may trigger the beam resource component 1325 to determine a second directional beam of the set of directional beams to use for the wireless communication based on the side lobe associated with the first directional beam of the set of directional beams causing the interference at the one or more devices. The beam resource component 1325 may send (e.g., via one or more buses) a beam resource signal 1345 to the beam report component 1315. The beam resource signal 1345 may include information associated with the second directional beam such as main lobe and side lobe gains, direction, etc.

Figure 14:
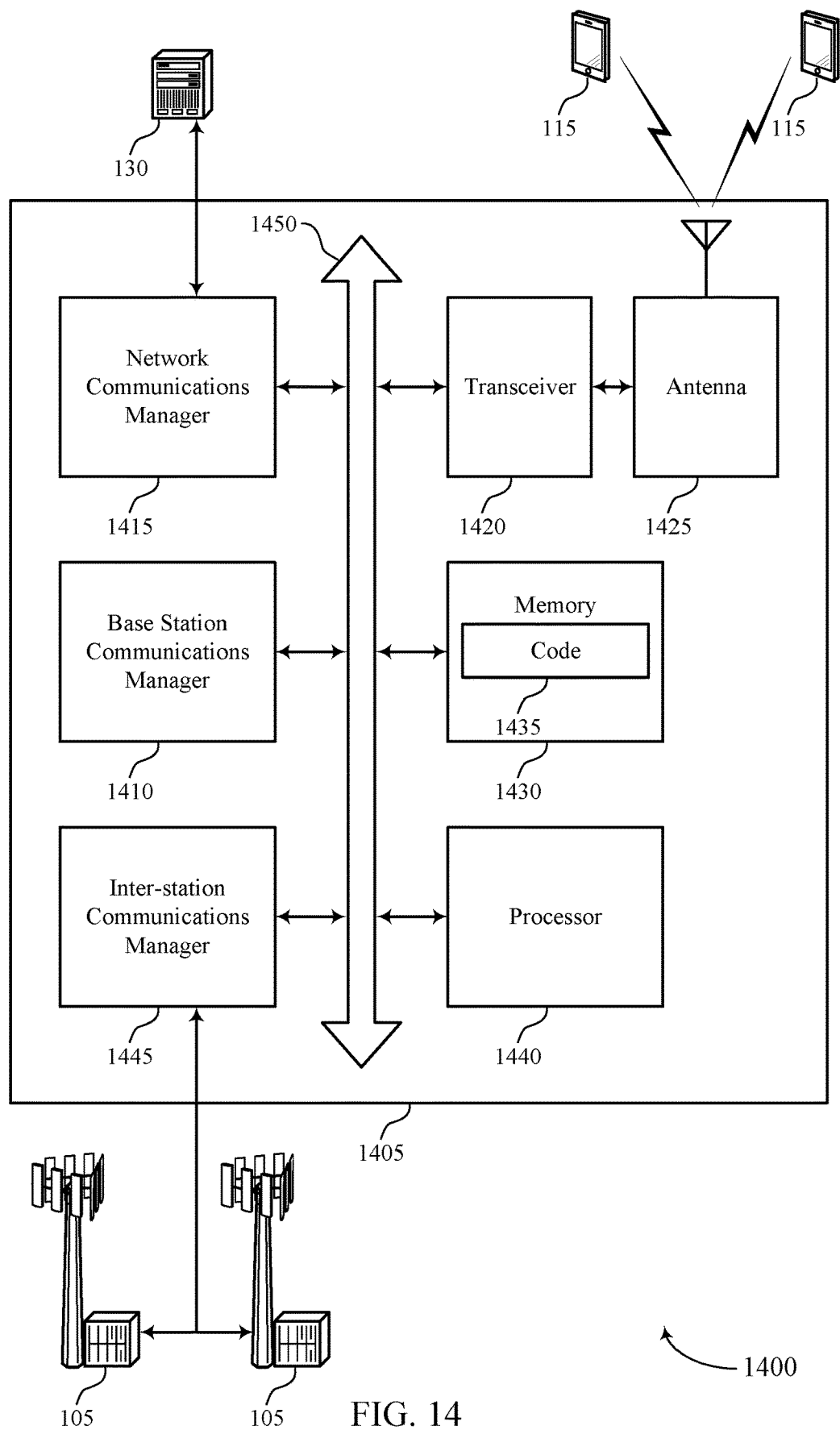
FIG. 14 shows a diagram of a system including a device that supports techniques for beam switching and enhanced beam reporting to mitigate interference in beamforming in accordance with aspects of the present disclosure.

FIG. 14 shows a diagram of a system 1400 including a device 1405 that supports techniques for beam switching and enhanced beam reporting to mitigate interference in beamforming in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may determine an interference based on one or more of a main lobe or at least one side lobe of an uplink directional beam associated with a first beamformed transmission from a first UE causing the interference at one or more of the device 1405 or the second UE. The base station communications manager 1410 may transmit, to the first UE, a beam report including an indication of one or more of the main lobe or the at least one side lobe associated with the uplink directional beam from the first UE causing interference at one or more of the device 1405 or the second UE. The network communications manager 1415 may manage communications with the core network (e.g., via one or more wired backhaul links). For example, the network communications manager 1415 may manage the transfer of data communications for client devices, such as one or more UEs 115.

The base station communications manager 1410 may receive, from a first UE, a beam report of a signal strength associated with a beamformed transmission. The beamformed transmission includes at least one side lobe of a first directional beam of a set of directional beams causing interference at one or more devices. The one or more devices including the device 1405, the first UE, or a second UE, or any combination thereof. The base station communications manager 1410 may determine that the signal strength associated with the beamformed transmission satisfies a threshold, and transmit, to the first UE, a message including an indication for beam reporting based on the signal strength associated with the beamformed transmission satisfying the threshold.

The network communications manager 1415 may manage communications with the core network (e.g., via one or more wired backhaul links). For example, the network communications manager 1415 may manage the transfer of data communications for client devices, such as one or more UEs 115. The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices. The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for beam switching due to interference from side lobes and enhanced beam reporting to mitigate interference in beamforming).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
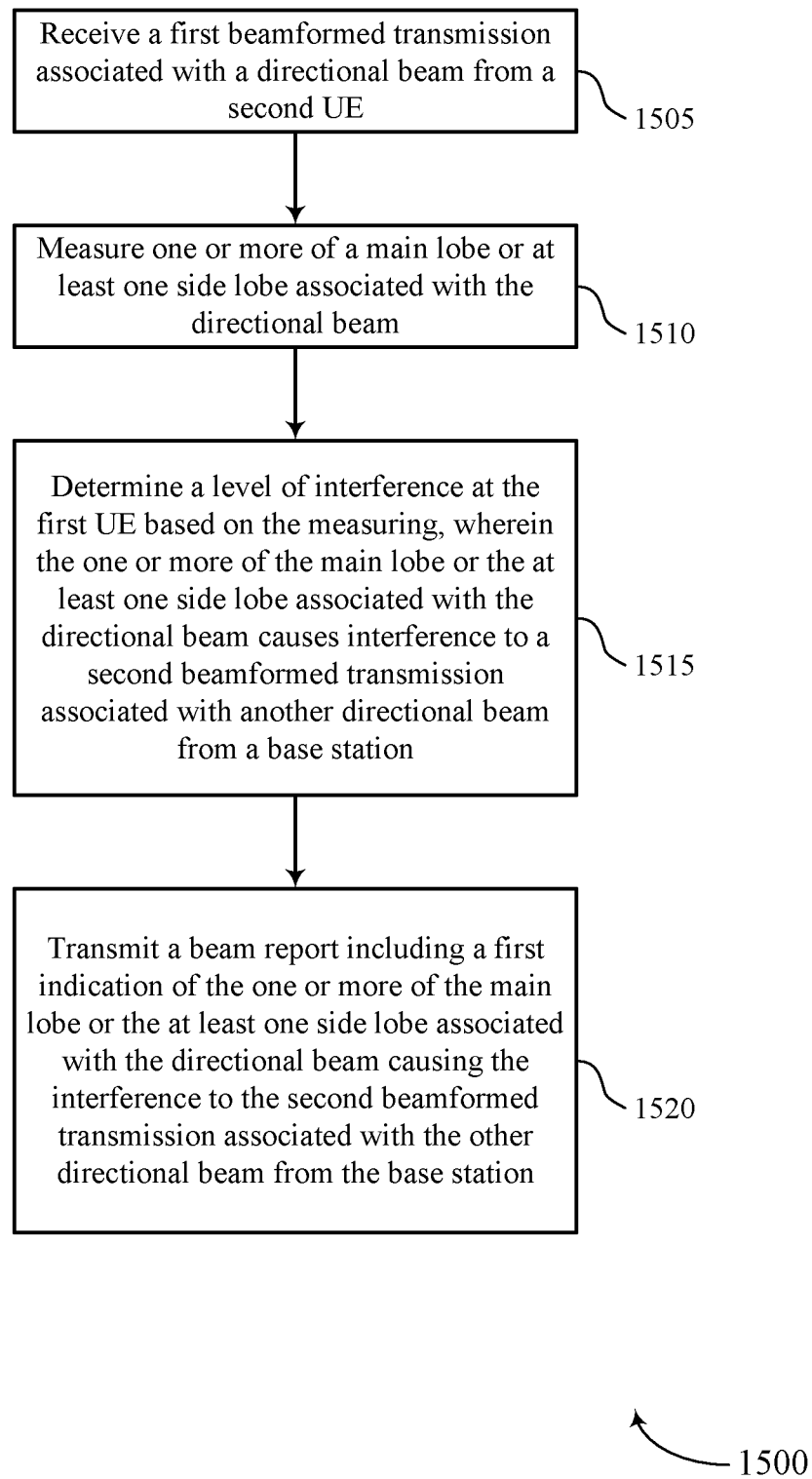
FIGS. 15 through 21 show flowcharts illustrating methods that support techniques for beam switching and enhanced beam reporting to mitigate interference in beamforming in accordance with aspects of the present disclosure.

FIG. 15 shows a flowchart illustrating a method 1500 that supports techniques for beam switching and enhanced beam reporting to mitigate interference in beamforming in accordance with aspects of the present disclosure. The operations of method 1500 may be implemented by a UE or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive a first beamformed transmission associated with a directional beam from a second UE. The UE may receive the first beamformed transmission over a physical control or data channel, such as a PUCCH or a PUSCH. In some examples, the UE may determine time and frequency resources over which the physical control or data channel is transmitted. The UE may demodulate the first beamformed transmission over the determined time and frequency resources, and decode the demodulated beamformed transmissions to obtain information associated with the beamformed transmission. The operations of 1505 may be performed according to the methods described herein. In some examples, aspects of the operations of 1505 may be performed by a beam component as described with reference to FIGS. 7 through 10.

At 1510, the UE may measure one or more of a main lobe or at least one side lobe associated with the directional beam. For example, the UE may measure one or more of an RSRP, RSRQ, SINR, or RSSI, or any combination thereof associated with one or more of a main lobe or at least one side lobe associated with the directional beam. The operations of 1510 may be performed according to the methods described herein. In some examples, aspects of the operations of 1510 may be performed by a beam measurement component as described with reference to FIGS. 7 through 10.

At 1515, the UE may determine a level of interference at the first UE based on the measuring, wherein the one or more of the main lobe or the at least one side lobe associated with the directional beam causes interference to a second beamformed transmission associated with another directional beam from a base station. For example, the UE may determine the level of interference at the first UE based on measurements of one or more of an RSRP, RSRQ, SINR, or RSSI, or any combination thereof. The operations of 1515 may be performed according to the methods described herein. In some examples, aspects of the operations of 1515 may be performed by a beam interference component as described with reference to FIGS. 7 through 10.

At 1520, the UE may transmit a beam report including a first indication of the one or more of the main lobe or the at least one side lobe associated with the directional beam causing the interference to the second beamformed transmission associated with the other directional beam from the base station. For example, the UE may transmit the beam report via beamformed transmission over a physical control or data channel, such as a PUCCH or a PUSCH. In some examples, the UE may determine time and frequency resources over which the physical control or data channel is transmitted. The UE may modulate the beamformed transmission over the determined time and frequency resources, and encode the modulated beamformed transmissions. The operations of 1520 may be performed according to the methods described herein. In some examples, aspects of the operations of 1520 may be performed by a beam report component as described with reference to FIGS. 7 through 10.

Figure 16:
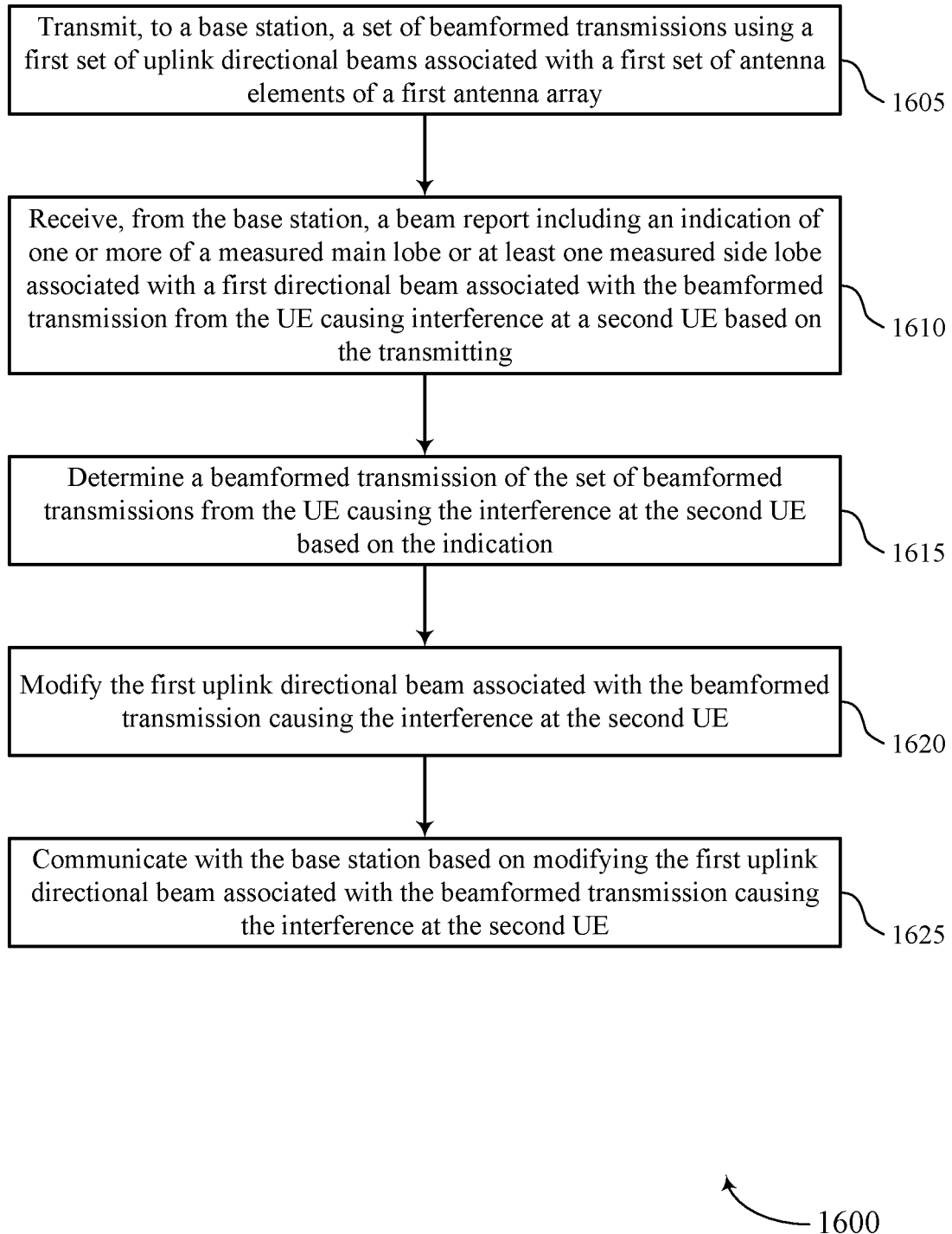

FIG. 16 shows a flowchart illustrating a method 1600 that supports techniques for beam switching and enhanced beam reporting to mitigate interference in beamforming in accordance with aspects of the present disclosure. The operations of method 1600 may be implemented by a UE or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may transmit, to a base station, a set of beamformed transmissions using a first set of uplink directional beams associated with a first set of antenna elements of a first antenna array. For example, the UE may transmit the set of beamformed transmissions over a physical control or data channel, such as a PUCCH or a PUSCH. In some examples, the UE may determine time and frequency resources over which the set of beamformed transmissions. The UE may modulate the set of beamformed transmissions over the determined time and frequency resources, and encode the modulated set of beamformed transmissions. The operations of 1605 may be performed according to the methods described herein. In some examples, aspects of the operations of 1605 may be performed by a beam component as described with reference to FIGS. 7 through 10.

At 1610, the UE may receive, from the base station, a beam report including an indication of one or more of a measured main lobe or at least one measured side lobe associated with a first directional beam associated with the beamformed transmission from the UE causing interference at a second UE based on the transmitting. For example, the UE may receive the beam report via beamformed transmission over a physical control or data channel, such as a PDCCH or a PDSCH. In some examples, the UE may determine time and frequency resources over which the beamformed transmission is transmitted. The UE may demodulate the beamformed transmission over the determined time and frequency resources, and decode the modulated beamformed transmissions. The operations of 1610 may be performed according to the methods described herein. In some examples, aspects of the operations of 1610 may be performed by a beam report component as described with reference to FIGS. 7 through 10.

At 1615, the UE may determine a beamformed transmission of the set of beamformed transmissions from the UE causing the interference at the second UE based on the indication. For example, the UE may decode information (e.g., bits, fields) in the beam report, which may identify the beamformed transmission of the set of beamformed transmissions from the UE causing the interference at the second UE. The operations of 1615 may be performed according to the methods described herein. In some examples, aspects of the operations of 1615 may be performed by a beam interference component as described with reference to FIGS. 7 through 10.

At 1620, the UE may modify the first uplink directional beam associated with the beamformed transmission causing the interference at the second UE. For example, the UE may modify one or more beam weights to adjust a size, an orientation, a shape, etc. of the first uplink directional beam associated with the beamformed transmission causing the interference at the second UE. The operations of 1620 may be performed according to the methods described herein. In some examples, aspects of the operations of 1620 may be performed by a beam switch component as described with reference to FIGS. 7 through 10.

At 1625, the UE may communicate with the base station based on modifying the first uplink directional beam associated with the beamformed transmission causing the interference at the second UE. For example, the UE may communicate with the base station via the uplink directional beam over a physical control or data channel, such as a PUCCH or a PUSCH. In some examples, the UE may determine time and frequency resources over which the uplink directional beam. The UE may modulate the uplink directional beam over the determined time and frequency resources, and encode the uplink directional beam. The operations of 1625 may be performed according to the methods described herein. In some examples, aspects of the operations of 1625 may be performed by a beam switch component as described with reference to FIGS. 7 through 10.

Figure 17:
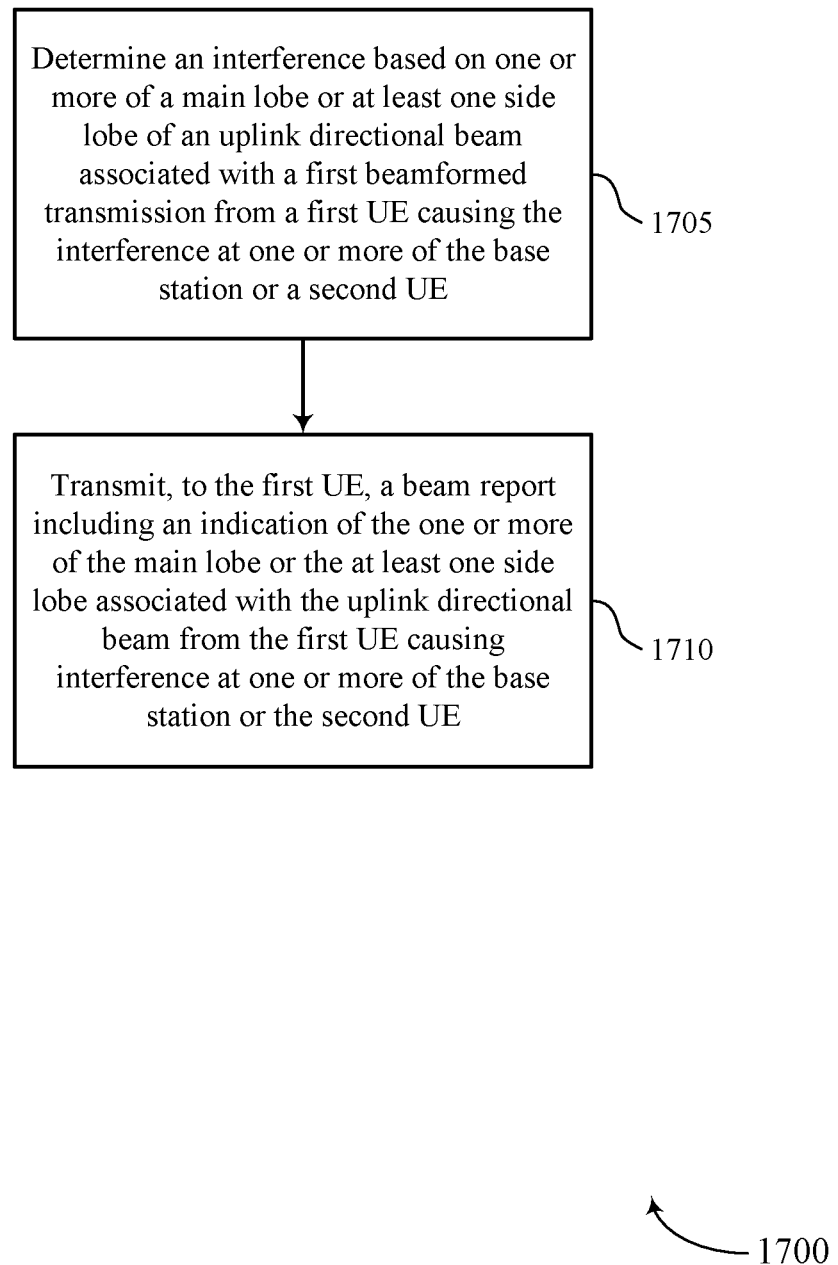

FIG. 17 shows a flowchart illustrating a method 1700 that supports techniques for beam switching and enhanced beam reporting to mitigate interference in beamforming in accordance with aspects of the present disclosure. The operations of method 1700 may be implemented by a base station or its components as described herein. For example, the operations of method 1700 may be performed by a base station communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1705, the base station may determine an interference based on one or more of a main lobe or at least one side lobe of an uplink directional beam associated with a first beamformed transmission from a first UE causing the interference at one or more of the base station or a second UE. For example, the base station may measure one or more of an RSRP, RSRQ, SINR, or RSSI, or any combination thereof associated with one or more of a main lobe or at least one side lobe associated with the directional beam. The operations of 1705 may be performed according to the methods described herein. In some examples, aspects of the operations of 1705 may be performed by a beam interference component as described with reference to FIGS. 11 through 14.

At 1710, the base station may transmit, to the first UE, a beam report including an indication of the one or more of the main lobe or the at least one side lobe associated with the uplink directional beam from the first UE causing interference at one or more of the base station or the second UE. For example, the base station may transmit the beam report via beamformed transmission over a physical control or data channel, such as a PDCCH or a PDSCH. In some examples, the base station may determine time and frequency resources over which the physical control or data channel is transmitted. The base station may modulate the beamformed transmission over the determined time and frequency resources, and encode the modulated beamformed transmissions. The operations of 1710 may be performed according to the methods described herein. In some examples, aspects of the operations of 1710 may be performed by a beam report component as described with reference to FIGS. 11 through 14.

Figure 18:
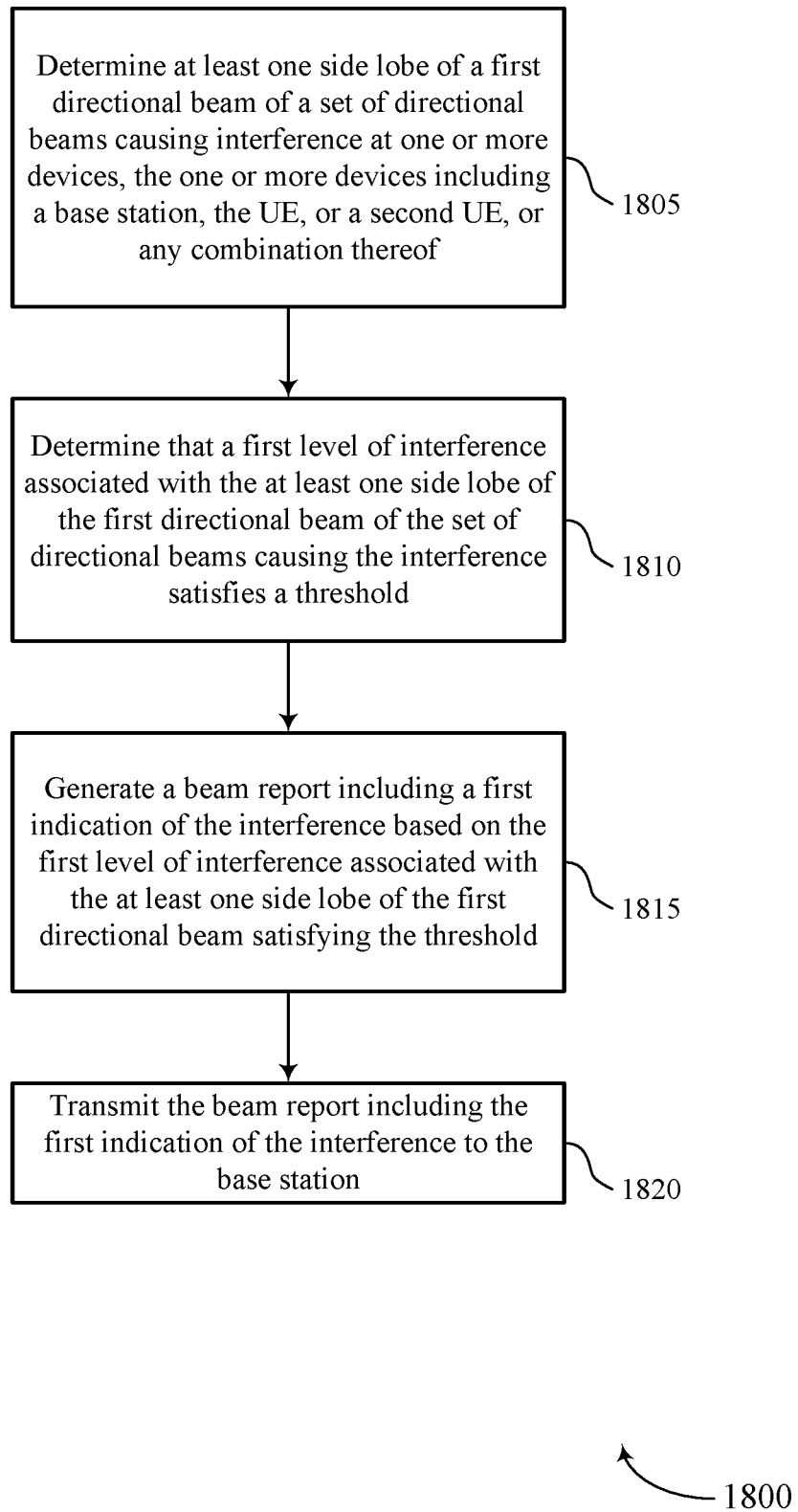

FIG. 18 shows a flowchart illustrating a method 1800 that supports techniques for beam switching and enhanced beam reporting to mitigate interference in beamforming in accordance with aspects of the present disclosure. The operations of method 1800 may be implemented by a UE 115 or its components as described herein. For example, the operations of method 1800 may be performed by a UE communications manager as described with reference to FIGS. 10 through 7. In some examples, a UE may execute a set of instructions to control the functional elements of the UE to perform the functions described below. Additionally, or alternatively, a UE may perform aspects of the functions described below using special-purpose hardware.

At 1805, the UE may determine at least one side lobe of a first directional beam of a set of directional beams causing interference at one or more devices, the one or more devices including a base station, the UE, or a second UE, or any combination thereof. The UE may determine the at least one side lobe based on receiving an indication of the interference from the second UE, or the base station, or both. Additionally, or alternatively, the UE may determine the at least one side lobe by measuring a signal strength associated with the first directional beam. The operations of 1805 may be performed according to the methods described herein. In some examples, aspects of the operations of 1805 may be performed by a beam lobe component as described with reference to FIGS. 7 through 10.

At 1810, the UE may determine that a first level of interference associated with the at least one side lobe of the first directional beam of the set of directional beams causing the interference satisfies a threshold. For example, the UE may determine the first level of interference based on measurements of one or more of an RSRP, RSRQ, SINR, SNR, or RSSI, or any combination thereof. The threshold may be configured by the base station or the UE may be pre-configured with the threshold. The operations of 1810 may be performed according to the methods described herein. In some examples, aspects of the operations of 1810 may be performed by an interference component as described with reference to FIGS. 7 through 10.

At 1815, the UE may generate a beam report including a first indication of the interference based on the first level of interference associated with the at least one side lobe of the first directional beam satisfying the threshold. In some examples, the UE may generate the beam report based on receiving a second indication of the at least one side lobe from the second UE or the base station. Additionally, or alternatively, the base station may trigger the UE to generate the report. The operations of 1815 may be performed according to the methods described herein. In some examples, aspects of the operations of 1815 may be performed by a beam report component as described with reference to FIGS. 7 through 10.

At 1820, the UE may transmit the beam report including the first indication of the interference to the base station. For example, the UE may transmit the beam report via beamformed transmission over a physical control or data channel, such as a PUCCH or a PUSCH. In some examples, the UE may determine time and frequency resources over which the physical control or data channel is transmitted. The UE may modulate the beamformed transmission over the determined time and frequency resources, and encode the modulated beamformed transmissions. The operations of 1820 may be performed according to the methods described herein. In some examples, aspects of the operations of 1820 may be performed by a beam report component as described with reference to FIGS. 7 through 10.

Figure 19:
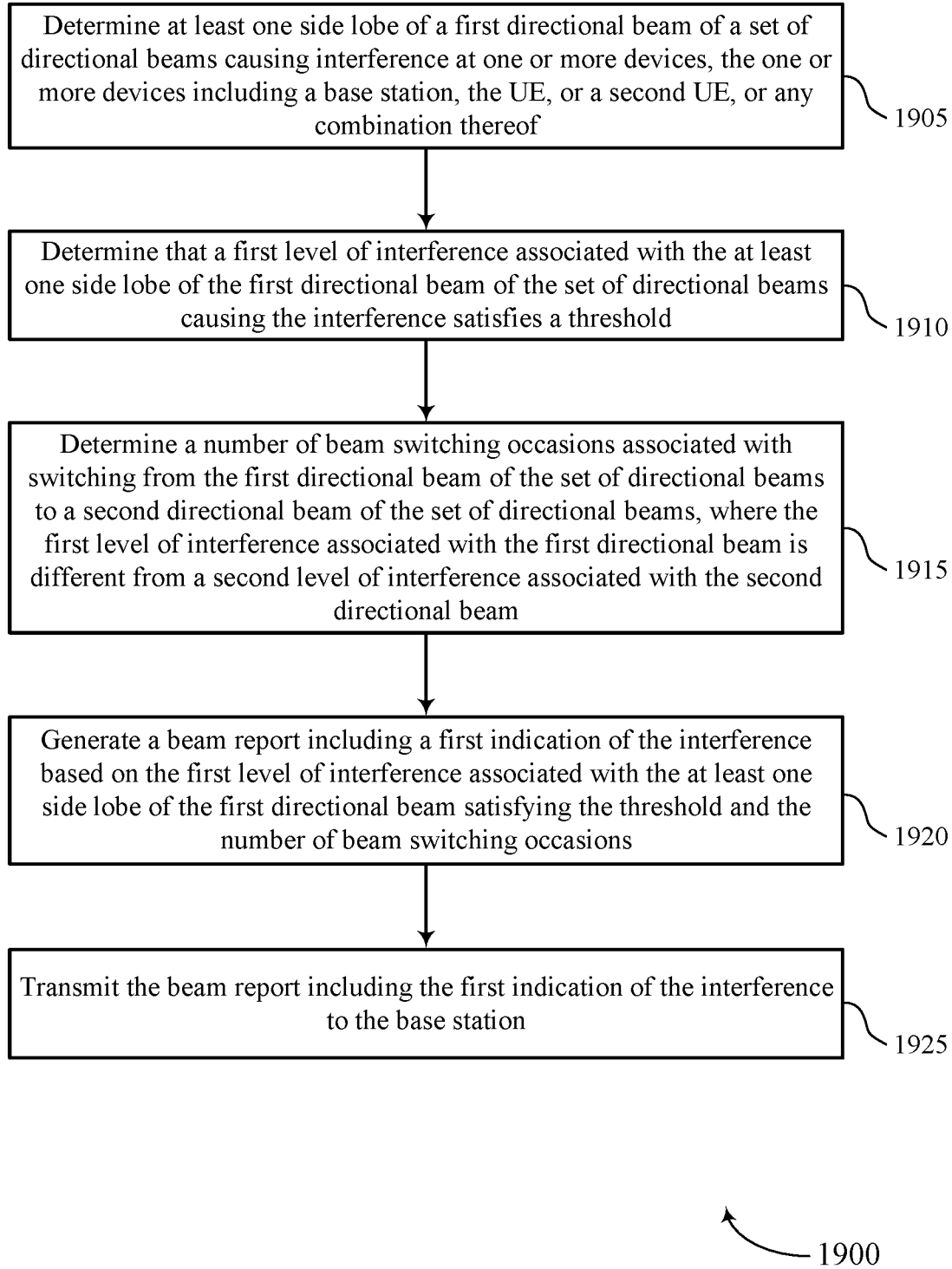

FIG. 19 shows a flowchart illustrating a method 1900 that supports techniques for beam switching and enhanced beam reporting to mitigate interference in beamforming in accordance with aspects of the present disclosure. The operations of method 1900 may be implemented by a UE 115 or its components as described herein. For example, the operations of method 1900 may be performed by a UE communications manager as described with reference to FIGS. 7 through 11. In some examples, a UE may execute a set of instructions to control the functional elements of the UE to perform the functions described below. Additionally, or alternatively, a UE may perform aspects of the functions described below using special-purpose hardware.

At 1905, the UE may determine at least one side lobe of a first directional beam of a set of directional beams causing interference at one or more devices, the one or more devices including a base station, the UE, or a second UE, or any combination thereof. The UE may determine the at least one side lobe based on receiving an indication of the interference from the second UE, or the base station, or both. Additionally, or alternatively, the UE may determine the at least one side lobe by measuring a signal strength associated with the first directional beam. The operations of 1905 may be performed according to the methods described herein. In some examples, aspects of the operations of 1905 may be performed by a beam lobe component as described with reference to FIGS. 7 through 10.

At 1910, the UE may determine that a first level of interference associated with the at least one side lobe of the first directional beam of the set of directional beams causing the interference satisfies a threshold. For example, the UE may determine the first level of interference based on measurements of one or more of an RSRP, RSRQ, SINR, SNR, or RSSI, or any combination thereof. The threshold may be configured by the base station or the UE may be pre-configured with the threshold. The operations of 1910 may be performed according to the methods described herein. In some examples, aspects of the operations of 1910 may be performed by an interference component as described with reference to FIGS. 7 through 10.

At 1915, the UE may determine a number of beam switching occasions associated with switching from the first directional beam of the set of directional beams to a second directional beam of the set of directional beams, where the first level of interference associated with the first directional beam is different from a second level of interference associated with the second directional beam. Additionally, or alternatively, the UE may determine a frequency at which the UE switches directional beams. The operations of 1915 may be performed according to the methods described herein. In some examples, aspects of the operations of 1915 may be performed by a beam switch component as described with reference to FIGS. 7 through 10.

At 1920, the UE may generate a beam report including a first indication of the interference based on the first level of interference associated with the at least one side lobe of the first directional beam satisfying the threshold and the number of beam switching occasions. In some examples, the UE may generate the beam report based on the frequency at which the UE switches directional beams. Additionally, or alternatively, the base station may trigger the UE to generate the report. The operations of 1920 may be performed according to the methods described herein. In some examples, aspects of the operations of 1920 may be performed by a beam report component as described with reference to FIGS. 7 through 10.

At 1925, the UE may transmit the beam report including the first indication of the interference to the base station. For example, the UE may transmit the beam report via beamformed transmission over a physical control or data channel, such as a PUCCH or a PUSCH. In some examples, the UE may determine time and frequency resources over which the physical control or data channel is transmitted. The UE may modulate the beamformed transmission over the determined time and frequency resources, and encode the modulated beamformed transmissions. The operations of 1925 may be performed according to the methods described herein. In some examples, aspects of the operations of 1925 may be performed by a beam report component as described with reference to FIGS. 7 through 10.

Figure 20:
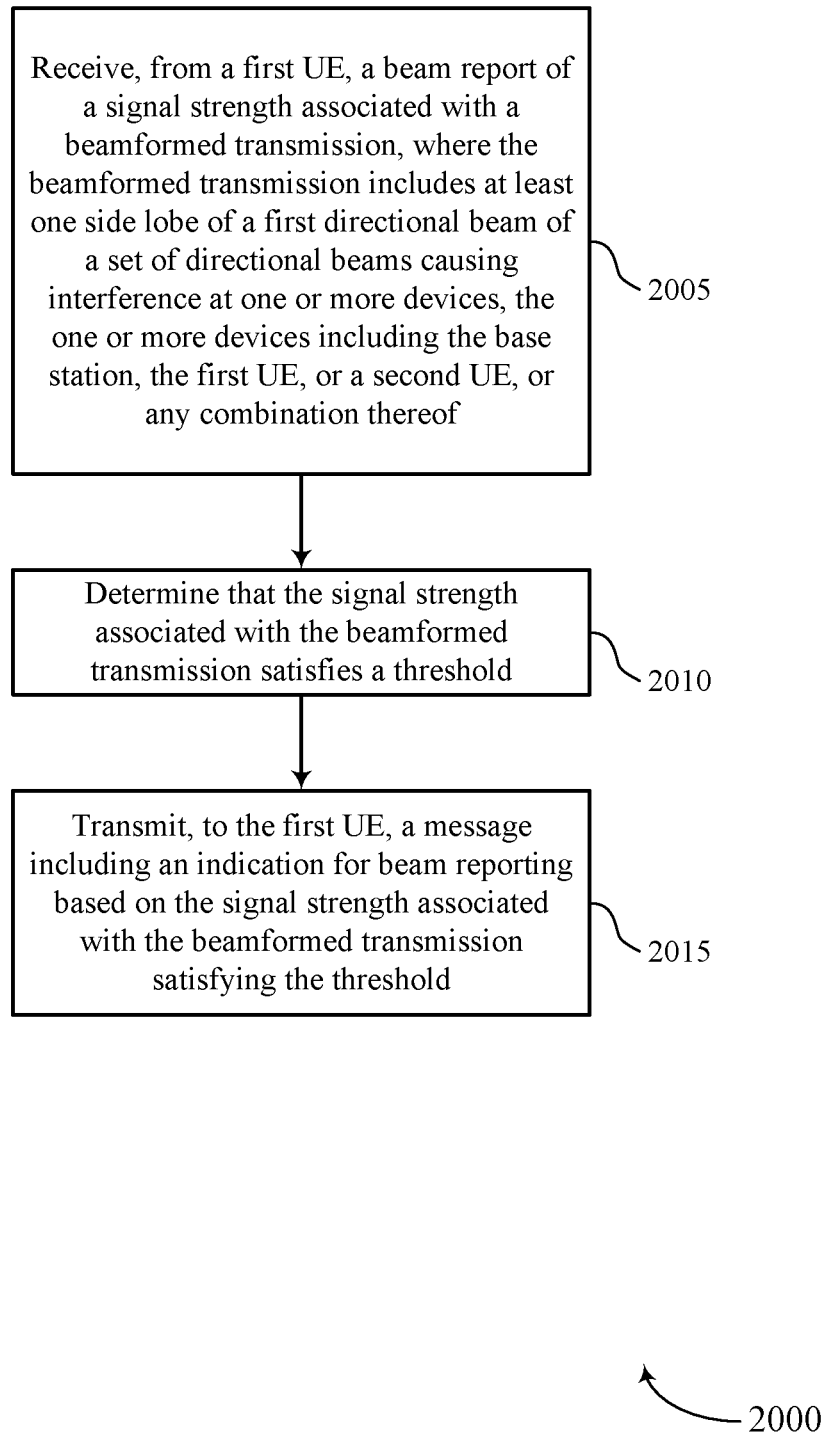

FIG. 20 shows a flowchart illustrating a method 2000 that supports techniques for beam switching and enhanced beam reporting to mitigate interference in beamforming in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2005, the base station may receive, from a first UE, a beam report of a signal strength associated with a beamformed transmission, where the beamformed transmission includes at least one side lobe of a first directional beam of a set of directional beams causing interference at one or more devices, the one or more devices including the base station, the first UE, or a second UE, or any combination thereof. For example, the base station may receive the beam report from the first UE via an uplink channel, such as a physical uplink control channel or a physical uplink shared channel. The base station may demodulate the beamformed transmission over time and frequency resources of the uplink channel, and decode the modulated beamformed transmissions. The operations of 2005 may be performed according to the methods described herein. In some examples, aspects of the operations of 2005 may be performed by an interference component as described with reference to FIGS. 11 through 14.

At 2010, the base station may determine that the signal strength associated with the beamformed transmission satisfies a threshold. For example, the base station may determine the signal strength based on measurements of one or more of an RSRP, RSRQ, SINR, SNR, or RSSI, or any combination thereof. The threshold may be configured by the base station or pre-configured according to a set of pre-determined rules. The operations of 2010 may be performed according to the methods described herein. In some examples, aspects of the operations of 2010 may be performed by a beam lobe component as described with reference to FIGS. 11 through 14.

At 2015, the base station may transmit, to the first UE, a message including an indication for beam reporting based on the signal strength associated with the beamformed transmission satisfying the threshold. For example, the base station may transmit the beam report via beamformed transmission over a physical control or data channel, such as a PDCCH or a PDSCH. In some examples, the base station may determine time and frequency resources over which the physical control or data channel is transmitted. The base station may modulate the beamformed transmission over the determined time and frequency resources, and encode the modulated beamformed transmissions. The operations of 2015 may be performed according to the methods described herein. In some examples, aspects of the operations of 2015 may be performed by a beam report component as described with reference to FIGS. 11 through 14.

Figure 21:
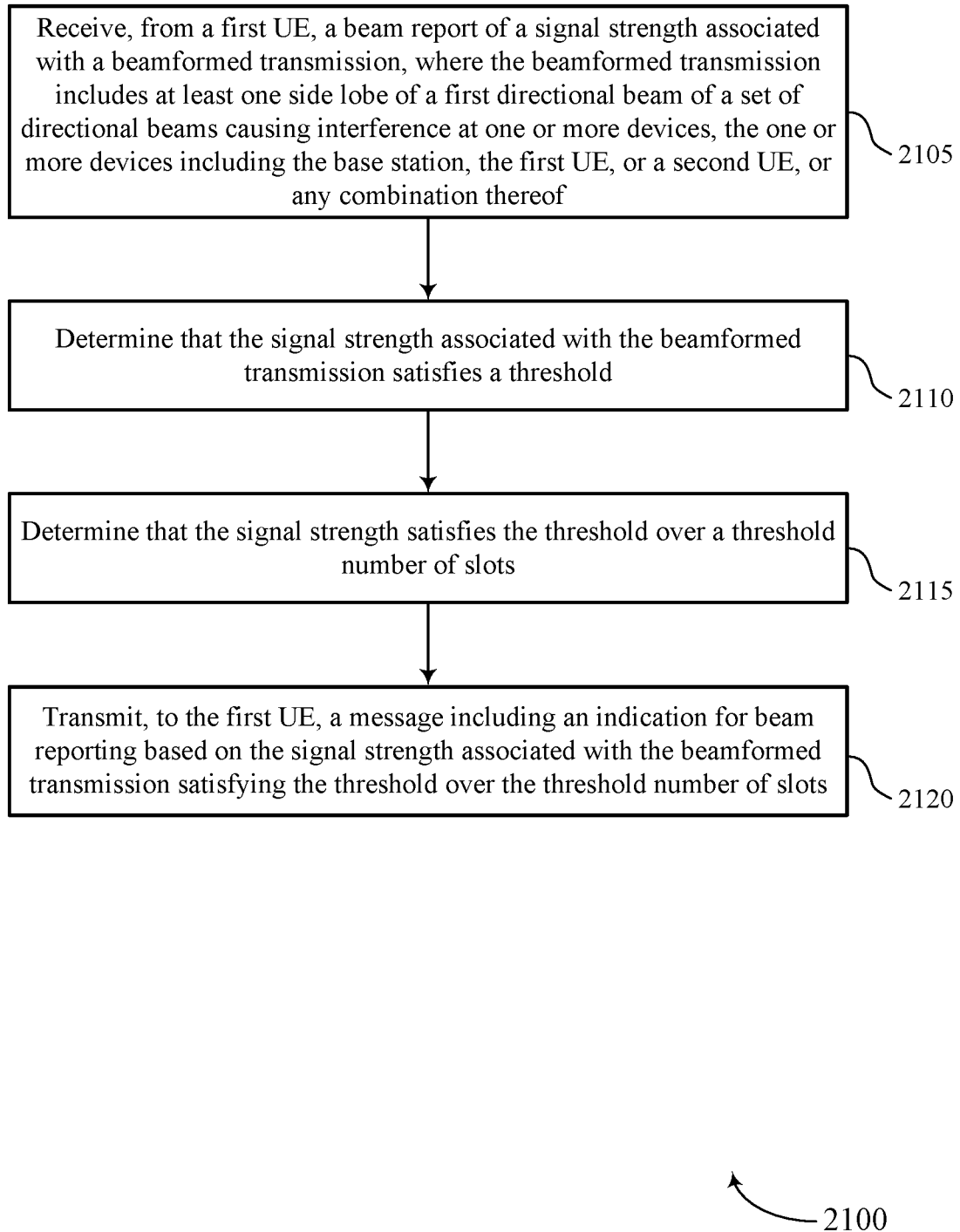

FIG. 21 shows a flowchart illustrating a method 2100 that supports techniques for beam switching and enhanced beam reporting to mitigate interference in beamforming in accordance with aspects of the present disclosure. The operations of method 2100 may be implemented by a base station or its components as described herein. For example, the operations of method 2100 may be performed by a base station communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2105, the base station may receive, from a first UE, a beam report of a signal strength associated with a beamformed transmission, where the beamformed transmission includes at least one side lobe of a first directional beam of a set of directional beams causing interference at one or more devices, the one or more devices including the base station, the first UE, or a second UE, or any combination thereof. For example, the base station may receive the beam report from the first UE via an uplink channel, such as a physical uplink control channel or a physical uplink shared channel. The base station may demodulate the beamformed transmission over time and frequency resources of the uplink channel, and decode the modulated beamformed transmissions. The operations of 2105 may be performed according to the methods described herein. In some examples, aspects of the operations of 2105 may be performed by an interference component as described with reference to FIGS. 11 through 14.

At 2110, the base station may determine that the signal strength associated with the beamformed transmission satisfies a threshold. For example, the base station may determine the signal strength based on measurements of one or more of an RSRP, RSRQ, SINR, SNR, or RSSI, or any combination thereof. The threshold may be configured by the base station or pre-configured according to a set of pre-determined rules. The operations of 2110 may be performed according to the methods described herein. In some examples, aspects of the operations of 2110 may be performed by a beam lobe component as described with reference to FIGS. 11 through 14.

At 2115, the base station may determine that the signal strength satisfies the threshold over a threshold number of slots. The threshold number of slots may be configured by the base station or pre-configured according to a set of pre-determined rules. The operations of 2115 may be performed according to the methods described herein. In some examples, aspects of the operations of 2115 may be performed by an interference component as described with reference to FIGS. 11 through 14.

At 2120, the base station may transmit, to the first UE, a message including an indication for beam reporting based on the signal strength associated with the beamformed transmission satisfying the threshold over the threshold number of slots. For example, the base station may transmit the beam report via beamformed transmission over a physical control or data channel, such as a PDCCH or a PDSCH. In some examples, the base station may determine time and frequency resources over which the physical control or data channel is transmitted. The base station may modulate the beamformed transmission over the determined time and frequency resources, and encode the modulated beamformed transmissions. The operations of 2120 may be performed according to the methods described herein. In some examples, aspects of the operations of 2120 may be performed by a beam report component as described with reference to FIGS. 11 through 14.

The following provides an overview of aspects of the present disclosure:

Aspect 1: A method for wireless communications at a first UE, comprising: receiving a first beamformed transmission associated with a directional beam from a second UE; measuring one or more of a main lobe or at least one side lobe associated with the directional beam; determining a level of interference at the first UE based at least in part on the measuring, wherein the one or more of the main lobe or the at least one side lobe associated with the directional beam causes interference to a second beamformed transmission associated with another directional beam from a base station; and transmitting a beam report comprising a first indication of the one or more of the main lobe or the at least one side lobe associated with the directional beam causing the interference to the second beamformed transmission associated with the other directional beam from the base station.

Aspect 2: The method of aspect 1, further comprising: determining a signal strength metric based at least in part on the first beamformed transmission associated with the directional beam from the second UE and the second beamformed transmission associated with the other directional beam from the base station, the signal strength metric comprises an SINR, an RSRP, an RSRQ, an RSSI, or a combination thereof, wherein determining the level of interference comprises: determining the level of interference at the first UE based at least in part on determining the signal strength metric, wherein transmitting the beam report comprises: transmitting a second indication of the signal strength metric.

Aspect 3: The method of any of aspects 1 through 2, further comprising: adjusting a reference signal received power based at least in part on the at least one side lobe associated with the directional beam, wherein transmitting the beam report comprises: transmitting a second indication of the adjusted RSRP.

Aspect 4: The method of any of aspects 1 through 3, further comprising: determining an SSB associated with the other directional beam based at least in part on the one or more of the main lobe or the at least one side lobe associated with the directional beam causing the interference to the second beamformed transmission associated with the other directional beam from the base station, the other directional beam corresponding to a direction of the first beamformed transmission causing the interference to the second beamformed transmission, wherein transmitting the beam report comprises: transmitting a second indication of the SSB corresponding to the direction of the first beamformed transmission causing the interference to the second beamformed transmission.

Aspect 5: A method for wireless communications at a first UE, comprising: transmitting, to a base station, a set of beamformed transmissions using a first set of uplink directional beams associated with a first set of antenna elements of a first antenna array; receiving, from the base station, a beam report comprising an indication of one or more of a measured main lobe or at least one measured side lobe associated with a first directional beam associated with the beamformed transmission from the first UE causing interference at a second UE based at least in part on the transmitting; determining a beamformed transmission of the set of beamformed transmissions from the first UE causing the interference at the second UE based at least in part on the indication; modifying the first uplink directional beam associated with the beamformed transmission causing the interference at the second UE; and communicating with the base station based at least in part on modifying the first uplink directional beam associated with the beamformed transmission causing the interference at the second UE.

Aspect 6: The method of aspect 5, wherein receiving the beam report comprises: receiving a subframe number or symbol indication, wherein determining the beamformed transmission of the set of beamformed transmissions comprises: determining the beamformed transmission of the set of beamformed transmissions from the first UE causes the interference at the second UE based at least in part on the subframe number or symbol indication corresponding to the beamformed transmission.

Aspect 7: The method of any of aspects 5 through 6, wherein receiving the beam report comprises: receiving a slot format indication, wherein determining the beamformed transmission of the set of beamformed transmissions comprises: determining the beamformed transmission of the set of beamformed transmissions from the first UE causes the interference at the second UE based at least in part on the slot format indication corresponding to the beamformed transmission.

Aspect 8: The method of any of aspects 5 through 7, further comprising: determining UE capability information associated with the first UE based at least in part on the indication of the first UE causing interference at the second UE; selecting a second antenna array based at least in part on the UE capability information, wherein modifying the first uplink directional beam comprises: switching from the first uplink directional beam to a second uplink directional beam associated with the second antenna array, wherein communicating with the base station comprises: communicating with the base station based at least in part on switching from the first uplink directional beam to the second uplink directional beam associated with the second antenna array.

Aspect 9: The method of aspect 8, further comprising: determining that an SINR associated with the second uplink directional beam satisfies a threshold, wherein switching from the first uplink directional beam to the second uplink directional beam comprises: switching from the first uplink directional beam to the second uplink directional beam associated with the second antenna array based at least in part on determining that the SINR associated with the second uplink directional beam satisfies the threshold.

Aspect 10: The method of any of aspects 8 through 9, further comprising: determining an RSRP associated with the second uplink directional beam; determining that a reference signal received power associated with the second uplink directional beam satisfies a threshold, wherein switching from the first uplink directional beam to the second uplink directional beam comprises: switching from the first uplink directional beam to the second uplink directional beam associated with the second antenna array based at least in part on determining that the RSRP associated with the second uplink directional beam satisfies the threshold.

Aspect 11: The method of aspect 10, wherein switching from the first uplink directional beam to the second uplink directional beam comprises: switching from a first TCI state associated with the first uplink directional beam to a second TCI state associated with the second uplink directional beam.

Aspect 12: The method of any of aspects 10 through 11, further comprising: determining that the interference at the second UE satisfies a threshold based at least in part on switching from the first uplink directional beam to the second uplink directional beam, wherein communicating with the base station comprises: communicating with the base station based at least in part on determining that the interference at the second UE satisfies the threshold.

Aspect 13: The method of any of aspects 5 through 12, wherein modifying the first uplink directional beam comprises: adjusting one or more beamforming weights corresponding to phase shifter or amplitude control configurations associated with the first uplink directional beam based at least in part on UE capability information, wherein communicating with the base station comprises: communicating with the base station based at least in part on adjusting the one or more beamforming weights associated with the first uplink directional beam.

Aspect 14: The method of any of aspects 5 through 13, wherein modifying the first uplink directional beam comprises: adjusting one or more beamforming weights corresponding to phase shifter or amplitude control configurations associated with the first uplink directional beam based at least in part on the first uplink directional beam causing the interference at the second UE.

Aspect 15: The method of any of aspects 5 through 14, further comprising: transmitting, to the base station, a request to schedule a second set of uplink directional beams associated with a second set of antenna elements of a second antenna array based at least in part on the first UE causing interference at the second UE, the second set of uplink directional beams corresponding to a different slot format, wherein communicating with the base station comprises: communicating with the base station using the second set of uplink directional beams associated with the second set of antenna elements of the second antenna array.

Aspect 16: The method of any of aspects 5 through 15, further comprising: transmitting, to the base station, a second indication indicating to the base station to refrain from beam reporting on a downlink directional beam associated with the first uplink directional beam.

Aspect 17: A method for wireless communication at a base station, comprising: determining an interference based at least in part on one or more of a main lobe or at least one side lobe of an uplink directional beam associated with a first beamformed transmission from a first UE causing the interference at one or more of the base station or the second UE; and transmitting, to the first UE, a beam report comprising an indication of one or more of the main lobe or the at least one side lobe associated with the uplink directional beam from the first UE causing interference at one or more of the base station or the second UE.

Aspect 18: The method of aspect 17, further comprising: determining a difference between an uplink rate associated with the first beamformed transmission and a downlink rate associated with a second beamformed transmission from the base station, wherein determining the interference comprises: determining the interference based at least in part on the difference between the uplink rate and the downlink rate.

Aspect 19: The method of any of aspects 17 through 18, further comprising: determining a difference between an uplink spectral efficiency associated with the first beamformed transmission and a downlink spectral efficiency associated with a second beamformed transmission from the base station, wherein determining the interference comprises: determining the interference based at least in part on the difference between the uplink spectral efficiency and the downlink spectral efficiency.

Aspect 20: The method of any of aspects 17 through 19, further comprising: determining a network-level interference statistic, wherein determining the interference comprises: determining the interference based at least in part on the network-level interference statistic.

Aspect 21: The method of any of aspects 17 through 20, further comprising: determining the first UE is causing the interference at one or more of the base station or the second UE based at least in part on slot format indices associated with the first UE and the second UE, wherein transmitting the beam report comprising the indication of the first UE causing interference at one or more of the base station or the second UE is based at least in part on the slot format indices.

Aspect 22: The method of any of aspects 17 through 21, further comprising: estimating location information associated with the first UE and the second UE; and determining the first UE is causing the interference at one or more of the base station or the second UE based at least in part on the estimated location information associated with the first UE and the second UE, wherein transmitting the beam report comprising the indication of the first UE causing interference at one or more of the base station or the second UE is based at least in part on the estimated location information.

Aspect 23: The method of any of aspects 17 through 22, further comprising: transmitting, to the first UE, a subframe number indication indicating that the uplink directional beam associated with the first beamformed transmission from the first UE is causing the interference at one or more of the base station or the second UE and to perform one or more of a beam switch operation or an antenna subarray switch operation.

Aspect 24: The method of any of aspects 17 through 23, further comprising: transmitting, to the first UE, a slot format indication indicating that the uplink directional beam associated with the first beamformed transmission from the first UE is causing the interference at one or more of the base station or the second UE and to perform one or more of a beam switch operation or an antenna subarray switch operation.

Aspect 25: A method for wireless communications at a first UE, comprising: determining at least one side lobe of a first directional beam of a set of directional beams causing interference at one or more devices, the one or more devices comprising a base station, the first UE, or a second UE, or any combination thereof; determining that a first level of interference associated with the at least one side lobe of the first directional beam of the set of directional beams causing the interference satisfies a threshold; generating a beam report comprising a first indication of the interference based at least in part on the first level of interference associated with the at least one side lobe of the first directional beam satisfying the threshold; and transmitting the beam report comprising the first indication of the interference to the base station.

Aspect 26: The method of aspect 25, further comprising: receiving, from the second UE, a second indication of the at least one side lobe associated with the first directional beam of the set of directional beams causing the interference, wherein the second indication is based at least in part on the at least one side lobe associated with the first directional beam of the set of directional beams causing the interference over a threshold number of slots, and wherein generating the beam report comprises: generating the beam report based at least in part on receiving the second indication of the at least one side lobe associated with the first directional beam of the set of directional beams causing the interference from the second UE.

Aspect 27: The method of any of aspects 25 through 26, wherein generating the beam report comprises: determining a number of beam switching occasions associated with switching from the first directional beam of the set of directional beams to a second directional beam of the set of directional beams, wherein the first level of interference associated with the first directional beam is different from a second level of interference associated with the second directional beam; and generating the beam report based at least in part on the number of beam switching occasions.

Aspect 28: The method of any of aspects 25 through 27, further comprising: determining a set of serving cell SSB measurements associated with the base station or a second base station, wherein generating the beam report comprises: generating a second indication of the set of serving cell SSB measurements.

Aspect 29: The method of aspect 28, further comprising: receiving a third indication of an SINR from the second UE, wherein determining the set of serving cell SSB measurements comprises: determining the set of serving cell SSB measurements associated with the base station or the second base station based at least in part on the third indication of the SINR from the second UE.

Aspect 30: The method of any of aspects 25 through 29, further comprising: determining one or more directional beam candidates of the set of directional beams to use for the wireless communications based at least in part on the at least one side lobe associated with the first directional beam of the set of directional beams causing the interference at the one or more devices, wherein generating the beam report comprises: generating the beam report comprising a second indication of the one or more directional beam candidates of the set of directional beams to use for the wireless communications.

Aspect 31: A method for wireless communications at a base station, comprising: receiving, from a first UE, a beam report of a signal strength associated with a beamformed transmission, wherein the beamformed transmission comprises at least one side lobe of a first directional beam of a set of directional beams causing an interference at one or more devices, the one or more devices comprising the base station, the first UE, or a second UE, or any combination thereof; determining that the signal strength associated with the beamformed transmission satisfies a threshold; and transmitting, to the first UE, a message comprising an indication for beam reporting based at least in part on the signal strength associated with the beamformed transmission satisfying the threshold.

Aspect 32: The method of aspect 31, wherein receiving the beam report comprises: receiving, from the first UE, the beam report comprising a second indication of one or more directional beam candidates of the set of directional beams to use for the wireless communications based at least in part on the at least one side lobe associated with the first directional beam of the set of directional beams causing the interference at the one or more devices.

Aspect 33: The method of any of aspects 31 through 32, further comprising: determining a second directional beam of the set of directional beams to use for the wireless communication based at least in part on the side lobe associated with the first directional beam of the set of directional beams causing the interference at the one or more devices.

Aspect 34: The method of any of aspects 31 through 33, wherein determining that the signal strength satisfies the threshold further comprises: determining that the signal strength satisfies the threshold over a threshold number of slots, wherein transmitting the message comprises: transmitting the message based at least in part on determining that the signal strength satisfies the threshold over the threshold number of slots.

Aspect 35: The method of any of aspects 31 through 34, wherein the signal strength comprises an SNR, an SINR, an RSRP, an RSRQ, an RSSI, or a combination thereof.

Aspect 36: The method of any of aspects 31 through 35, wherein the threshold comprises a signal strength threshold configured by the one or more devices.

Aspect 37: An apparatus for wireless communications at a first UE, comprising a processor; memory coupled with the processor; and instructions stored in the memory and executable by the processor to cause the apparatus to perform a method of any of aspects 1 through 4.

Aspect 38: An apparatus for wireless communications at a first UE, comprising at least one means for performing a method of any of aspects 1 through 4.

Aspect 39: A non-transitory computer-readable medium storing code for wireless communications at a first UE, the code comprising instructions executable by a processor to perform a method of any of aspects 1 through 4.

Aspect 40: An apparatus for wireless communications at a first UE, comprising a processor; memory coupled with the processor; and instructions stored in the memory and executable by the processor to cause the apparatus to perform a method of any of aspects 5 through 16.

Aspect 41: An apparatus for wireless communications at a first UE, comprising at least one means for performing a method of any of aspects 5 through 16.

Aspect 42: A non-transitory computer-readable medium storing code for wireless communications at a first UE, the code comprising instructions executable by a processor to perform a method of any of aspects 5 through 16.

Aspect 43: An apparatus for wireless communication at a base station, comprising a processor; memory coupled with the processor; and instructions stored in the memory and executable by the processor to cause the apparatus to perform a method of any of aspects 17 through 24.

Aspect 44: An apparatus for wireless communication at a base station, comprising at least one means for performing a method of any of aspects 17 through 24.

Aspect 45: A non-transitory computer-readable medium storing code for wireless communication at a base station, the code comprising instructions executable by a processor to perform a method of any of aspects 17 through 24.

Aspect 46: An apparatus for wireless communications at a first UE, comprising a processor; memory coupled with the processor; and instructions stored in the memory and executable by the processor to cause the apparatus to perform a method of any of aspects 25 through 30.

Aspect 47: An apparatus for wireless communications at a first UE, comprising at least one means for performing a method of any of aspects 25 through 30.

Aspect 48: A non-transitory computer-readable medium storing code for wireless communications at a first UE, the code comprising instructions executable by a processor to perform a method of any of aspects 25 through 30.

Aspect 49: An apparatus for wireless communications at a base station, comprising a processor; memory coupled with the processor; and instructions stored in the memory and executable by the processor to cause the apparatus to perform a method of any of aspects 31 through 36.

Aspect 50: An apparatus for wireless communications at a base station, comprising at least one means for performing a method of any of aspects 31 through 36.

Aspect 51: A non-transitory computer-readable medium storing code for wireless communications at a base station, the code comprising instructions executable by a processor to perform a method of any of aspects 31 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
   at least one processor;
   at least one memory coupled with the at least one processor; and
   instructions stored in the at least one memory and executable by the at least one processor to cause the apparatus to:
   transmit, to a base station, a set of beamformed transmissions using a first set of uplink directional beams associated with a first set of antenna elements of a first antenna array;
   receive, from the base station, a beam report comprising an indication of a subframe number or a symbol corresponding to a beamformed transmission from the set of beamformed transmissions for which a first directional beam associated with the beamformed transmission caused interference at a second UE based at least in part on the transmitting;
   modify a first uplink directional beam associated with the beamformed transmission that caused the interference at the second UE based at least in part on the beam report; and
   communicate with the base station based at least in part on the modifying of the first uplink directional beam associated with the beamformed transmission that caused the interference at the second UE.

2. The apparatus of claim 1, wherein the instructions to receive the beam report are executable by the at least one processor to cause the apparatus to:
   receive a slot format indication that corresponds to the beamformed transmission.

3. The apparatus of claim 1, wherein the instructions are further executable by the at least one processor to cause the apparatus to:
   determine UE capability information associated with the first UE based at least in part on the beam report; and
   select a second antenna array based at least in part on the UE capability information, and
   wherein the instructions to modify the first uplink directional beam are further executable by the at least one processor to cause the apparatus to:
   switch from the first uplink directional beam to a second uplink directional beam associated with the second antenna array, and
   wherein the instructions to communicate with the base station are further executable by the at least one processor to cause the apparatus to:
   communicate with the base station based at least in part on the switching from the first uplink directional beam to the second uplink directional beam associated with the second antenna array.

4. The apparatus of claim 3, wherein the instructions are further executable by the at least one processor to cause the apparatus to:
   determine that a signal-to-interference-and-noise ratio associated with the second uplink directional beam satisfies a threshold, and
   wherein the instructions to switch from the first uplink directional beam to the second uplink directional beam are further executable by the at least one processor to cause the apparatus to:
   switch from the first uplink directional beam to the second uplink directional beam associated with the second antenna array based at least in part on determining that the signal-to-interference-and-noise ratio associated with the second uplink directional beam satisfies the threshold.

5. The apparatus of claim 3, wherein the instructions are further executable by the at least one processor to cause the apparatus to:
  determine a reference signal received power associated with the second uplink directional beam; and
  determine that the reference signal received power associated with the second uplink directional beam satisfies a threshold, and
  wherein the instructions to switch from the first uplink directional beam to the second uplink directional beam are further executable by the at least one processor to cause the apparatus to:
    switch from the first uplink directional beam to the second uplink directional beam associated with the second antenna array based at least in part on determining that the reference signal received power associated with the second uplink directional beam satisfies the threshold.

6. The apparatus of claim 5, wherein the instructions to switch from the first uplink directional beam to the second uplink directional beam are executable by the at least one processor to cause the apparatus to:
  switch from a first transmission configuration indicator state associated with the first uplink directional beam to a second transmission configuration indicator state associated with the second uplink directional beam.

7. The apparatus of claim 5, wherein the instructions are further executable by the at least one processor to cause the apparatus to:
  determine that the interference at the second UE satisfies a second threshold based at least in part on switching from the first uplink directional beam to the second uplink directional beam, and
  wherein the instructions to communicate with the base station are further executable by the at least one processor to cause the apparatus to:
    communicate with the base station based at least in part on determining that the interference at the second UE satisfies the second threshold.

8. The apparatus of claim 1, wherein the instructions to modify the first uplink directional beam are executable by the at least one processor to cause the apparatus to:
  adjust one or more beamforming weights corresponding to phase shifter or amplitude control configurations associated with the first uplink directional beam based at least in part on UE capability information, and
  wherein the instructions to communicate with the base station are further executable by the at least one processor to cause the apparatus to:
    communicate with the base station based at least in part on adjusting the one or more beamforming weights associated with the first uplink directional beam.

9. The apparatus of claim 1, wherein the instructions to modify the first uplink directional beam are executable by the at least one processor to cause the apparatus to:
  adjust one or more beamforming weights corresponding to phase shifter or amplitude control configurations associated with the first uplink directional beam based at least in part on the interference at the second UE.

10. The apparatus of claim 1, wherein the instructions are further executable by the at least one processor to cause the apparatus to:
  transmit, to the base station, a request to schedule a second set of uplink directional beams associated with a second set of antenna elements of a second antenna array based at least in part on the interference at the second UE, the second set of uplink directional beams corresponding to a different slot format, and
  wherein the instructions to communicate with the base station are further executable by the at least one processor to cause the apparatus to:
    communicate with the base station using the second set of uplink directional beams associated with the second set of antenna elements of the second antenna array.

11. The apparatus of claim 1, wherein the instructions are further executable by the at least one processor to cause the apparatus to:
  transmit, to the base station, a second indication indicating to the base station to refrain from beam reporting on a downlink directional beam associated with the first uplink directional beam.

12. A method for wireless communications at a first user equipment (UE), comprising:
  transmitting, to a base station, a set of beamformed transmissions using a first set of uplink directional beams associated with a first set of antenna elements of a first antenna array;
  receiving, from the base station, a beam report comprising an indication of a subframe number or a symbol corresponding to a beamformed transmission from the set of beamformed transmissions for which a first directional beam associated with the beamformed transmission caused interference at a second UE based at least in part on the transmitting;
  modifying a first uplink directional beam associated with the beamformed transmission that caused the interference at the second UE based at least in part on the beam report; and
  communicating with the base station based at least in part on the modifying of the first uplink directional beam associated with the beamformed transmission that caused the interference at the second UE.

13. The method of claim 12, further comprising:
  receiving a slot format indication that corresponds to the beamformed transmission.

14. The method of claim 12, further comprising:
  determining UE capability information associated with the first UE based at least in part on the beam report; and
  selecting a second antenna array based at least in part on the UE capability information, and
  wherein modifying the first uplink directional beam further comprises:
    switching from the first uplink directional beam to a second uplink directional beam associated with the second antenna array, and
  wherein communicating with the base station further comprises:
    communicating with the base station based at least in part on switching from the first uplink directional beam to the second uplink directional beam associated with the second antenna array.

15. The method of claim 14, further comprising:
  determining that a signal-to-interference-and-noise ratio associated with the second uplink directional beam satisfies a threshold, and
  wherein switching from the first uplink directional beam to the second uplink directional beam further comprises:
    switching from the first uplink directional beam to the second uplink directional beam associated with the second antenna array based at least in part on determining that the signal-to-interference-and-noise ratio associated with the second uplink directional beam satisfies the threshold.

16. The method of claim 14, further comprising:
determining a reference signal received power associated with the second uplink directional beam;
determining that the reference signal received power associated with the second uplink directional beam satisfies a threshold, and
wherein switching from the first uplink directional beam to the second uplink directional beam further comprises:
switching from the first uplink directional beam to the second uplink directional beam associated with the second antenna array based at least in part on determining that the reference signal received power associated with the second uplink directional beam satisfies the threshold.

17. The method of claim 16, wherein switching from the first uplink directional beam to the second uplink directional beam further comprises:
switching from a first transmission configuration indicator state associated with the first uplink directional beam to a second transmission configuration indicator state associated with the second uplink directional beam.

18. The method of claim 16, further comprising:
determining that the interference at the second UE satisfies a second threshold based at least in part on switching from the first uplink directional beam to the second uplink directional beam, and
wherein communicating with the base station further comprises:
communicating with the base station based at least in part on determining that the interference at the second UE satisfies the second threshold.

19. The method of claim 12, wherein modifying the first uplink directional beam further comprises:
adjusting one or more beamforming weights corresponding to phase shifter or amplitude control configurations associated with the first uplink directional beam based at least in part on UE capability information, and
wherein communicating with the base station further comprises:
communicating with the base station based at least in part on adjusting the one or more beamforming weights associated with the first uplink directional beam.

20. The method of claim 12, wherein modifying the first uplink directional beam further comprises:
adjusting one or more beamforming weights corresponding to phase shifter or amplitude control configurations associated with the first uplink directional beam based at least in part on the interference at the second UE.

21. The method of claim 12, further comprising:
transmitting, to the base station, a request to schedule a second set of uplink directional beams associated with a second set of antenna elements of a second antenna array based at least in part on the first UE causing the interference at the second UE, the second set of uplink directional beams corresponding to a different slot format, and
wherein communicating with the base station further comprises:
communicating with the base station using the second set of uplink directional beams associated with the second set of antenna elements of the second antenna array.

22. The method of claim 12, further comprising:
transmitting, to the base station, a second indication indicating to the base station to refrain from beam reporting on a downlink directional beam associated with the first uplink directional beam.

23. A first user equipment (UE) for wireless communications, comprising:
means for transmitting, to a base station, a set of beamformed transmissions using a first set of uplink directional beams associated with a first set of antenna elements of a first antenna array;
means for receiving, from the base station, a beam report comprising an indication of a subframe number or a symbol corresponding to a beamformed transmission from the set of beamformed transmissions for which a first directional beam associated with the beamformed transmission caused interference at a second UE based at least in part on the transmitting;
means for modifying a first uplink directional beam associated with the beamformed transmission that caused the interference at the second UE based at least in part on the beam report; and
means for communicating with the base station based at least in part on the modifying of the first uplink directional beam associated with the beamformed transmission that caused the interference at the second UE.

24. A non-transitory computer-readable medium storing code for wireless communications at a first user equipment (UE), the code comprising instructions executable by one or more processors to:
transmit, to a base station, a set of beamformed transmissions using a first set of uplink directional beams associated with a first set of antenna elements of a first antenna array;
receive, from the base station, a beam report comprising an indication of a subframe number or a symbol corresponding to a beamformed transmission from the set of beamformed transmissions for which a first directional beam associated with the beamformed transmission caused interference at a second UE based at least in part on the transmitting;
modify a first uplink directional beam associated with the beamformed transmission that caused the interference at the second UE based at least in part on the beam report; and
communicate with the base station based at least in part on the modifying of the first uplink directional beam associated with the beamformed transmission that caused the interference at the second UE.

* * * * *